(12) United States Patent
Furusho

(10) Patent No.: US 6,721,751 B1
(45) Date of Patent: Apr. 13, 2004

(54) METHOD OF CONCATENATING TABLE-FORMAT DATA, AND METHOD OF PRESENTING CONCATENATED TABLE-FORMAT DATA

(75) Inventor: Shinji Furusho, Yokohama (JP)

(73) Assignee: Turbo Data Laboratories Inc., Kanagawa (JP)

( * ) Notice: Subject to any disclaimer, the term of this patent is extended or adjusted under 35 U.S.C. 154(b) by 271 days.

(21) Appl. No.: 09/980,201

(22) PCT Filed: May 30, 2000

(86) PCT No.: PCT/JP00/03465
§ 371 (c)(1),
(2), (4) Date: Nov. 30, 2001

(87) PCT Pub. No.: WO00/73939
PCT Pub. Date: Dec. 7, 2000

(30) Foreign Application Priority Data

May 31, 1999 (JP) .......................................... 11-151156

(51) Int. Cl.[7] .............................................. G06F 17/30
(52) U.S. Cl. ....................... 707/100; 707/101; 707/102; 707/103 R; 707/104.1
(58) Field of Search ................. 707/100, 101, 707/102, 103 R, 104.1, 202

(56) References Cited

U.S. PATENT DOCUMENTS

| | | | | |
|---|---|---|---|---|
| 5,675,784 A | * | 10/1997 | Maxwell et al. ............ | 707/100 |
| 5,748,905 A | * | 5/1998 | Hauser et al. .............. | 709/249 |
| 5,778,370 A | * | 7/1998 | Emerson ..................... | 707/100 |
| 6,611,274 B1 | * | 8/2003 | Keely et al. ................ | 345/600 |
| 2003/0189925 A1 | * | 10/2003 | Wellbaum et al. .......... | 370/372 |

FOREIGN PATENT DOCUMENTS

JP 63-298626 A 12/1988

OTHER PUBLICATIONS

Uki, "SybaseIQ: Dokuji Data Kouzou ni yoru Data Warehouse eno Approach", Technical Research Report, the Institute of Electronics, Information and Communication Engineers, pp. 51–56, especially p. 53, Bit Map Index.

Torii et al., Nikkei Electronics, vol. 414, Feb. 09, 1987, pp. 185–206, "Relational Database no Shori Sokudo Koujou wo hakaru CPE Naizougata Database Proces sor Merge Enzam no Pipeline Jikkou ni yori Sort Shori wo Kousokuka".

* cited by examiner

*Primary Examiner*—Frantz Coby
(74) *Attorney, Agent, or Firm*—Griffin & Szipl, PC

(57) ABSTRACT

A structure for table-format data with a small data size whereby a plurality of tables of table-format data can be joined as desired, a method of concatenating table-format data, and a method for displaying concatenated table-format data. In this method, each table of table-format data is constructed in a manner such that each table is divided into one or more information blocks consisting of: a value list in which the field values are stored in the order of a field value number corresponding to the field value belonging to a specified field, and a pointer array in which pointer values for pointing to said field value numbers are stored in a unique record order.

33 Claims, 42 Drawing Sheets

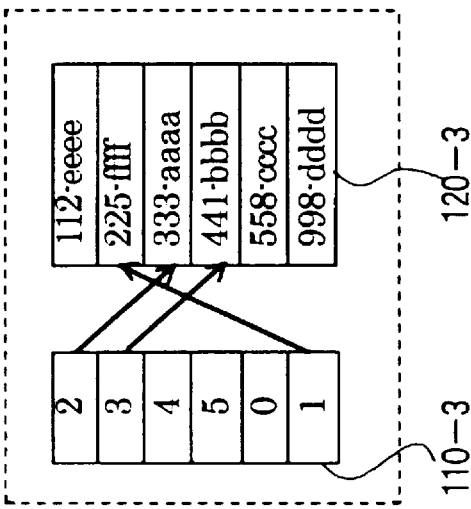
FIG. 3A
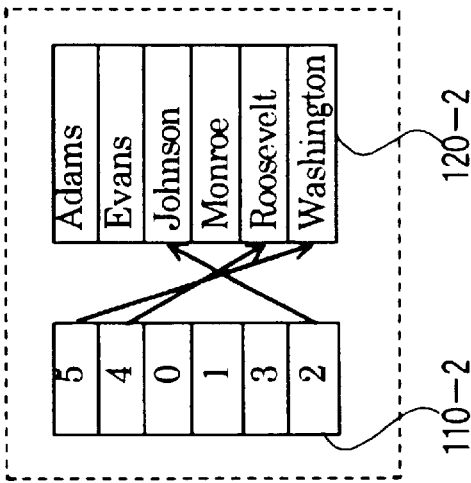
FIG. 3C
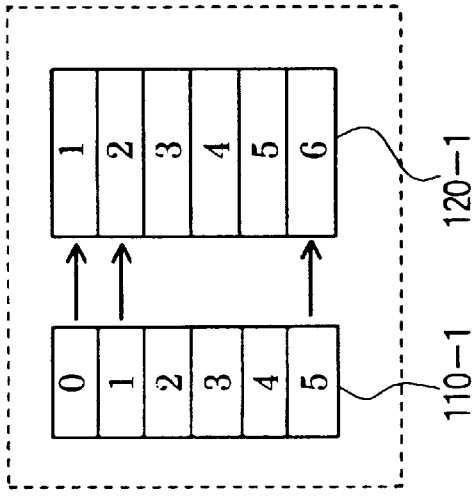
FIG. 3D
FIG. 3B

FIG. 4A

| Record No. | Sex | Age | Occupation |
|---|---|---|---|
| 0 | Female | 18 | Programmer |
| 1 | Male | 21 | Student |
| 2 | Female | 31 | Teacher |
| ⋮ | ⋮ | ⋮ | ⋮ |
| 999999 | Female | 16 | Student |

FIG. 4B

| | |
|---|---|
| 0 | 1 |
| 1 | 0 |
| 2 | 1 |
| | |
| 999999 | 1 |

| | Field value | Category No. | Start Position | Count |
|---|---|---|---|---|
| 0 | Male | | 0 | 632564 |
| 1 | Female | | 632564 | 367436 |

210-1

220-1

230-1

| | |
|---|---|
| 0 | 1 |
| 1 | |
| ⋮ | |
| 632563 | 0 |
| 632564 | 2 |
| ⋮ | |
| 999999 | 999999 |

FIG. 4C

| | |
|---|---|
| 0 | 2 |
| 1 | 5 |
| 2 | 15 |
| | |
| 999999 | 0 |

| | Field value | Category No. | Start Position | Count |
|---|---|---|---|---|
| 0 | 16 | | 0 | 45898 |
| 1 | 17 | | 45898 | 78550 |
| 2 | 18 | | 124448 | 113689 |
| 3 | 19 | | 238137 | 189653 |
| 4 | 20 | | 427790 | 125643 |
| 5 | 21 | | 553433 | 155535 |
| ⋮ | ⋮ | | ⋮ | ⋮ |
| 15 | 31 | | 911546 | 35648 |
| ⋮ | ⋮ | | ⋮ | ⋮ |
| 65 | 81 | | 999489 | 511 |

230-2

| | |
|---|---|
| 0 | |
| 1 | |
| ⋮ | |
| 45897 | 999999 |
| 45898 | |
| ⋮ | |
| 999999 | |

220-2   210-2

200-2

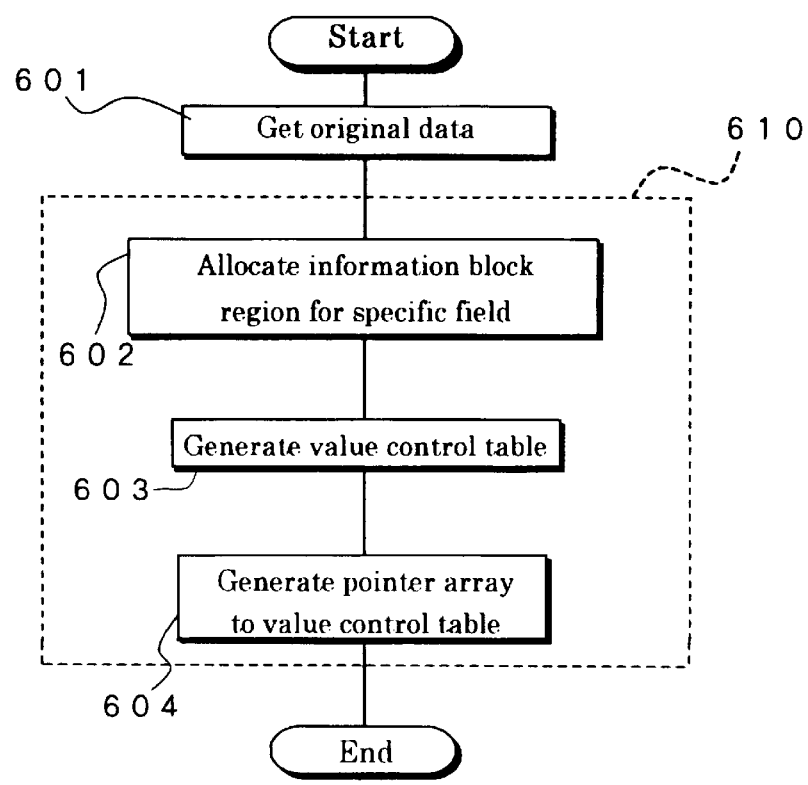

FIG. 8A

| Customer ID | Customer name | Telephone No. | SVC-ID |
|---|---|---|---|
| 1 | Washington | 333-aaaa | D |
| 2 | Roosevelt | 444-bbbb | B |
| 3 | Adams | 558-cccc | C |
| 4 | Evans | 998-dddd | B |
| 5 | Monroe | 112-eeee | C |
| 6 | Johnson | 225-ffff | C |

FIG. 8B

| Service ID | Dues |
|---|---|
| A | 32,000 |
| B | 14,000 |
| C | 18,000 |
| D | 12,000 |

FIG. 8C

| Customer ID | Customer name | Dues |
|---|---|---|
| 1 | Washington | 12,000 |
| 2 | Roosevelt | 14,000 |
| 3 | Adams | 18,000 |
| 4 | Evans | 14,000 |
| 5 | Monroe | 18,000 |
| 6 | Johnson | 18,000 |

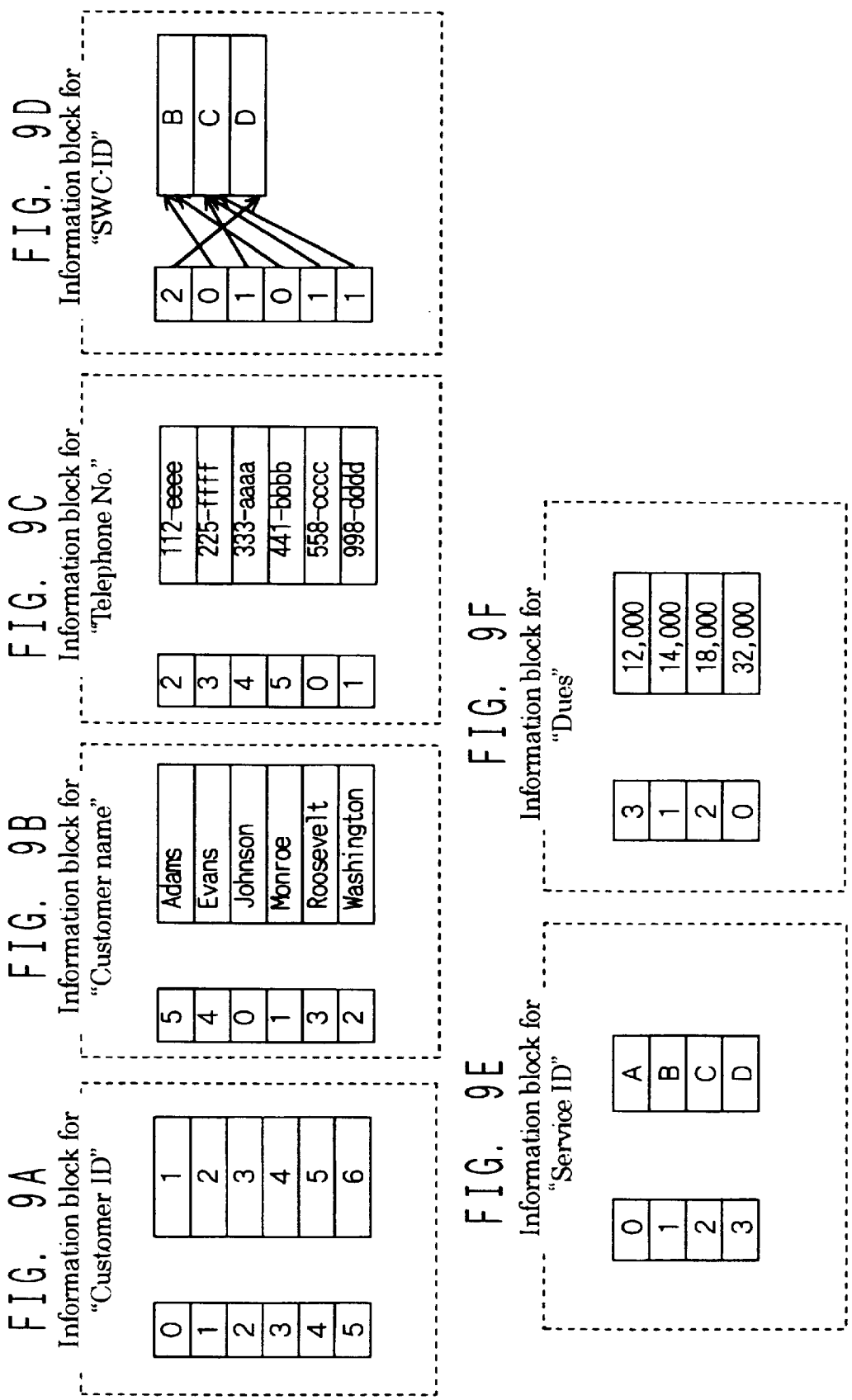

FIG. 18A
Sort on Service ID

| (Service ID) | Dues | Customer ID | Customer name |
|---|---|---|---|
| B | 14,000 | 2 | Roosevelt |
| B | 14,000 | 4 | Evans |
| C | 18,000 | 3 | Adams |
| C | 18,000 | 5 | Monroe |
| C | 18,000 | 6 | Johnson |

FIG. 18B
Sort on Dues

| Dues | Customer ID | Customer name |
|---|---|---|
| 12,000 | 1 | Washington |
| 14,000 | 2 | Roosevelt |
| 14,000 | 3 | Evans |
| 18,000 | 4 | Adams |
| 18,000 | 5 | Monroe |

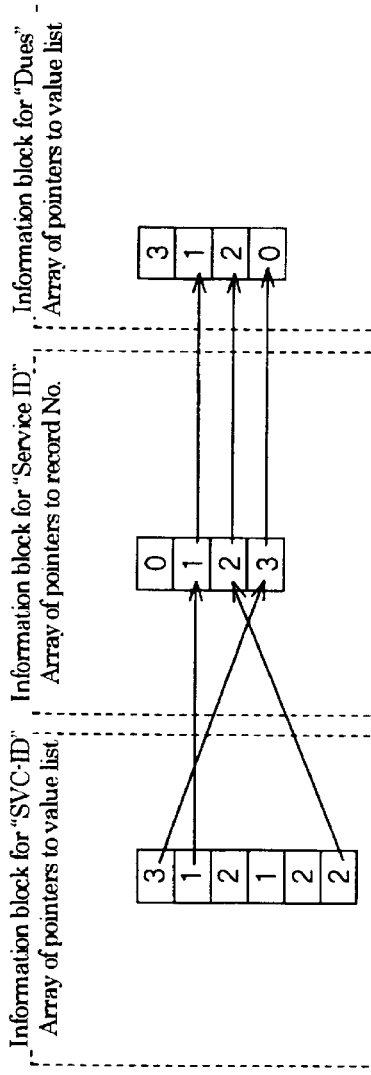
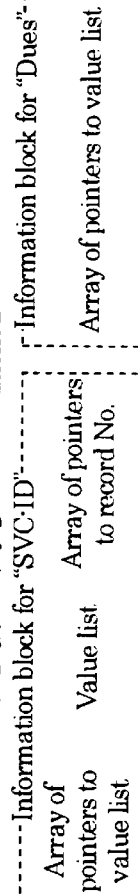
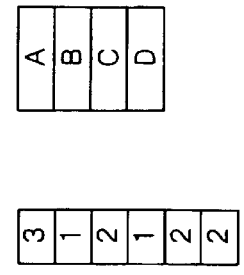
FIG. 19A  Embodiment 1
FIG. 19B  Embodiment 2

Embodiment 3

FIG. 21A

Baseball Fan Club Membership Table
n Records(n=3)

| Member name | Fan of |
|---|---|
| Williams | Team A |
| Carter | Team C |
| Smith | Team A |

① (Multi) ②

FIG. 21B

Game Schedule Table
m Records(m=4)

| Baseball team | Game date |
|---|---|
| Team C | 5/10 |
| Team A | 5/10 |
| Team B | 5/11 |
| Team A | 5/11 |

(Multi) ③ ④

FIG. 21C

Ticket confirmation view

| Ticket/Member name | Ticket/Fan of | Ticket/Game date |
|---|---|---|
| Williams | Team A | 5/10 |
| Williams | Team A | 5/11 |
| Carter | Team C | 5/10 |
| Smith | Team A | 5/10 |
| Smith | Team A | 5/11 |

⑤ ⑥ ⑦

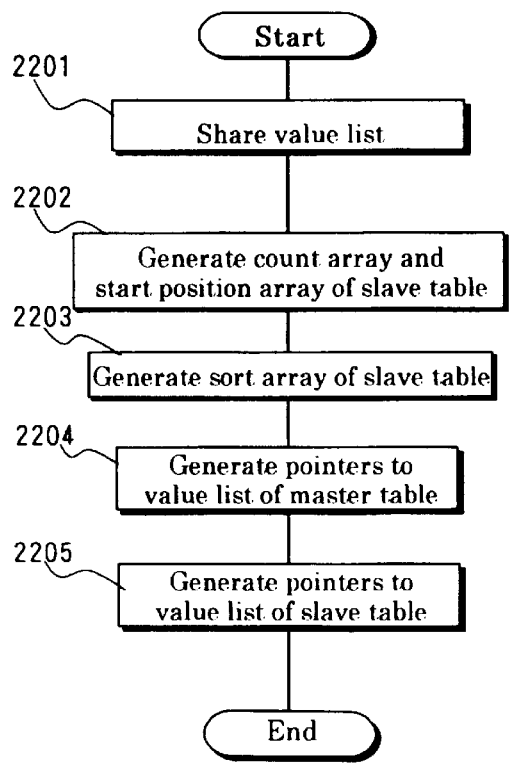

FIG. 22

Start
↓
2201 — Share value list
↓
2202 — Generate count array and start position array of slave table
↓
2203 — Generate sort array of slave table
↓
2204 — Generate pointers to value list of master table
↓
2205 — Generate pointers to value list of slave table
↓
End

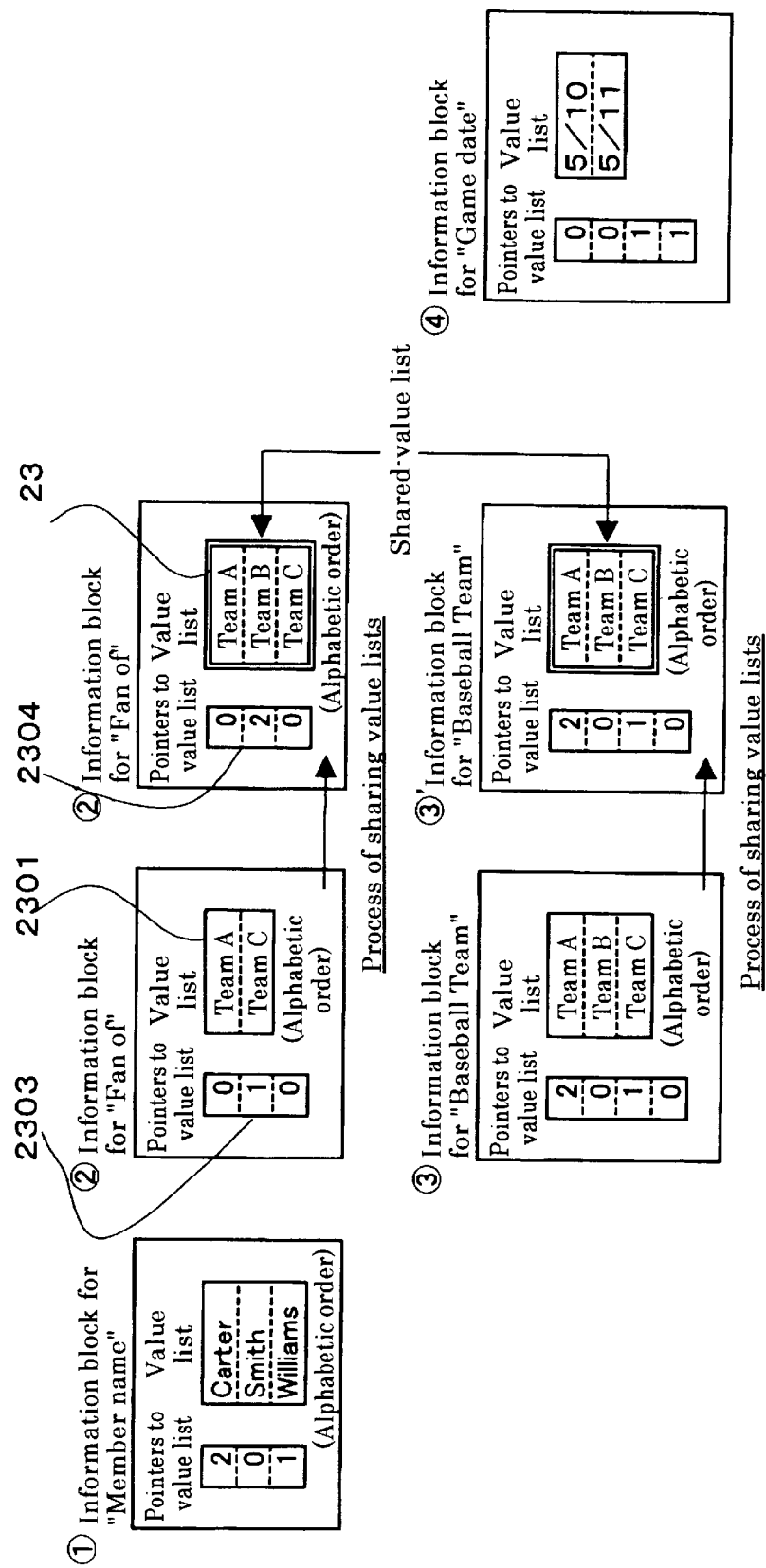

FIG. 29A
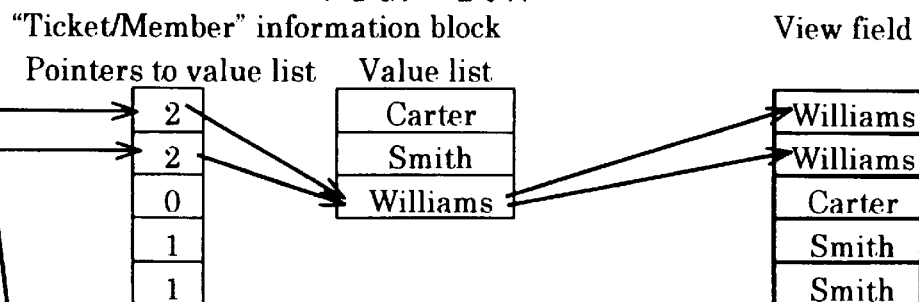
FIG. 29B
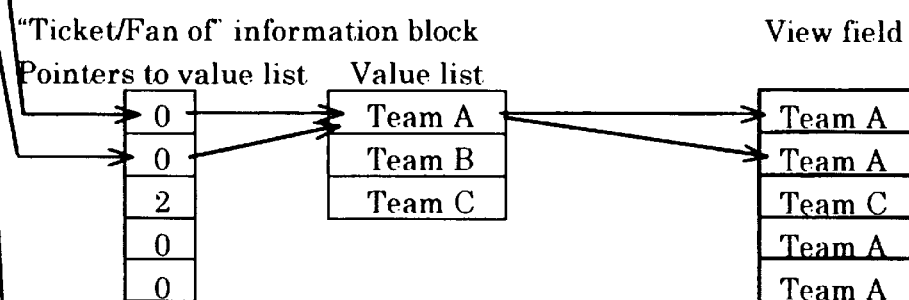
FIG. 29C
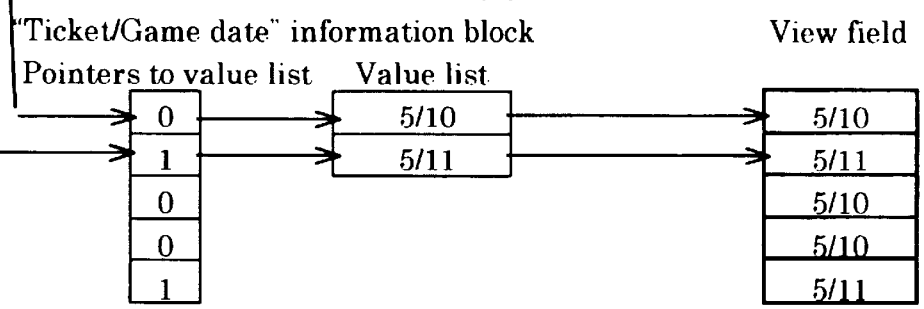
FIG. 29D
| Ticket/Member | Ticket/Fan of | Ticket/Game date |
|---|---|---|
| Williams | Team A | 5/11 |
| Williams | Team A | 5/10 |
| Carter | Team C | 5/10 |
| Smith | Team A | 5/10 |
| Smith | Team A | 5/11 |

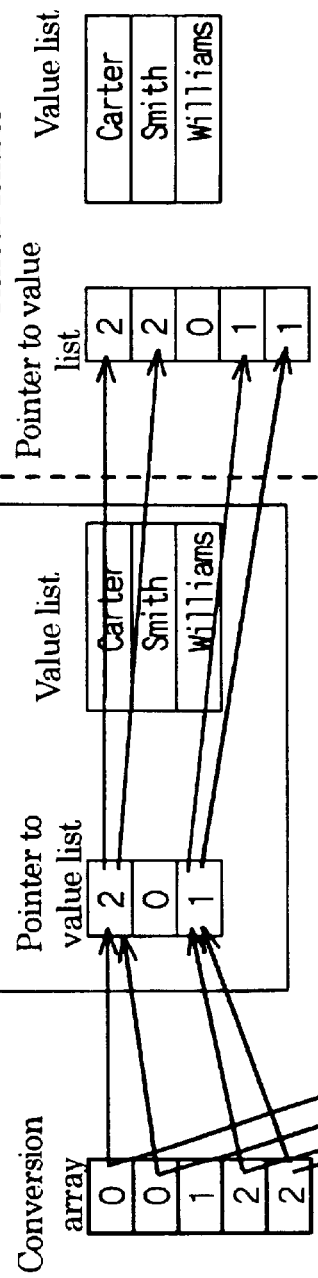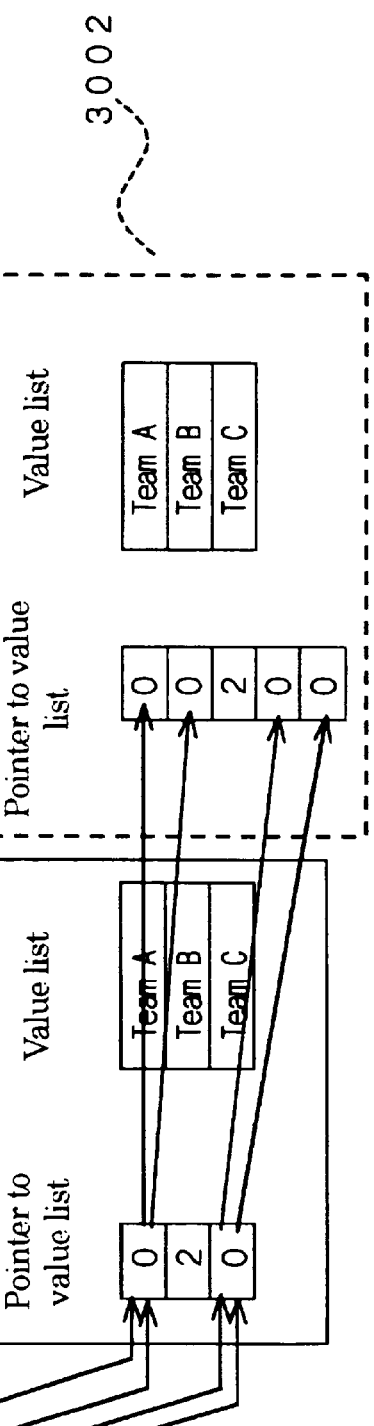
FIG. 30A
FIG. 30B

Personal Name Table
n Records(n=3)

| Surname | Given name |
|---|---|
| Smith | John |
| Carter | Tom |
| Smith | Ken |

① ②

Age Table
m Records(m=4)

| Year/Surname | Year/Given name | Age |
|---|---|---|
| Carter | Tom | 30 |
| Smith | John | 22 |
| Smith | Ken | 88 |
| Williams | Leonard | 48 |

③ ④ ⑤

Personal name/Age view

| View/Surname | View/Given name | View/Age |
|---|---|---|
| Smith | John | 22 |
| Carter | Tom | 30 |
| Smith | Ken | 88 |

⑥ ⑦ ⑧

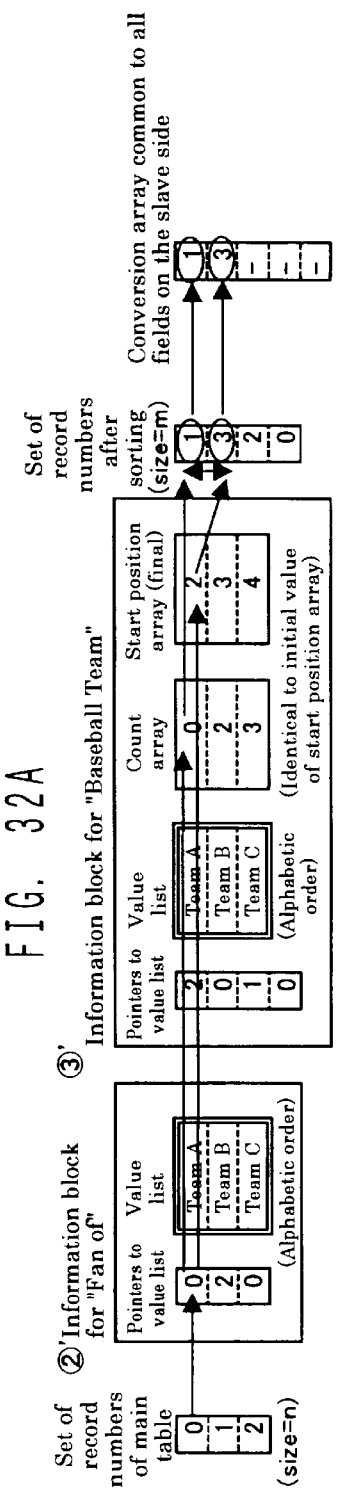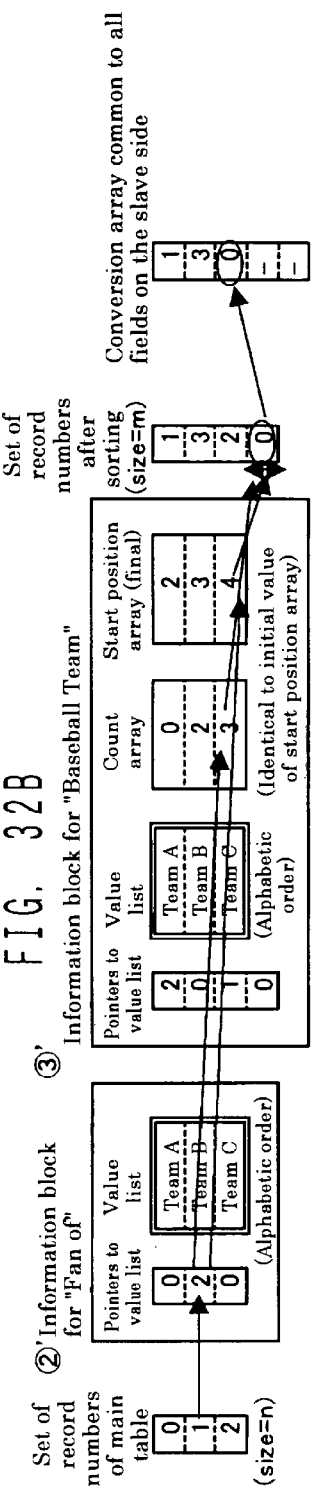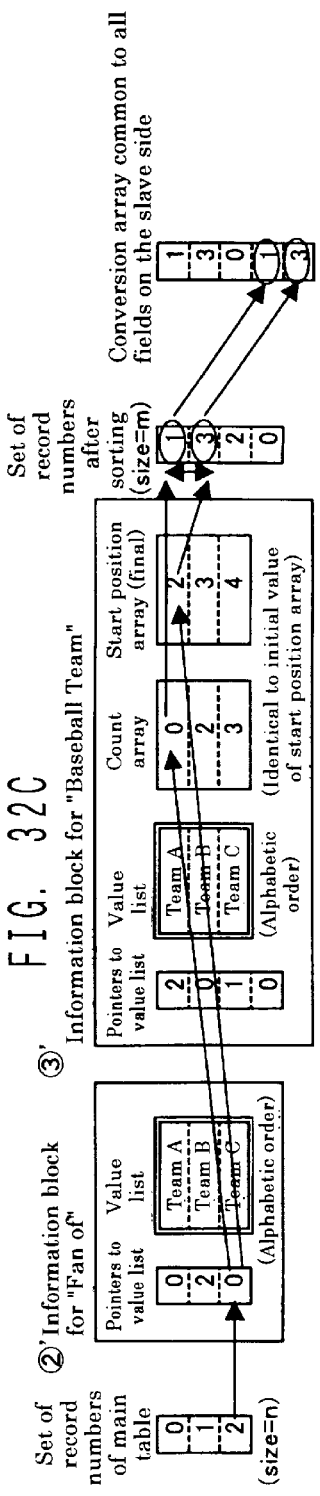

FIG. 38
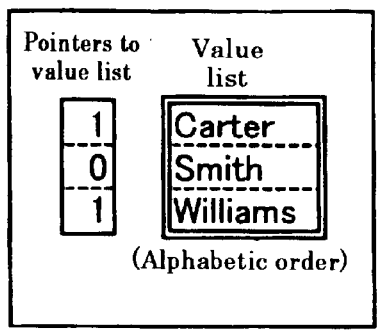
①' Information block for "Surname" after sharing process
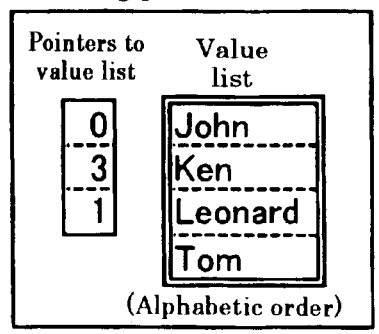
②' Information block for "Given name" after sharing process
⑥ Information block for "Surname + Given name" of Personal Name Table
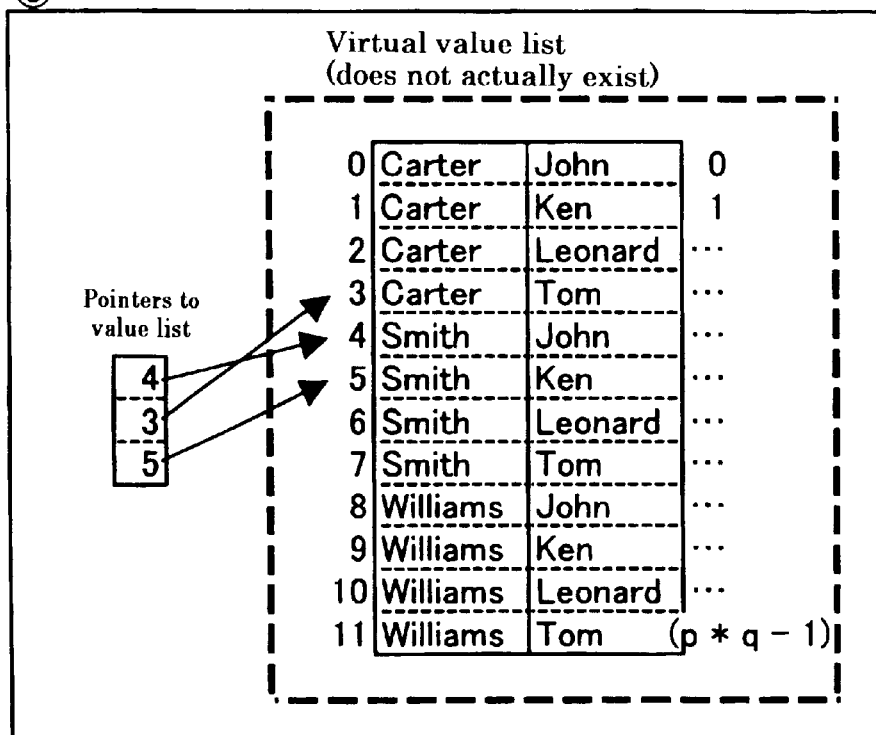

FIG. 39
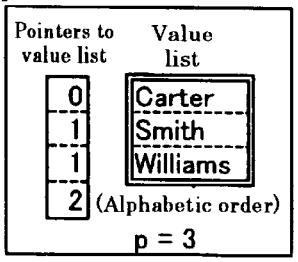
③ Information block for "Surname" after sharing process
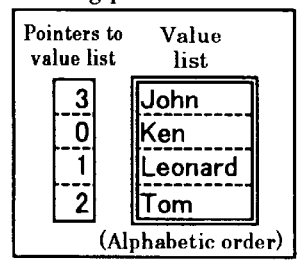
④ Information block for "Given name" after sharing process
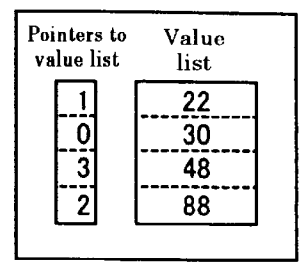
⑤ Information block for "Age"
⑦ Information block for "Age/Dues + Age/Given name" of Age Table
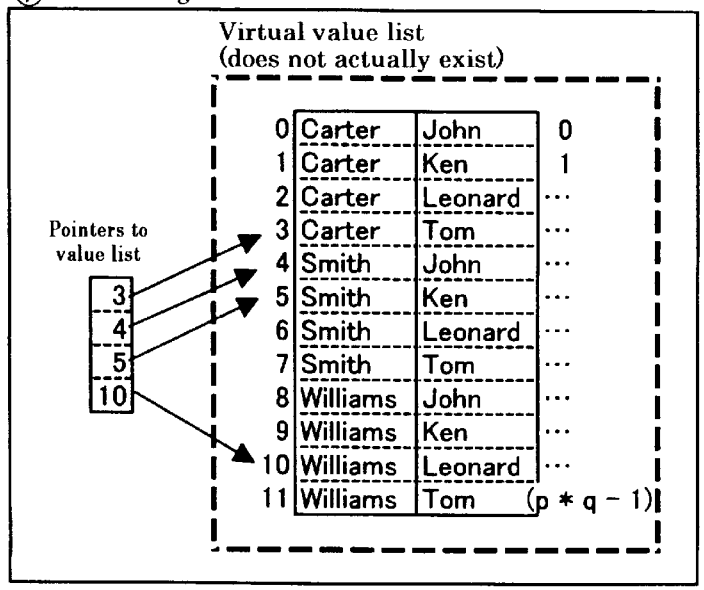

Informatino block for "Age/Surname+Age/Given name" of "Age Table"

METHOD OF CONCATENATING TABLE-FORMAT DATA, AND METHOD OF PRESENTING CONCATENATED TABLE-FORMAT DATA

BACKGROUND OF THE INVENTION

1. Field of the Invention

The invention relates to a data processing method and data processing apparatus for processing large amounts of data using a computer or other information processing apparatus, and particularly to a method and apparatus for concatenating a plurality of tables of table-format data in a relational database, and for searching for, tabulating and sorting field values of the desired records or the like.

2. Description of the Prior Art

Databases are used for various apps, but the use of a relational database (RDB) which is able to eliminate logical contradictions has become the mainstream in medium- to large-scale systems. For example, an RDB may be used in an airline seat reservation system or the like. In this case, a key field may be specified to perform a quick search for targets (often a single target), or to confirm, cancel or change reservations. In addition, because the number of seats on each flight numbers several hundred at most, it is possible to find the number of empty seats on a specific airline flight.

However, when one attempts to use this RDB to perform specific calculations (e.g., calculation of the seat vacancy rate) for each fiscal year, each day of the week, each month, each route, each time zone or each type of airplane, this is known to take an extremely large amount of time. To wit, while the RDB is superior at performing processing without contradictions, on the other hand, it has poor performance in searching, tabulating or sorting on a considerable number of records.

For this reason, in recent years it has become typical to construct in the system a type of database called a data warehouse (DWH) in addition to the RDB, for the purpose of searching and tabulating. To wit, an extremely large-scale database equipped with specific data formats and data field names to match the specific purpose of the end user is constructed, and then the end user can use this to perform specific types of searches and tabulation.

However, providing a DWH in addition to the RDB, or namely providing a plurality of databases becomes estranged from the ideal form of the database used for centralized control of data, and particularly the ideal form of the RDB concept. This may give rise to the following various problems, for example.

(1) The DWH is fixed in format, so searching and tabulation on fields other than those provided in advance in the DWH are difficult.

(2) By providing a fixed-format DWH in addition to the RDB, the data size becomes extremely large, so it cannot handle RDB updates and the like.

The present invention has as its object to be able to perform quickly the joining of a plurality of tables of table-format data as desired, and also provide a structure for table-format data with a small data size, a concatenation method therefore, and a method for performing the extremely rapid display of concatenated table-format data.

SUMMARY OF THE INVENTION

The object of the present invention is achieved by providing a method of concatenating a plurality of tables of table-format data where each table is represented by an array of records containing a field and the field values contained therein, wherein said method is characterized in comprising the steps of: constructing each table of table-format data in a manner such that each table is divided into one or more information blocks consisting of: a value list in which the field values are stored in the order of a field value number corresponding to the field value belonging to a specified field, and a pointer array in which pointer values for pointing to said field value numbers are stored in a unique record order, finding equivalent fields among a plurality of tables of table-format data, identifying the information blocks for said equivalent fields, in each of said plurality of tables of table-format data, comparing the value lists contained in said identified information blocks, and setting both value lists to the same values, at the time of setting said value lists to the same values, adding pointer values to associated pointer arrays in the information block to which that field value is added, and by making the value lists contained in the information blocks for specific fields in said plurality of tables of table-format data equivalent, concatenating the table-format data.

By means of the present invention, value lists containing actual field values and pointer arrays that contain pointer values for specification the field values of said value lists are used to constitute an information block regarding a certain field, so table-format data is represented as a set of information blocks pertaining to various fields. Accordingly, when concatenating (namely, joining) a plurality of tables of table-format data, value lists within the information blocks among table-format data are found and the field values of the value list are set to the same values, and in response the associated pointer arrays are changed. Accordingly, it is possible to add the field values of a value list and add the accompanying pointer values (namely, share the value lists) without requiring any complicated processing, and thus two tables of table-format data can be concatenated.

In a preferred embodiment of the present invention, regarding information blocks containing value lists that have been made equivalent, only a single value list is actually saved. Namely, regarding the shared value lists, it is sufficient to save only one. Thereby, it is possible to reduce the memory size required. In addition, there is no massive processing required for joining, so the concatenation (joining) of table-format data can be implemented at very high speed.

The object of the present invention can also be achieved by a method of presenting concatenated table-format data characterized in comprising the steps of: preparing a plurality of tables of table-format data in which the value lists contained in information blocks for specific fields were made equivalent by means of the aforementioned concatenation method, regarding said plurality of tables of table-format data, among said information blocks for specific fields, identifying information blocks related to key fields in which the pointer values of the pointer array are not duplicated, and determining the table-format data containing said information blocks to be sub table-format data, in one of the information blocks, generating a second pointer array that identifies the record numbers of said sub table-format data in the order of the field values of the field list, among the information blocks contained in said plurality of tables of table-format data, identifying the information blocks related to the fields to be presented, among said information blocks related to fields to be presented, regarding information blocks that constitute the main table-format data which is the table-format data other than said sub table-format data, looking up pointer values within the pointer array corresponding to a stipulated record number and obtaining a stipulated field value, among said information blocks related to fields to be presented, regarding information blocks that constitute said sub table-format data, looking up record numbers corresponding to a stipulated record number and obtaining a record number regarding the sub table-format data within the corresponding said second pointer array, in the information block constituting said sub table-format data, looking up a pointer value within the pointer array corresponding to the record number regarding said sub table-format data, and obtaining a stipulated field value, and presenting the field value thus obtained.

By means of the present invention, regarding a plurality of tables of table-format data, when a user selects a specific field and requests its presentation, the plurality of tables of table-format data are concatenated and in the sub table-format data, a second pointer array that can identify the record numbers in the sub table-format data from the record numbers of the main table-format data (namely, reverse lookup is possible). Regarding the main table-format data, pointer values within the pointer arrays can be identified from the record numbers of the main table-format data, and moreover, the field values specified by said pointer values can be identified, so the desired field value can be found. On the other hand, regarding the sub table-format data, the record number of the sub table-format data can be identified from the record numbers of the main table-format data, and next, the pointer values within the pointer array and said pointer arrays can sequentially identify the specified field values, so the desired field value can be found. Accordingly, it is possible to select the desired field from the plurality of tables of table-format data and generate a joined table (view) at a high speed.

In order to identify the record number of said sub table-format data, in the information block related to said key field, it is sufficient to generate a second pointer array containing pointer values for specifying record numbers in the order of the field values of the field list contained in said information block. In this case, among the information blocks related to the fields to be presented, in information blocks that constitute the sub table-format data, looking up a pointer value within the pointer array corresponding to said stipulated record number, identifying the record number regarding the sub table-format data within the corresponding second pointer array, and in information blocks that constitute said sub table-format data, looking up a pointer value within the pointer array corresponding to said record number within said second pointer array, is sufficient to obtain a stipulated field value. This technique is described more specifically in Embodiment 1.

Alternately, in an information block that constitutes said main table-format data and that is an information block wherein its value list was made equivalent, generating a second pointer array containing pointer values for specifying record numbers of said sub table-format data in the order of the field values of the field list, identifying a record number regarding sub table-format data within said second pointer array corresponding to said stipulated record number, among said information blocks related to the fields to be presented, in information blocks that constitute said sub table-format data, looking up a pointer value within the pointer array corresponding to the record number regarding said sub table-format data, may be performed to obtain a stipulated field value (see Embodiment 2), or among the information blocks that constitute said sub table-format data, in at least the information block related to the field to be presented, generating a second pointer array containing pointer values for specifying record numbers of said sub table-format data in the order of the field values of the field list, and among the information blocks related to the fields to be presented, in information blocks that constitute the sub table-format data, looking up a pointer value within the pointer array corresponding to said stipulated record number, identifying the record number regarding the sub table-format data within the corresponding second pointer array, and in information blocks that constitute said sub table-format data, looking up a pointer value within the pointer array corresponding to said record number within said second pointer array may be performed to obtain a stipulated field value (see Embodiment 3).

Another embodiment of the present invention further comprises: in information blocks in which the field values are to be sorted according to a stipulated order, generating a count that indicates the number of records related to the main table-format data in a count array corresponding to the field value, generating a position indicating array that indicates the initial value of the position at which the record numbers regarding said main table-format data are stored according to said count array, placing the record numbers of said main table-format data according to the position indicating array at the position indicated by the corresponding pointer value, and also, incrementing the value corresponding to said position indicating array, thereby generating a sort array in which the record numbers of the main table-format data are sorted and stored, and obtaining the required field vales in the order of record numbers stored in said sort array, and presenting the field values sorted based on said key field.

For example, in the case in which the field on which to sort is the key field, it is sufficient to, in the information block regarding the key field, generate a count array that stores a count that indicates the number of pointer values within a pointer array of an information block that constitutes said main table-format data and that is an information block wherein its value list was made equivalent to said information block, in the order of the value list within the information block for said key field. In other cases, it is sufficient to, in information blocks in which said field values are to be sorted using a pointer array within the information block that constitutes the main table-format data equivalent to the information block regarding the key field, and said second pointer array, generate a count array that stores a count that indicates the number of records regarding main table-format data.

In another embodiment of the present invention, preparing a plurality of tables of table-format data in which the value lists contained in information blocks for specific fields were made equivalent by means of the method of presented concatenated table-format data, and regarding said plurality of tables of table-format data, among said information blocks for specific fields, determining the table-format data in which the default sort order at the time of presentation is reflected to be master table-format data, and determining all other table-format data to be slave table-format data, in an information block that constitutes said slave table-format data and that is an information block wherein its value list was made equivalent, generating a first count array that stores a count that indicates the number of records regarding the slave table-format data corresponding to the field value, according to said first count array, generating a first position indicating array that determines the initial position for placement of said slave table-format data in the state when the record numbers are sorted, placing the record numbers of said slave table-format data according to the first position indicating array at the position indicated by the corresponding pointer value, and also, incrementing the value corresponding to said position indicating array, thereby generating a first sort array in which the record numbers of the main table-format data are sorted and stored, and looking up the initial value and final value of said position indicating array, and the pointer array within the information block wherein its value list was made equivalent regarding said master table-format data, detecting the degree of duplication of the pointer array of the other information block regarding said master table-format data, and expanding the pointer array according to said degree of duplication, looking up the initial value and final value of said position indicating array, and said sort array, detecting the degree of duplication of the pointer array of the information block regarding said master table-format data, and expanding the pointer array according to said degree of duplication, can be performed to obtain and present the required field value based on said expanded pointer array.

This embodiment can be applied to the case in which a key field cannot be found regarding the table-format data. In this case, determine the table-format data in which the default sort order at the time of presentation is reflected to be master table-format data, and determine all other table-format data to be slave table-format data. By means of this embodiment, this is expanded according to the degree of duplication of the pointer array and the field value is identified according to the expanded pointer array. Accordingly, even in the case of joining table-format data in which a certain field value is used in duplicate, it is possible to manipulate only the sort array and pointer array to create appropriate tables (views) without requiring any complicated processing.

In order to reduce the memory size of the main table-format data, it is sufficient to generate a first conversion array wherein the record numbers of the master table-format data are duplicated based on said degree of duplication and placed, and regarding said master table-format data, look up the array of pointers to the value list of the information block according to said first conversion array, and fetch the field value of the list. In addition, in order to reduce the memory size of the slave table-format data, it is sufficient to generate a second conversion array wherein the record numbers of said master table-format data, and the record numbers of the slave table-format data are duplicated based on the associated degree of duplication and placed, and regarding said slave table-format data, look up the array of pointers to the value list of the information block according to said second conversion array, and fetch the field value of the list (see Embodiment 5).

Moreover, in another embodiment of the present invention, a plurality of tables of table-format data are prepared in which the value lists contained in information blocks for two or more specific fields were made equivalent by means of the method of presenting concatenated table-format data, and regarding said plurality of tables of table-format data, among said information blocks for specific fields, by determining the table-format data in which the default sort order at the time of presentation is reflected to be master table-format data, and determining all other table-format data to be slave table-format data, regarding said master table-format data, generating an array of pointers to a virtual value list which is a product set of the two or more value lists that were made equivalent, regarding said slave table-format data, generating a second array of pointers to said virtual value list, generating a third pointer array that identifies the record number of said slave table-format data in the order of the field values of said virtual value list, among the information blocks contained in said plurality of tables of table-format data, identifying those information blocks regarding fields to be presented, among said information blocks regarding fields to be presented, regarding the information blocks that constitute table-format data, looking up the pointer value within the pointer array corresponding to a stipulated record number, obtaining a stipulated field value, among said information blocks regarding fields to be presented, regarding the information blocks that constitute said sub table-format data, looking up the record number corresponding to a stipulated record number, and identifying the record number of said slave table-format data within said third pointer array based on the corresponding pointer value within the array of pointers to said virtual value list, in said information block constituting said slave table-format data, looking up the pointer value within the pointer array corresponding to the record number regarding said slave table-format data, and obtaining a stipulated field value, it is possible to present the field value thus obtained.

This embodiment is applicable to the case that requires the joining a plurality of fields in a plurality of tables of table-format data, and finding a stipulated table (view). By means of this embodiment, the pointer array is created with respect to the value list which is a product set of the field values of a plurality of fields. Accordingly, there is no need to actually create a value list which is a product set expected to occupy an enormous capacity, but rather it is possible to obtain a table (view) in the state with a plurality of fields joined at extremely high speed by merely generating a pointer array.

In the event that there are two of said information blocks that have value lists that were made equivalent, and p is the number of field values in the value list that was made equivalent regarding one information block, while q is the number of field values in the value list that was made equivalent regarding the other information block, the pointer value $Pm_i$ ($0 \leq i \leq p-1$) to said virtual value list regarding said master table-format data is expressed as follows:

$$Pm_i = Pm_{1i} * q + Pm_{2i}$$

(where $Pm_{1i}$ is the field value of the value list regarding one of the information blocks, and $Pm_{2i}$ is the field value of the value list regarding the other information block), and the pointer value $Ps_j$ ($0 \leq j \leq p-1$) to said virtual value list regarding said slave table-format data is expressed as follows:

$$Ps_j = Ps_{1j} * q + Ps_{2j}$$

(where $Ps_{1j}$ is the field value of the value list regarding one of the information blocks, and $Ps_{2j}$ is the field value of the value list regarding the other information block)

Still another method of joining a plurality of fields in a plurality of tables of table-format data to obtain the field values of the desired field is by preparing a plurality of tables of table-format data in which the value lists contained in information blocks for two or more specific fields, and regarding said plurality of tables of table-format data, among said information blocks for specific fields, determining the table-format data in which the default sort order at the time of presentation is reflected to be master table-format data, and determining all other table-format data to be slave table-format data, regarding said master table-format data and master table-format records respectively, generating a first sort array by sorting said record numbers on a field other than the field in which the default sort order is reflected, and finally sorting said record numbers on the field in which said sort order is reflected, looking up the record numbers within said first sort array, and fetching the respective corresponding field values of the two or more value lists regarding said two or more fields, storing the field values thus fetched in a multidimensional array at positions corresponding to a multidimensional list containing field values consisting of multidimensional arrays of two or more field values, storing said record numbers in positions corresponding to said record numbers in the pointer arrays for identifying the multidimensional arrays of said multidimensional value list, in one of the information blocks, generating a second pointer array that identifies the record numbers of said slave table-format data in the order of the field value of the value list, among said information blocks regarding fields to be presented, regarding the information blocks that constitute said master table-format data, looking up the pointer value of a pointer array for identifying multidimensional value lists corresponding to a stipulated record number and/or pointer values of other pointer arrays, and obtaining a stipulated field value, among said information blocks regarding fields to be presented, regarding the information blocks that constitute said slave table-format data, looking up the record number corresponding to said stipulated record number, and identifying the record number regarding the slave table-format data within said corresponding second pointer array, in said information blocks that constitute said sub table-format data, looking up the pointer value of a pointer array for identifying multidimensional value lists corresponding to a record number regarding said slave table-format data, and/or pointer values within pointer arrays, and obtaining a stipulated field value, and thus presenting the field value thus obtained.

By means of this embodiment, there is no need to provide the pointer array to the virtual value list, so it is possible to reduce the required memory size even further.

In addition, the object of the present invention may also be achieved by a recording medium recorded with a program that can implement the aforementioned methods, or a table-format data concatenation apparatus or a table-format data presentation apparatus consisting of means that implement the steps of the aforementioned methods.

BRIEF EXPLANATION OF THE DRAWINGS

This and other objects of the present invention will be made clear in reference to the appended drawings and embodiments. Here:

FIGS. 3A to 3D are diagrams illustrating examples of table-format data, and examples of an information block based on this table-format data.

FIGS. 4A to 4C are diagrams illustrating another examples of table-format data, and examples of an information block based on this table-format data.

FIG. 6 is a flowchart used to describe the process of creating an information block based on table-format data.

FIGS. 7A and 7B are diagrams showing examples of original data used for creating an information block.

FIGS. 8A to 8C are diagrams showing two tables of table-format data.

FIGS. 9A to 9F are diagrams showing information blocks based on the table-format data shown in FIGS. 8A to 8C.

FIGS. 18A and 18B are diagrams showing examples of views sorted on a specific field.

FIGS. 19A and 19B are diagrams showing arrays of pointers according to Embodiment 2.

FIGS. 21A to 21C are diagrams showing examples of table-format data (tables) used in Embodiment 4.

FIG. 22 is a flowchart showing the processing according to Embodiment 4.

FIG. 23 is a diagram used to explain the sharing of value lists according to Embodiment 4.

FIGS. 29A to 29D are diagrams showing information blocks for creating joined tables (views) according to Embodiment 4.

FIGS. 30A and 30B are diagrams used to describe conversion arrays provided on the master table side according to Embodiment 5.

FIGS. 32A to 32C are diagrams showing one example of the creation of conversion arrays on the master table side according to Embodiment 5.

FIG. 38 is a diagram used to explain the virtual value lists according to Embodiment 6, and the array of pointers to these value lists.

FIG. 39 is a diagram used to explain the virtual value lists according to Embodiment 6, and the array of pointers to these value lists.

DESCRIPTION OF THE PREFERRED EMBODIMENT

[Schematic Structure]

Figure 1:
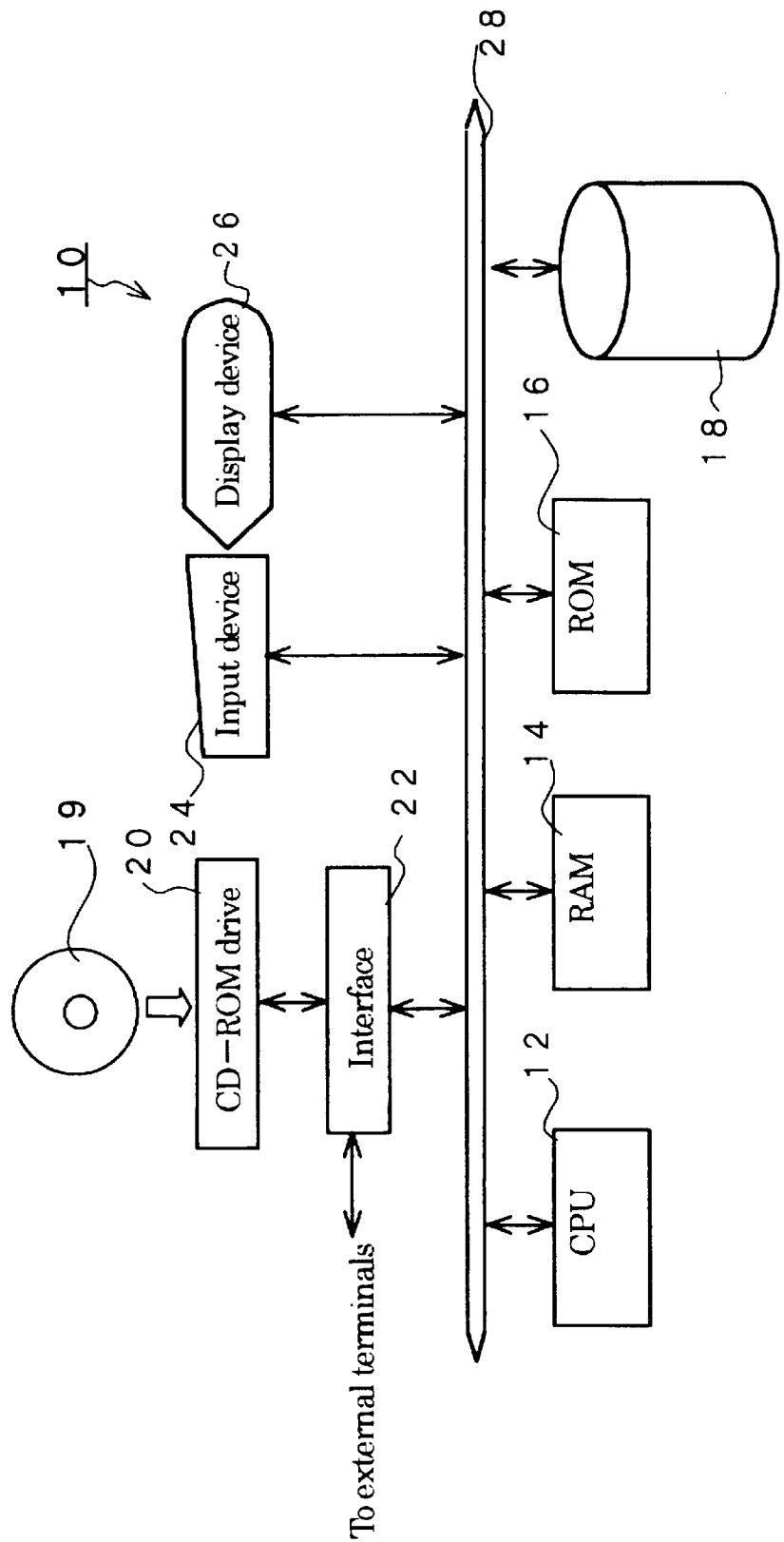
FIG. 1 is a block diagram showing the hardware configuration of a computer system that is able to implement the retrieval, tabulation and search methods according to an embodiment of the present invention.

Here follows a description of the embodiments of the present invention made with reference to the appended drawings. FIG. 1 is a block diagram showing the hardware configuration of a computer system that is able to implement the retrieval, tabulation and search methods according to an embodiment of the present invention. As shown in FIG. 1, this computer system 10 has the same configuration as that of an ordinary computer, consisting of a CPU 12 which controls the entire system and its individual components by executing a program, random access memory (RAM) 14 which stores working data and the like, read only memory (ROM) 16, hard disk or other fixed storage device 18, CD-ROM drive 20 for accessing a CD-ROM 19, interface (I/F) 22 provided for the CD-ROM drive 20 and external terminals connected to an external network (not shown), a keyboard, mouse or other input device 24 and a CRT display device 26. The CPU 12, RAM 14, ROM 16, external storage medium 18, interface 22, input device 24 and CRT display device 26 are connected to each other via a bus 28.

According to the embodiment, the program for concatenating (joining) table-format data, program for creating tables (views) of the stipulated fields from the concatenated table-format data, searching program, tabulating program and sorting program may be contained on the CD-ROM 19 and read by the CD-ROM drive 20, or stored in advance in ROM 16. In addition, once read from the CD-ROM 19, the program may also be stored in a specific area of the external storage medium 18. Alternately, the aforementioned programs may also be supplied from outside via the network (not shown), external terminals or interface 22.

In addition, in this embodiment, in order to execute searching, tabulating and sorting quickly, as described later, it is necessary to generate an information block of a stipulated data format. This information block generation program may be similarly contained on CD-ROM 19, stored in ROM 16, or stored on the external storage medium 18. Alternately, these programs may also naturally be supplied from outside via the network (not shown). In addition, in this embodiment, the data (information blocks) generated by the aforementioned information block generating program that generates the information blocks are stored in RAM 14 or in a specific area of the external storage medium 18.

[Principles of Data Control and Processing]

Next, we shall describe the data format prerequisite to the present invention and the principles of searching, tabulating and sorting. In order to achieve extremely high-speed processing the present inventors thought of the construction of table-format data that has a specific data format and a method of searching, tabulating and sorting (PCT application No. WO00/10103). In the present invention also, fundamentally, table-format data is constructed based on this application as a stipulated set of information blocks and searching, tabulating and sorting are performed using them.

Figure 2:
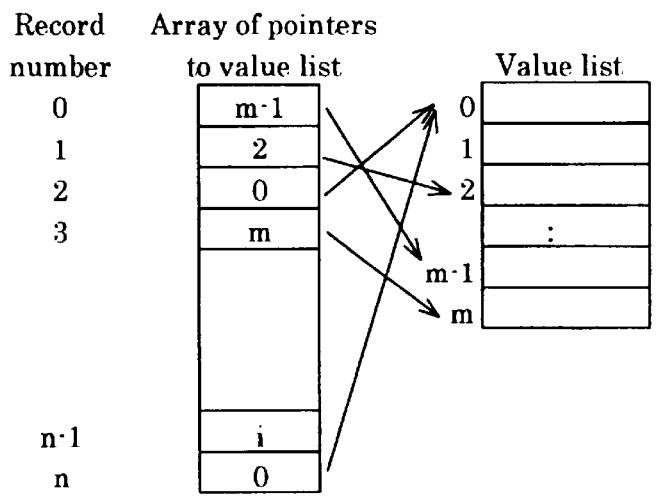
FIG. 2 is a diagram illustrating an information block used in an embodiment of the present invention.

FIG. 2 is a diagram illustrating an information block used in an embodiment of the present invention. As shown in FIG. 2, an information block 100 contains a value list 110 and an array of pointers to the value list 120. The value list 110 is a table containing, for each of the fields of table-format data, field values 111 corresponding to field value numbers in the order of the field value numbers which are assigned (integrally assigned) based on the field values belonging to that field. The array of pointers to the value list 120 is an array containing the field value number of a column (namely a field) in the table-format data, or namely pointers to the value list 110 in the table-format data record number order.

By combining the aforementioned array of pointers to the value list 120 and value list 110, given a certain record number, it is possible to get the field value number stored corresponding to that record number from the array of pointers to the value list 120 for a certain field, and then get the field value stored corresponding to that field value number within the value list 110, and thus obtain the field value from the record number. Accordingly, it is possible to refer to all data (field values) using the record number (row) and field (column) in the same manner as a conventional data table.

For example, consider the table-format data shown in FIG. 3A. In this example, various field values are given to the fields of Customer ID, Customer name and Telephone number. In this embodiment, such table-format data is stored as information blocks of the format indicated in FIGS. 3B through 3D. For example, in FIG. 3B, pointer array 120-1 is associated with value list 110-1 which contains the field values indicating the Customer ID. To wit, the pointer value of the pointer array for the first record (record number "0") is 0, and the corresponding field value of "1" indicating the Customer ID is obtained. In FIG. 3C, pointer array 120-2 is associated with value list 110-2 which contains the field values indicating the Customer name. For example, the pointer value of the pointer array for the first record (record number "0") is 0, and the corresponding field value of "Washington" indicating the Customer name is obtained. In FIG. 3D also, one can see that pointer array 120-3 is similarly associated with value list 110-3 which contains the field values indicating the Telephone number. In addition, one can also see that the field values are applied in sequential order (ascending order in this example) in each value list. For example, when ascending order is adopted, for numbers, the field values within the value list are stored starting with the smallest. In addition, the field values are stored in "aiueo" order for the Japanese language and alphabetic order for the English and other languages.

Moreover, in this embodiment, the value control table of information block 100 contains the value list 110 along with a category number flag array used for searches and tabulation, a start position array that indicates the starting address of the memory space to store pointers corresponding to the field values, and the count array. The various flags of the category number flag array and the counts of the count array are each associated to a field value. The flag values of the category number flag array are normally "0" but are set to "1" corresponding to field values to be found at the time of searching and tabulation. In addition, the count corresponds to the number of records that have field values. Note that the start position corresponds to the one found by adding the count corresponding to the point value smaller than the corresponding pointer value, and need not necessarily be provided.

FIG. 4A is a diagram illustrating another example of table-format data, while FIGS. 4B and 4C are diagrams illustrating information blocks regarding "sex" and "age." As shown in FIG. 4B, the value control table 210-1 of the information block regarding sex 200-1 contains the field values corresponding to the various pointer values ("Male" and "Female") of pointer array 220 and category numbers, start positions and counts corresponding to the various field values. For example, the number of records in which the pointer value is "0" (namely, the field value in the value list is "Male") is 632564, and on the other hand, the number of records in which the pointer value is "1" (namely, the field value in the value list is "Female") is 667426. In addition, the start positions corresponding to the various field values indicate the starting address in the array of pointers to records 230-1 (to be described later). One can see that the same goes for FIG. 4C.

Figure 5:
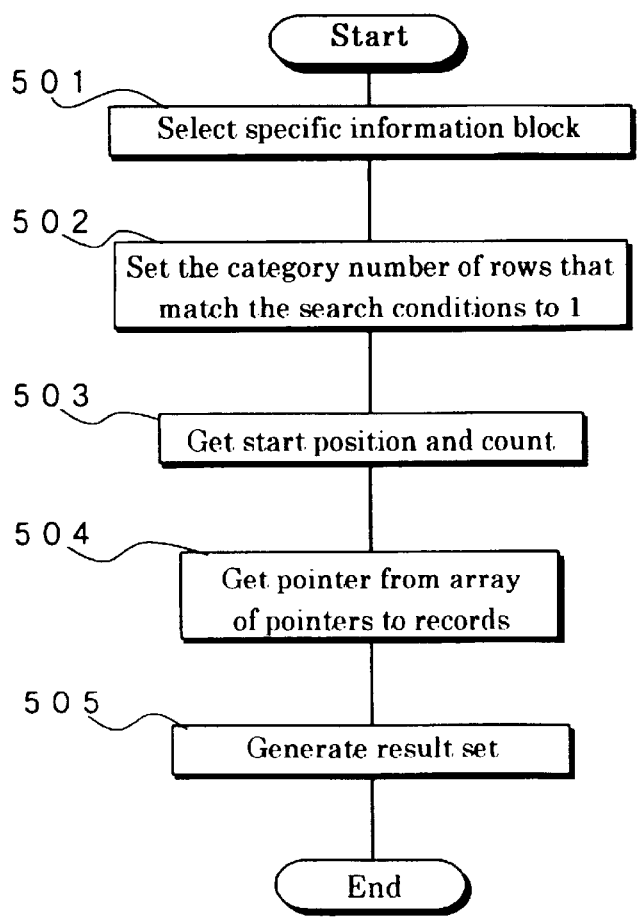
FIG. 5 is a flowchart showing the method of searching on a single field.

Here follows a description of one example of a search using an information block having such a data structure and the process of generating the information block. FIG. 5 is a flowchart showing the method of searching on a single field. This process is implemented by the CPU 12 (see FIG. 1) executing a stipulated search program. In this example, we shall search for records in which the value of the "age" field is 16 or 19. First, among the information blocks regarding table-format data, the information block regarding "age" 200-2 shown in FIG. 4C is specified (Step 501).

Next, in the value list 210-2 of the information block thus specified (hereinafter referred to as the "specified information block"), "1" is set as the category number of rows in which the field value matches the aforementioned search conditions (16 or 19) (Step 502). In the case of this example, "1" is set as the category number of rows corresponding to a field value number of "0" or a field value of "3." Next, the start position and count corresponding to rows in which the category number is set to "1" are obtained (Step 503). This information is called the pointer fetch information. In the array of pointers to records, based on the pointer fetch information obtained in Step 503, record numbers that indicate pointers to records that match the search conditions are obtained (Step 504). In this example, one can see that the record pointers corresponding to the field value number of "0" are stored in a region of the array of pointers to records from the start position of "0," or namely the beginning, to a position sufficient to contain 45898 pointers. On the other hand, the record pointers corresponding to the field value number of "3" are stored in a region of the array of pointers to records from the 2383137$^{th}$ pointer to a position sufficient to contain 189653 pointers. Finally, in order for it to be used in subsequent processing, an array of fetched record numbers is created as a result set and this is saved (Step 505).

In addition, tabulation and sorting can also be implemented by utilizing the category number, start position and count.

Here follows a description of the process of generating the information blocks used for the aforementioned search processes and the like. FIG. 6 is a flowchart used to describe the process of creating an information block based on table-format data. First, the system 10 gets table-format original data and categorizes this by field (Step 601). This original data may be that as shown in FIG. 7A or that as shown in FIG. 7B. These original data may be supplied from outside or may be stored in the external storage medium 18. A processing block 610 consisting of Step 602 through Step 604, to be described later, generates an information block regarding a single field. Accordingly, when generating information blocks regarding a plurality of fields, the processing corresponding to processing block 610 is executed the same number of times as the number of fields. Here follows a description of the generation of the information block regarding "sex" as an example.

First a region is allocated in RAM 14 for the information block regarding the "sex" field (Step 602). Next, a value control table is generated in this allocated region. To be more specific, the value control table is initialized. Next, within the original data, all data regarding "sex" is operated upon from the start to end to find how many instances of which field names are present. In this example, the field names "Female" and "Male" were found 367436 and 632564 times, respectively. Thus the field values of "Female" and "Male" are set in the value list and the appropriate numbers were also set in the Count column. Thereafter, the field values are sorted according to the appropriate standard. At the time of sorting, the counts are also reordered as the field numbers are reordered. Next, the values of the Start position column are determined. These are found by taking the sum of the Counts in the positions higher than that row in the sort. In addition, the value of the Start position column is assigned to the value of the corresponding Category number column. This value is used in the next step. After the value control table is generated in this manner, the array of pointers to records is generated. The size of the region for this pointer array corresponds to the overall total of the counts.

In this manner, it is possible to create an information block for the appropriate field. By performing this generation of information blocks in advance, the information blocks thus generated are used to perform the processes of searching, tabulation and sorting.

[Embodiment 1]

Here follows a description of the process of combining two tables of table-format data (executing the JOIN (join) process), the process of creating a single table (view), and the process of searching for, tabulating and sorting on the desired fields from the view thus created.

For example, consider the two tables of table-format data shown in FIGS. 8A to 8C. In FIG. 8A, each customer ID is assigned to a customer name, telephone number and SVC-ID (Service ID). On the other hand, in FIG. 8B, dues are assigned to each Service ID. "Washington" with a customer ID of "1" is assigned a SVC-ID of "D" and upon looking up the "D" service ID in the service table, one sees that his dues are "12,000" yen. Similarly, by looking up the SVC and service ID for each of the other customers, it is possible to determine their dues. FIG. 8C shows a table-format view of the customer ID, customer name and dues. As one can see from FIG. 8C, in this view, the "SVC-ID" field has duplicate values (in SVC-ID for example, the field values "C" and "D" appear multiple times), so the invoice amount is displayed via the so-called key field "Service ID" which has no duplicate values. This is called the "many:1" type in consideration of the fact that fields having no duplicate values (="1") are derived from fields having duplicate values (="many" or "multi"). In addition, in this Specification, the table-format data on the aforementioned "many" side is called "main table-format data" and table-format data on the "1" side is called "sub table-format data."

Here follows a description of the method of joining two tables of table-format data of the "many:1" type. In this embodiment, an information block as shown in FIG. 9 is generated in advance from the two tables of table-format data shown in FIG. 8 by the technique illustrated in FIG. 6. Note that FIGS. 9A through 9D are information blocks regarding the customer table shown in FIG. 8A, while FIGS. 9E and 9F are information blocks regarding the service table shown in FIG. 8B. In addition, only a list is shown in these figures.

Figure 10:
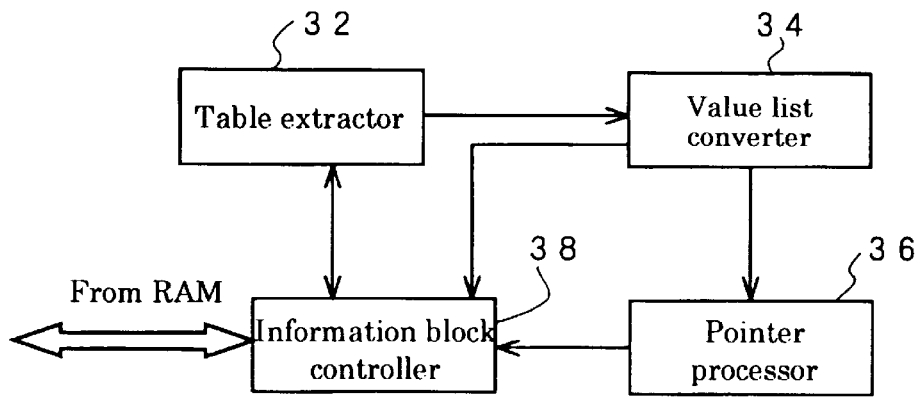
FIG. 10 is a block diagram showing one example of the functions executed in the CPU according to one embodiment of the present invention.
Figure 11:
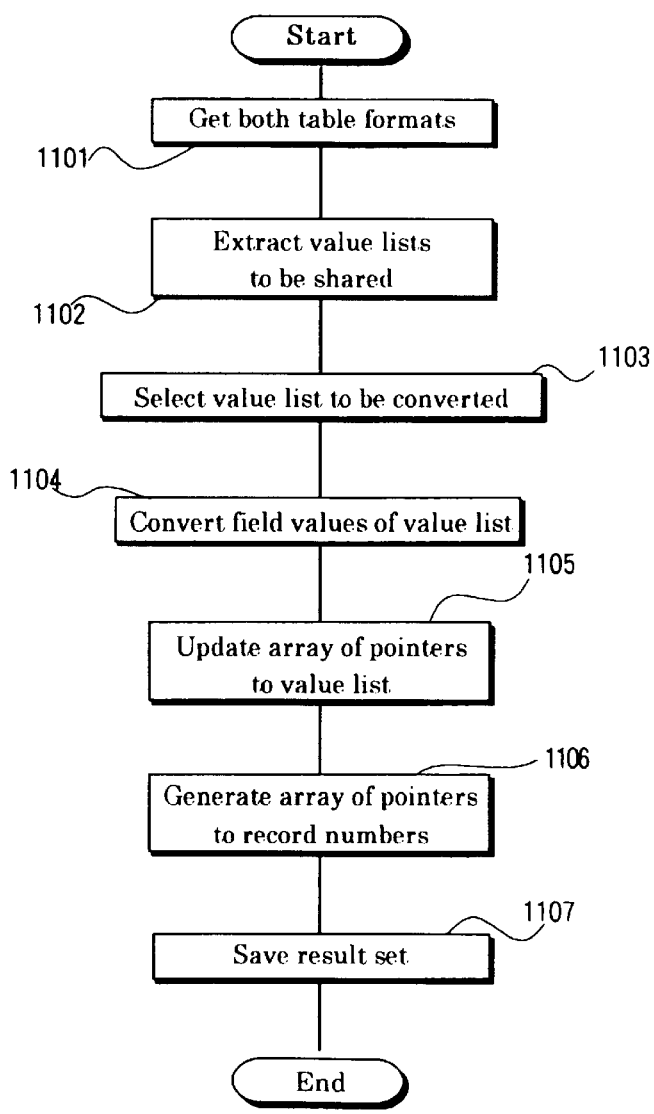
FIG. 11 is a flowchart showing the process of sharing a value list according to one embodiment of the present invention.

While only the SVC-IDs of B, C and D are used in the customer table, service IDs of A, B, C and D are used in the service table. Accordingly, it is necessary to share the value list within the information block for "SVC-ID" and the value list within the information block for "Service ID." FIG. 10 is a functional block diagram for the CPU 12 according to this embodiment. FIG. 11 is a flowchart showing the process of sharing a value list. As shown in FIG. 10, the CPU 12 is provided with a table extractor 32 that looks up information blocks and extracts value lists to be shared, a value list converter 34 that shares value lists, a pointer processor 36 that converts the pointer values of arrays of pointers to value lists and also generates other necessary pointer arrays, and an information block controller 38 that exchanges data with the RAM 14 or the like.

As shown in FIG. 11, first the information block controller 38 gets both information blocks regarding table-format data from RAM 14 (Step 1101). Next, the table extractor 32 looks up value lists in the information blocks and extracts the value lists to be shared (Step 1102). In the example shown in FIGS. 8A to 8C and FIGS. 9A to 9F, the value list of the information block for "SVC-ID" regarding the customer table is extracted, and the value list of the information block for "Service ID" regarding the service table is extracted.

Figure 12:
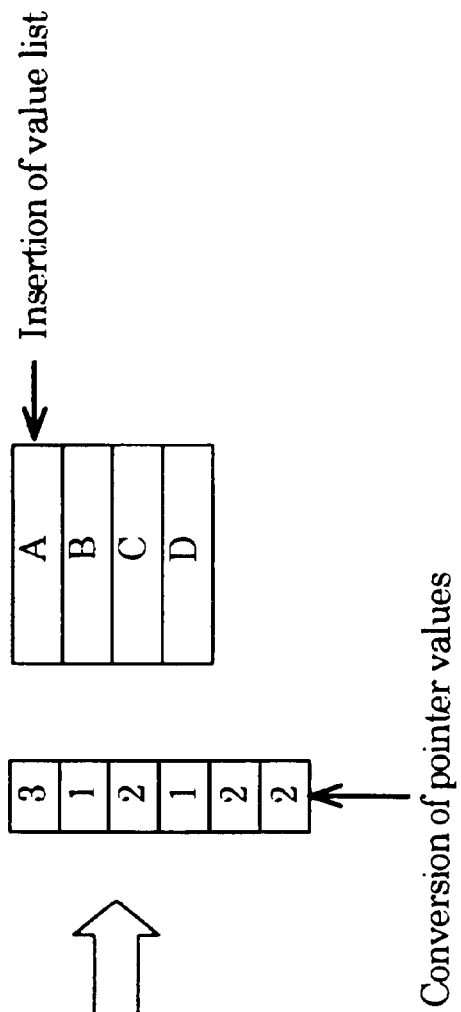
FIG. 12 is a diagram showing a portion of the process shown in FIG. 11 in more detail, regarding the example shown in FIGS. 8A to 8C and FIGS. 9A to 9F.

Thereafter, the value list converter 34 selects those of the two value lists to be shared that require conversion of field values, etc. (Step 1103) and then performs the insertion of field values in reference to the other value list. In the example shown in FIGS. 8A to 8C and FIGS. 9A to 9F, the field values in the value list regarding "SVC-ID," which is a field that has duplicate values, require conversion. The value list converter 34 finds those field values of the value list regarding the key field "Service ID" that are not included in the value list of "SVC-ID." Next, the value list converter 34 inserts the field values thus found into the value list regarding "SVC-ID" in accordance with the stipulated order (Step 1104). On the other hand, with the insertion of field values into the value list, it is necessary to change the pointer array containing pointer values to the value list. Accordingly, with the conversion of the value list, the pointer processor 36 generates pointer values for the pointer array corresponding to the value list in which the field values were converted (Step 1105). FIG. 12 is a diagram used to describe the process executed in Step 1104 and Step 1105 regarding the example shown in FIGS. 8A to 8C and FIGS. 9A to 9F. In the information block for "SVC-ID" in which the insertion of field values into the value list and the changing of pointer values in the pointer array must be performed, the field value "A" is inserted into the value list. Because the field values are arranged in ascending order in this embodiment, the field value "A" is inserted into the first row. Since a new field value is created on the first row, the value "1" is added to the pointer values in the pointer array. In the aforementioned example, one field value is inserted at the top, but it need not be said that a plurality of field values may be inserted at any positions. In this case, the value of each pointer need merely be increased by the number of field values inserted in the interval from the beginning to position of that pointer.

After the sharing of value lists is completed in this manner, in order to create a view consisting of two joined tables of table-format data, or in order to enable high-speed search, tabulation and sort processes, appropriate processing of the information block regarding the service table is performed. The pointer processor 36 generates from the value lists of other tables (namely, tables in which the changing of value lists or pointer arrays is not performed) a pointer array that indicates record numbers (array of pointers to record numbers) (Step 1106). This array of pointers to record numbers is generated within an information block that contains, among the fields to be displayed in the joined table (view), those that do not have shared lists with the other table.

More specifically, the pointer processor 36 first prepares an array of the same size as the array of pointers to the value list, scans the pointer values in the array of pointers to the value list from the beginning, and if the value of the "$1^{th}$" pointer is "j" then executes a process that stores the value "i" in the "$j^{th}$" element of the array thus prepared. The pointers to record numbers are generated in this manner. The information block controller 38 takes the information block with the new pointer array added and stores it in the appropriate region of RAM 14 (Step 1107).

Note that in the aforementioned sharing process, the value lists of the two tables share a common meaning, so naturally it is necessary to save only one of the value lists.

After sharing the appropriate value lists in this manner, or namely unifying the meaning of the value list for both tables of table-format data, the "view creation process" for creating a view containing only the desired fields, search process, tabulation process or sort process may be executed.

Figure 13A:
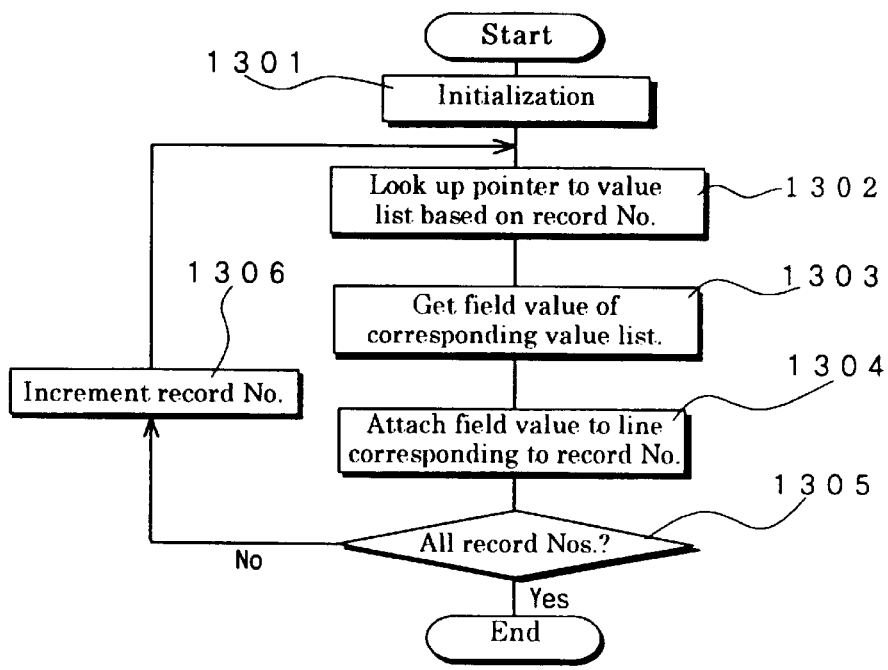
FIGS. 13A and 13B are flowcharts showing the process of creating views according to one embodiment of the present invention.
Figure 13B:
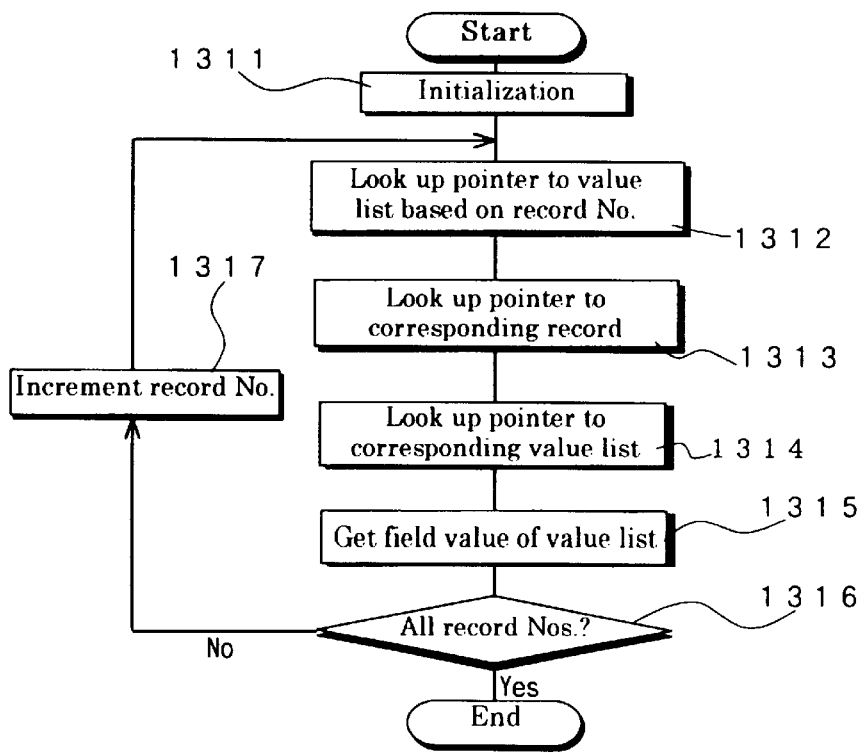
Figure 14:
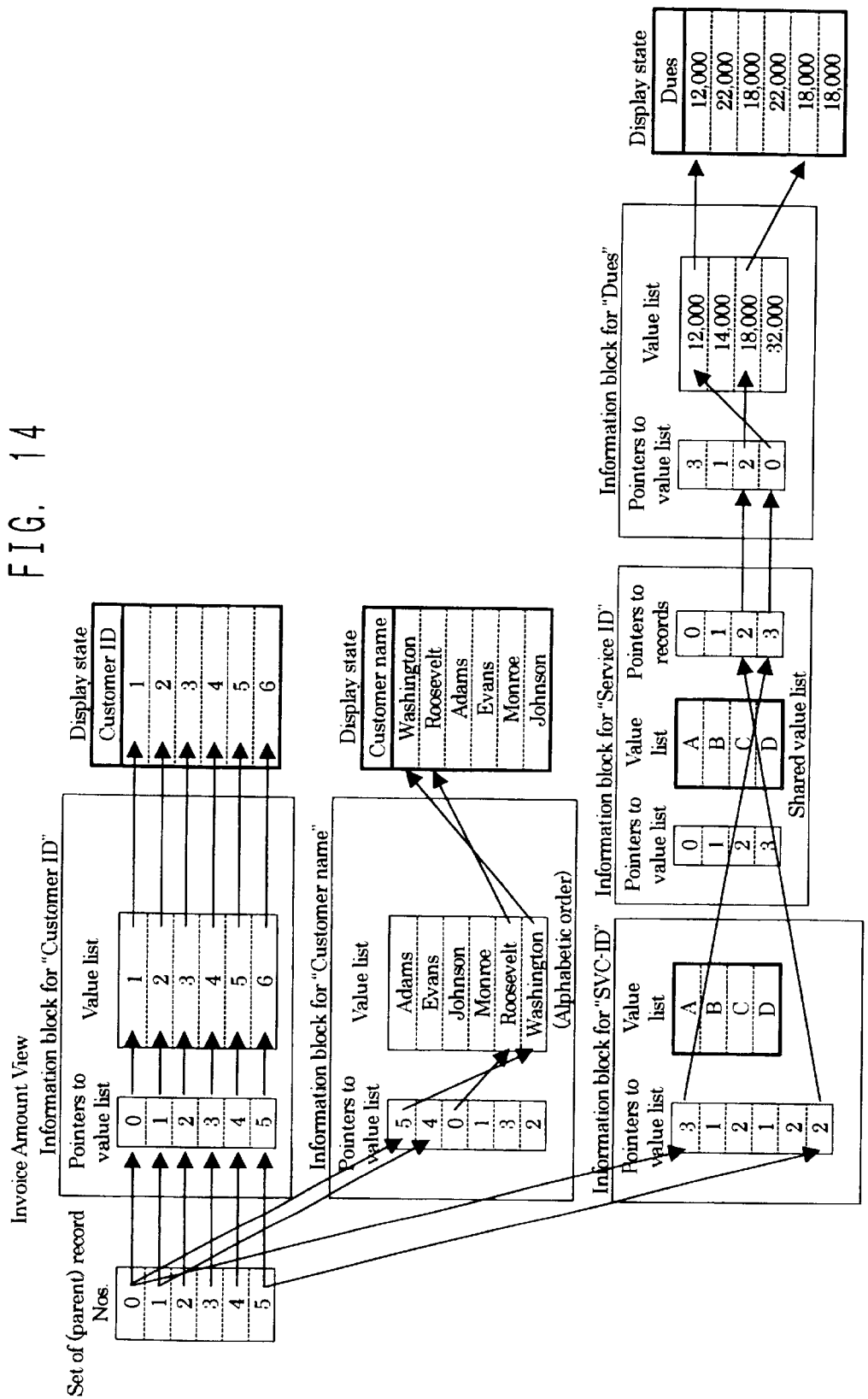
FIG. 14 is a diagram used to describe views created according to FIGS. 13A and 13B.

Here follows a description of the view creation process. FIGS. 13A and 13B are flowcharts showing the view creation process. FIG. 14 is a diagram used to describe the process of displaying views regarding the "Customer ID," "Customer name" and "Dues."

Here, FIG. 13A illustrates the process in the case of displaying related field values within a value list based on the pointer array. FIG. 13B illustrates the process in the case of displaying related field values in another value list based on the shared value list. To describe the processing related to the display of the "Customer ID" shown in FIG. 14 for example, first the record number is initialized (Step 1301). Next, in the information block for "Customer ID," within the array of pointers to the value list, look up the pointer value of "0" on the row corresponding to record number "0" (Step 1302) and read the corresponding field value of "1" (Step 1303). Accordingly, the uppermost field in the customer ID becomes "1" (Step 1304). The processing of the aforementioned Steps 1302–1304 is repeated for all record numbers (see Steps 1305 and 1306). The same processing is also performed for the "Customer name" display. More specifically, look up the pointer value of "5" positioned on the row corresponding to the record number "0" and read the corresponding field value of "Washington." Thereby, the value at the beginning of the table (view) becomes "Washington."

On the other hand, in the case regarding shared value lists, namely, in the case of using the "SVC-ID" and "Service ID" pointers or the like, as shown in FIG. 13B, the record number is initialized (Step 1311), and the pointer value of "3" to the value list of the row corresponding to the record number "0" is looked up (Step 1312). Next, regarding the shared information block (in this case, the information block for "Service ID"), in the array of pointers to record numbers generated previously (see Step 1106 of FIG. 11), the pointer value positioned at the row indicated by the pointer value "3" is looked up (Step 1314). The pointer value looked up in Step 1314 is obtained by "reverse lookup" so the required field value can be obtained via pointers to the value list of another information block positioned on a row corresponding to this pointer value.

In the aforementioned example, based on the value of "3" as the pointer to record numbers, in the information block for "Dues," the pointer value of "0" is found in the array of pointers to the value list in the row corresponding to the record number of "3," so the corresponding field value of "12,000" can be fetched. Accordingly, the field on the uppermost side in the table becomes "12,000." By repeating the process of the aforementioned Steps 1213–1315 (see Steps 1216 and 1317), all of the fields in the Dues column can be obtained. In this manner, it is possible to obtain the table (invoice amount view) as shown in FIG. 8C.

Figure 15:
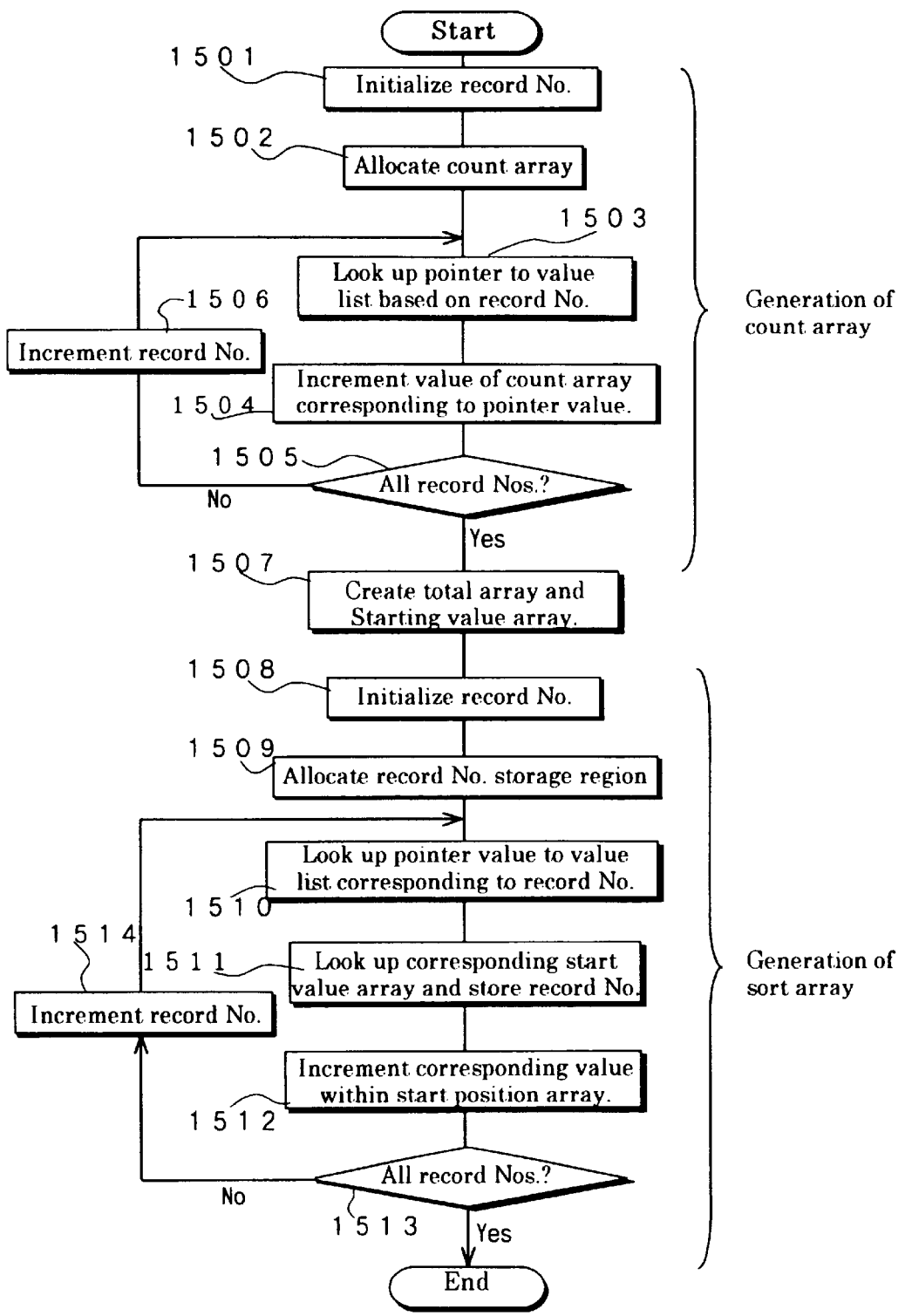
FIG. 15 is a flowchart showing the process of obtaining a table sorted on the required fields according to one embodiment of the present invention.
Figure 16A:
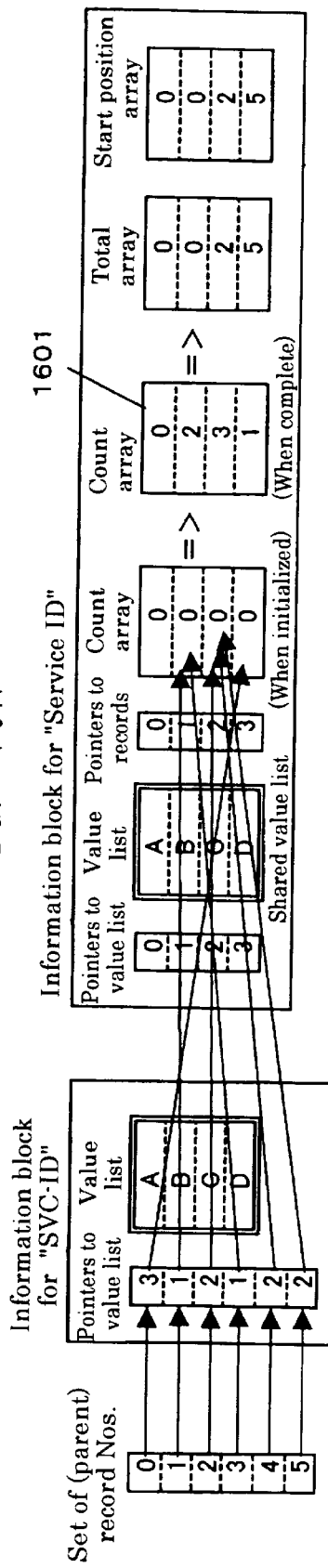
FIGS. 16A and 16B are diagrams used to describe the process of displaying views related to the "Customer ID," "Customer name" and "Dues" and a view sorted based on the "Service ID."
Figure 16B:
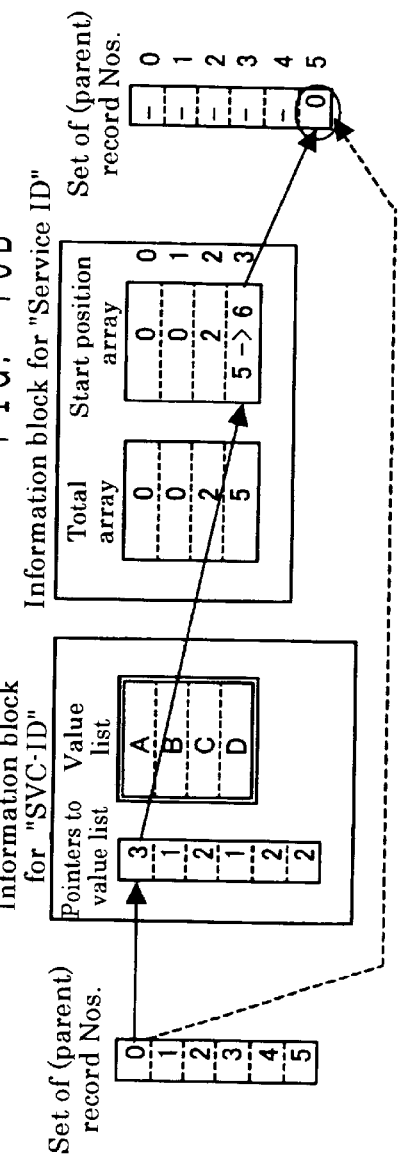

Next, we shall describe the process of obtaining a table sorted on the required field. FIG. 15 is a flowchart showing the content of this process. Specifically, FIGS. 16A and 16B are diagrams used to describe the process of displaying views related to the "Customer ID," "Customer name" and "Dues" and a view sorted based on the "Service ID." This process consists of the generation of the count array, etc. (Step 1501 through Step 1507) and the generation of the sort array (Step 1508 through Step 1513). First, the record number is initialized (Step 1501) and a count array having the same number of rows as the number of rows (number of fields) in the value list is allocated (Step 1502). Next, a certain record number is looked up in the value list pointer array (Step 1503) and the value (count) in the count array on the row corresponding to the pointer value is incremented (Step 1504). In FIG. 16A for example, "3" is the value of the pointer in the array of pointers to the value list corresponding to the record number of "0" and accordingly, the value (count) in the corresponding row (row 4) within the count array is changed from "0" to "1." Or, "1" is the value of the pointer in the array of pointers to the value list corresponding to the record number of "2" and thus the value in the corresponding row (row 2) within the count array is changed from "0" to "1." By performing the process shown in Step 1503 and Step 1504 for all record numbers in this manner (see Step 1505 and Step 1506), the count array indicated by the symbol 1601 in FIG. 16A is created.

When the count array is complete, based on this, a start position array which indicates the position in the memory space where the total array and sorted record numbers are to be positioned is generated (Step 1507). This total array is identical to the initial start position array and is used in various processes to be described later. Note that in this Specification, the total array or initial start position array is also called the position-indicating array which indicates initial values or the initial position-indicating array.

More specifically, the total and start position at positions corresponding to the row on which the count is positioned within the count array become the count and sum of the rows with numbers smaller than the row on which that count is positioned (the upper rows in FIGS. 16A and 16B. For example, the total and start position on row 1 are both "0" and the total and start position on row 2 also become "0" because the count on row 1 is "0." On the other hand, because the count on row 1 is "0" and the count on row 2 is "2," the count and start position on row 3 become "(0+2)=2."

When the count array, total array and start position array are created in this manner, the start position array thus created is used to execute the process of arranging the various record numbers at the sorted positions. First, the record number is initialized (Step 1508), and when the array to hold the record numbers is allocated (Step 1509), a lookup of the value list pointer array is performed for a certain record number (Step 1510). Next, in the start position array, the start position of the row pointed to by the pointer value obtained in Step 1510 is examined, and in the record number array, the record number in question is stored in the region corresponding to the start position thus obtained (Step 1511). In FIG. 16B for example, in the information block for "SVC-ID," "3" is the pointer value within the array of pointers to the value list corresponding to the record number "0" so a lookup of the corresponding start position (start position on the fourth row). This value is "5" so the record number "0" is stored at a position in the record number array corresponding to "5" (namely, the sixth row).

Figure 17:
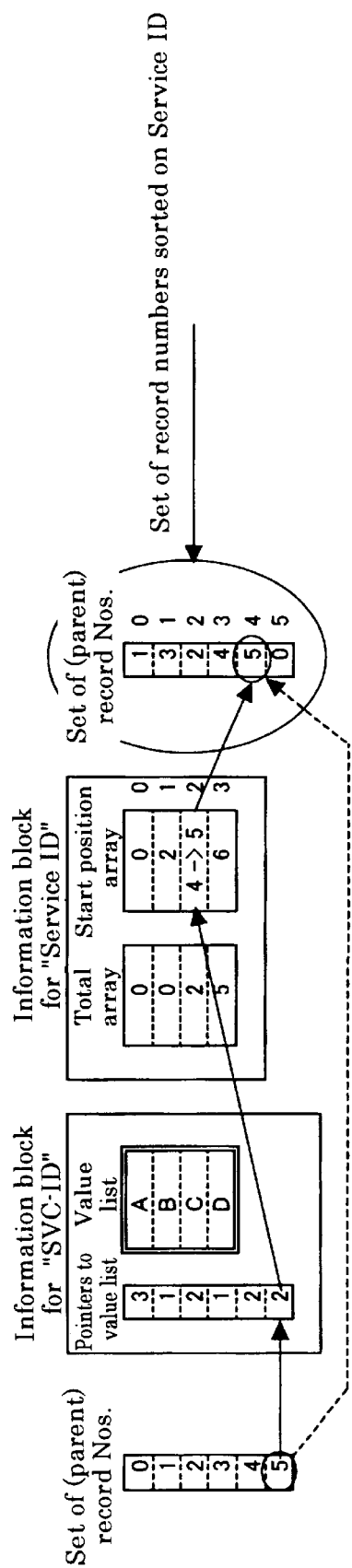
FIG. 17 is a diagram used to explain the sorting of record Nos. according to one embodiment of the present invention.

When the storage of record numbers is complete, the start position to be looked up is incremented (Step 1512). This is because it is necessary to increment the position within the records at which the record number is to be stored when this start position is looked up next. By executing this process for all record numbers required (see Steps 1512, 1513), it is possible to obtain a sorted record number array (see FIG. 17).

When the sorting process is complete, a table (view) sorted on the desired field may be obtained based on the Customer ID, Customer Name, Dues and other display fields corresponding to the record numbers obtained by the process shown in FIG. 12 and the sorted record number array obtained by means of FIG. 15. FIG. 18A is a diagram showing a table obtained in this manner (the Invoice Amount View sorted on "Service ID"). One can see that even in the case of sorting on another field (e.g., "Dues") it is similarly possible to obtain a table such as that shown in FIG. 18B (Invoice Amount View sorted on "Dues").

In this manner, by means of this embodiment, with two tables of table-format data, by extracting the value lists to be shared from within the information blocks that make up the individual tables of table-format data, and making the meaning of these value lists common, it is possible to implement the joining of two tables of table-format data.

[Embodiment 2]

Here follows a description of Embodiment 2 of the present invention. In Embodiment 1, within the shared information block, a lookup is first performed on the pointer values to the value list of one information block (the "many" side information block in "many:1") and then a lookup of the pointer values to the record number in the other information block (the "1" side information block in "many:1") pointed to by this pointer is performed, and moreover, a lookup of the pointer values to the value list corresponding to the record number pointed to by the pointer value to record numbers. In the example shown in FIG. 14 for example, i) the array of pointers to the value list within the information block for "SVC-ID," ii) the array of pointers to the value list within the information block for "Service ID," and iii) the array of pointers to the value list within the information block for "Dues," are used and a lookup of the respective pointer values is performed sequentially. In contrast, in Embodiment 2, an array of pointers to record numbers of the other information block is prepared within one of the information blocks (the "many" side information block in "many:1"). To wit, among the aforementioned steps i)–iii), a pointer array that integrates i) and ii) is constructed in said one of the information blocks. Thereby, the record numbers on the "1" side can be identified from the "many" side information block. Note that in Embodiment 2, the processing executed by the information processing system 10 and its structure, etc. are identical to those of Embodiment 1 except for the points described below.

FIGS. 19A and 19B are diagrams used to describe the process of sharing value lists. FIG. 19A shows a portion of the information blocks for the customer table and service table pertaining to Embodiment 1, while FIG. 19B shows a portion of the information blocks pertaining to Embodiment 2. As is evident from FIGS. 19A and 19B, in Embodiment 1, the pointer processor 36 (see FIG. 10) generates on the side of the information block for "Service ID" an array of pointers for the lookup of the array of pointers to the value list within the information block for "Dues" (an array of pointers to record numbers). In contrast, in Embodiment 2, the pointer processor 36 generates on the side of the information block for "SVC-ID" an array of pointers to record numbers for the lookup of an array of pointers to the value list of the information block for "Dues" which is the information block we ultimately wish to look up.

More specifically, in Embodiment 1, it is sufficient to prepare a virtual pointer array equivalent to the array of pointers to record numbers created for the information block on the "1" side among the information blocks that contain shared value lists (e.g., the information block for "Service ID" in FIG. 19A) and create an array of pointers that can directly point to the record number on the "1" side from the information block on the "many" side Note that in the example shown in FIG. 19B, the pointer values within the array of pointers to record numbers are arranged in ascending order in the information block for "Service ID," so the pointer values in the array of pointers to the value list matches the pointer values in the array of pointers to record numbers in the information block for "SVC-ID," but naturally they need not necessarily match.

By means of this embodiment, an array of pointers to record numbers is created within the information block on the "many" side of "many:1" so the size of the pointer array is larger in comparison to that of Embodiment 1. However, the number of pointer arrays looked up when creating views or executing sorts can be reduced and thus the processing speed can be further increased.

[Embodiment 3]

Figure 20:
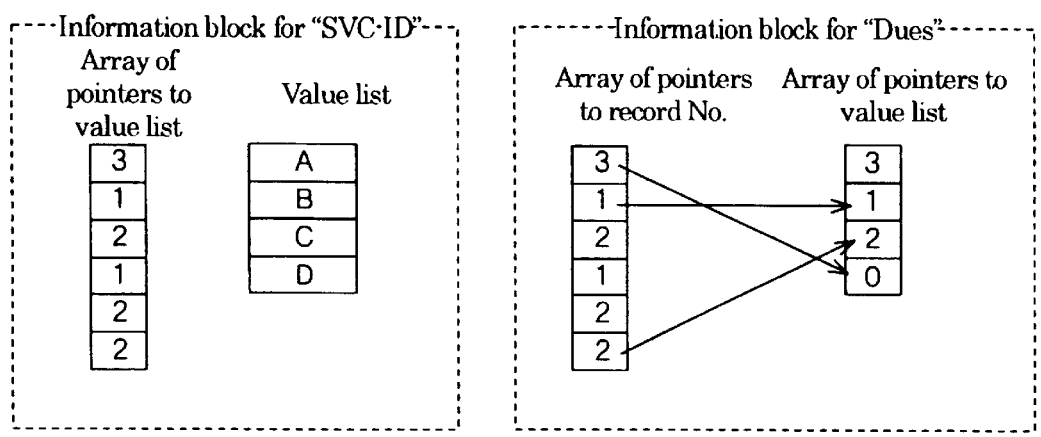
FIG. 20 is a diagram showing an example of an array of pointers according to Embodiment 3.

Here follows a description of Embodiment 3 of the present invention. In this embodiment, a pointer array is provided within the information block for which the field values are to be ultimately displayed (in the examples shown in FIGS. 9A to 9F, the information block for "Dues") (see FIG. 20). To wit, the array of pointers to record numbers (see FIG. 19B) that was provided on the "many" side information block in Embodiment 2 is provided on the "1" side information block for the field to be displayed in a table (view).

By means of this embodiment, the record numbers for the "1" side table can be identified directly from the record numbers for the "many" side table, so the processing speed can be further increased.

[Embodiment 4]

Here follows a description of Embodiment 4 of the present invention. Embodiments 1 through 3 pertained to a type (the "many:1" type) wherein fields having no duplicate values (="1") are derived from fields having duplicate values (="many"), but in Embodiment 4, the process of sharing value lists is performed in a "many:many" type.

For example, consider two tables of table-format data as shown in FIGS. 21A to 21C. In FIG. 21A, the member name is associated with the name of the baseball team that the member is a fan of. In FIG. 21B, the baseball team name and game date are associated. Here, one can look into FIG. 21A and find that Mr. "Williams" is a fan of "Team A" and also look into FIG. 21B and find that "Team A" has games on the dates "5/10" and "5/11." In addition, one can see that Mr. "Smith" is also a fan of "Team A" and these games are on "5/10" and "5/11."

Accordingly, a table that indicates the tickets desired by each of the members (the ticket confirmation view) is as shown in FIG. 21C. This view joins the "Fan of" and "Baseball team" fields but the "Fan of" field has duplicate values (namely, the field value "Team A" appears multiple times), and on the other hand the "Baseball team" field also has duplicate values (namely, the field value "Team A" appears multiple times). This is called the "many:many" type in consideration of the fact that fields having duplicate values (="many") are derived from fields having duplicate values (="many").

In addition, in a "many:many" type, logically the two tables (in FIGS. 21A to 21C, the "Baseball Fan Club Membership Table" and the "Game Schedule Table") are on equal footing, but here, the table that reflects the default sorting order of the output table (view) (in FIGS. 21A to 21C, the "Baseball Fan Club Membership Table") is called the "master table" while the other table is called the "slave table." In addition, in this Specification, the aforementioned master table may also be called the master table-format data and the slave table may be called the slave table-format data. In the same manner as in Embodiments 1–3, the CPU 12 has the structure shown in FIG. 10 in Embodiment 4 also, so the CPU 12 executes the processing shown in FIG. 22.

In FIG. 22, the value list sharing process (Step 2201) corresponds to the process shown in FIG. 11, the process of generating count arrays for the slave table, etc. (Step 2202) roughly corresponds to the first stage of the process shown in FIG. 15 (Step 1501 through Step 1507), and the process of generating the sort array of the slave table (Step 2203) roughly corresponds to the last stage of the process shown in FIG. 15 (Step 1508 through Step 1513).

In Step 2201, the value lists to be shared are extracted (Step 1102 of FIG. 11), and when the field values that require conversion are selected (Step 1103), the required field values are inserted into the value list (see Step 1104 of FIG. 11 and symbols 2301 and 2302 of FIG. 23). Next, the pointer values within the array of pointers to the value list in the information block containing the converted list are updated (see Step 1105 of FIG. 11 and symbols 2303 and 2304 of FIG. 23). In the example of FIG. 23, the conversion and updating of the value list and array of pointers to the value list of the master table are performed, but conversion and the like are not necessarily performed only on the master table, but rather conversion and the like may also be performed on the slave table or on both tables.

Figure 24:
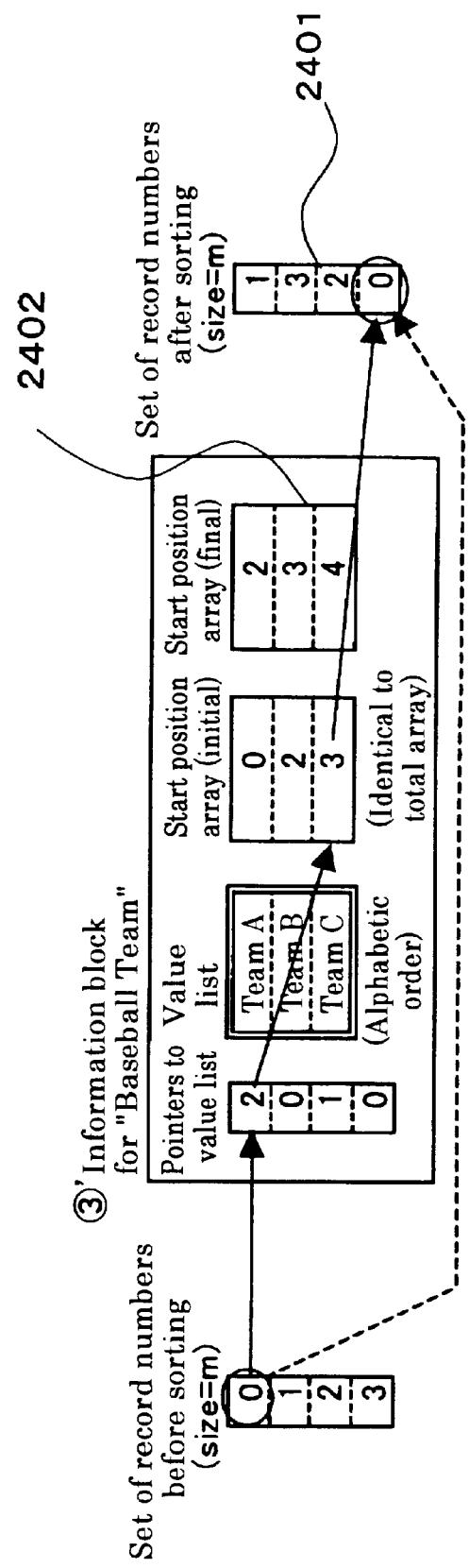
FIG. 24 is a diagram used to explain the sorting of slave tables according to Embodiment 4.

Next, in Step 2202, the count array (not shown), total array (not shown) and start position array (see symbol 2402 of FIG. 24) are generated for the slave table. In the state when Step 2401 is complete, the value of a certain row in the total array and the value of a corresponding position in the start position array are equal. In the slave table, after the count array and start position arrays corresponding to the shared value list are created in the slave table, the sort array for the slave table is generated (Step 2203). In FIG. 24, in the information block for "Baseball team," "2" is the pointer value in the array of pointers to the value list corresponding to record number "0" so the corresponding start position (row 3 of the start position array) is looked up (see Step 1510 of FIG. 15) and according to this value of "3" the record number "0" is placed at the corresponding position (namely row 4) of the sort array (record number array) (see Step 1511 of FIG. 15). In addition, the value at the lookup start position is incremented, changing from "3" to "4."

After the various record numbers for the slave table are placed in the correct positions in the sort array (record number array) (see symbol 2401 of FIG. 24), a new array of pointers to the value list of the master table is generated. In a "many:many" type as in this embodiment, this can be handled because the field values within the information block on the master table appear multiple times.

Figure 25:
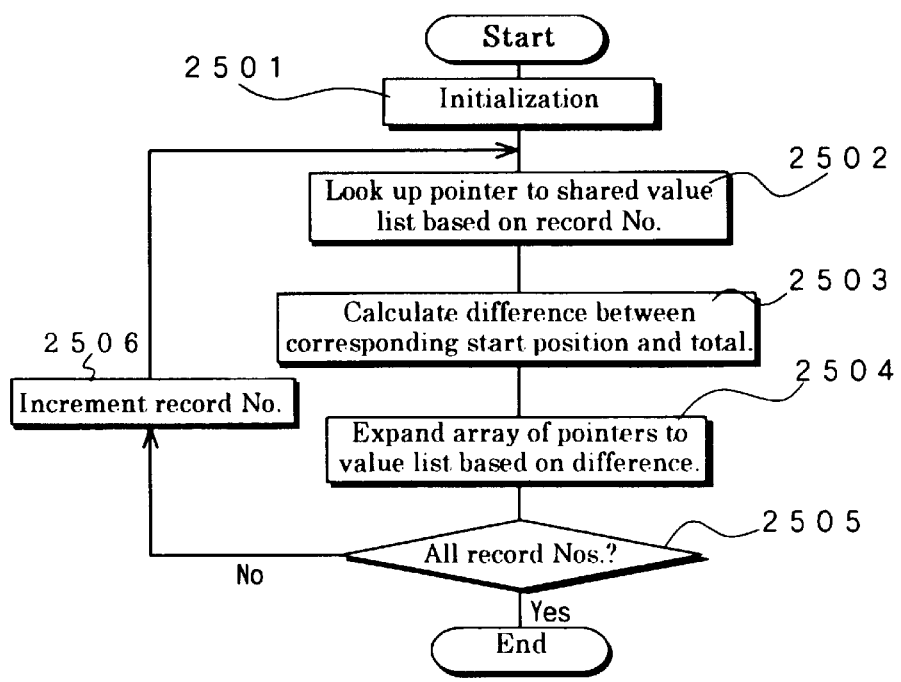
FIG. 25 is a flowchart showing the process of expanding an array of pointers to the value list of a master table according to Embodiment 4.

More specifically, as shown in FIG. 25, after the record number is initialized (Step 2501), for a certain record number, an array of pointers to the value list within the information block that contains shared value lists is found and the pointer value at the position (row) corresponding to the record number is looked up (Step 2502). Next, the total array and start position array created by sorting the slave table (see Step 2203) are found and the difference between the start position and count at the position indicated by the pointer value is calculated (Step 2503).

This difference represents the number of duplicate times that a field value in the value list of the information block containing the shared value list appears for a certain record number in the master table. Accordingly, in the joined table (view), the array of pointers to the value list within the information block for the field which had been on the master table side is expanded based on the difference shown by the aforementioned degree of duplication (Step 2504). To wit, in the event that the calculated difference is "d" for a certain record number, the pointer value corresponding to the record number is increased by "d" in the new array of pointers to the value list to be created.

Figure 26:
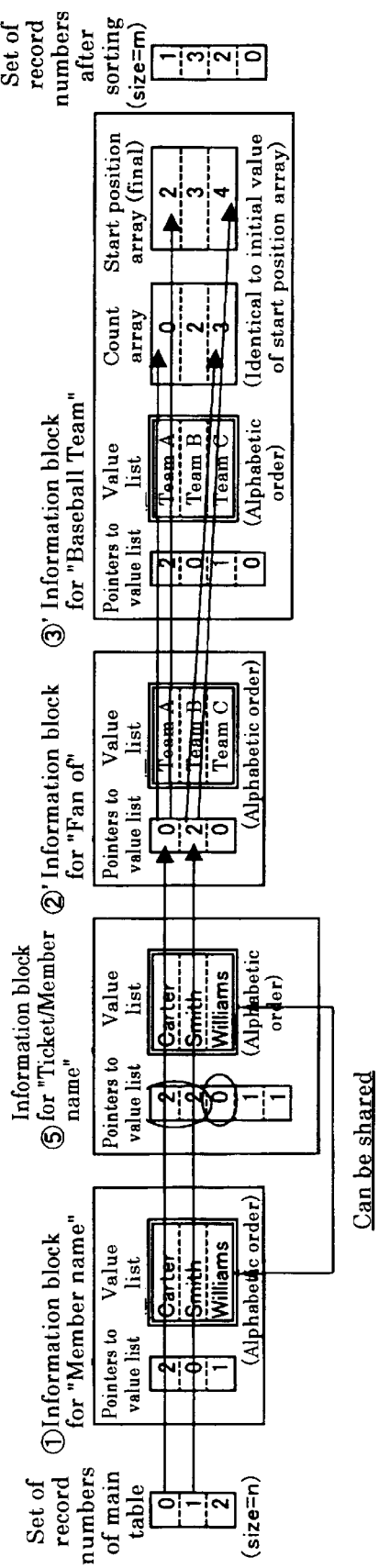
FIG. 26 is a diagram for explaining the expansion of an array of pointers to the value list of a master table according to Embodiment 4.

In FIG. 26, regarding record number "0" for example, the array of pointers to the value list within the information block for "Fan of" which contains a shared value list is found. In this pointer array, "0" is the pointer value to the position (row 1) corresponding to the record number of "0," so among the total array and start position array within the information block for "Baseball team" containing a value list to be shared on the side of the slave table, the count and start position on row 1 are looked up and the difference between the start position and count (2−0=2) is calculated. Next, in order to create the joined table (view), a new pointer array is created by expanding the array of pointers to the value list of the information block for "Member name" in the master table. Note that the value list within the information block containing the new pointer array (the information block for "Ticket/Member name") is identical to that contained in the information block for "Member name" of the master table. This is because the field name "Member name" itself is common to both. Note that since these value lists are identical, only a single value list may actually be present and this may be shared among the two fields.

In this manner, two pointers with a pointer value of "2" are created.

Similarly, regarding record number "1," 2 is the pointer value to the position (row 2) corresponding to the record number of "1," so within the information block for "Baseball team," the count and start position on the corresponding row (row 3) are extracted and the value found by subtracting the former from the latter (4−3=1) is calculated. Accordingly, in the information block for "Ticket/Member name," following the pointer created previously, a pointer having the value "0" corresponding to the information block for "Member name" is created.

In addition, "Fan of" in the master table is also a field to be displayed in the table (view), so the same technique is used to create a new information block called "Ticket/Fan of" for the information block for this "Fan of" field (see FIG. 29B).

Figure 27:
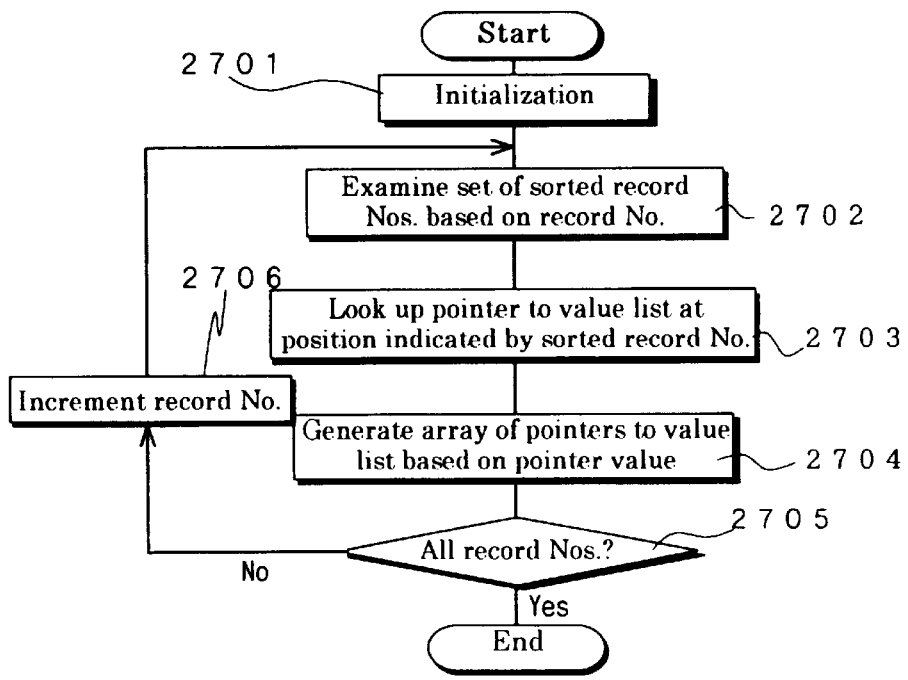
FIG. 27 is a flowchart showing the process of expanding (generating) an array of pointers to the value list of a slave table according to Embodiment 4.

After the arrays of pointers to value lists on the master table side are created in this manner, the arrays of pointers to value lists on the slave table side are created (Step 2205). Just as field values appear multiple times on the master table side, since this process is performed on the slave table side also in order to display the corresponding field values. More specifically, as shown in FIG. 27, after the record number is initialized (Step 2701), for a certain record number on the master table side, the pointer value at the position (row) corresponding to the record number within the array of pointers to the value list of the shared information block on the master table side is looked up (Step 2702). Next, the total array and start position array created by sorting the slave table (see Step 2203) are found and the difference between the start position and count at the position (row) indicated by the aforementioned pointer value is calculated (Step 2703). Here, in the sorted record number array, namely the sort array (see symbol 2401 of FIG. 24), the number of record numbers starting from what position that are associated with record numbers in the master table can be found from the count and start position, respectively. To wit, the aforementioned position matches the position indicated by the count and the aforementioned number matches the difference between the start position and count.

Accordingly, the record number is fetched according to the total and start position looked up in Step 2703, and in the array of pointers to the value list within the information block including the fields to be displayed in the joined table (view), the pointer values indicating the various record numbers are fetched and rearranged in order as a new pointer array (Step 2703). Thereby, among the group of information blocks to be joined, those to be derived from the master table are complete upon their creation.

Figure 28:
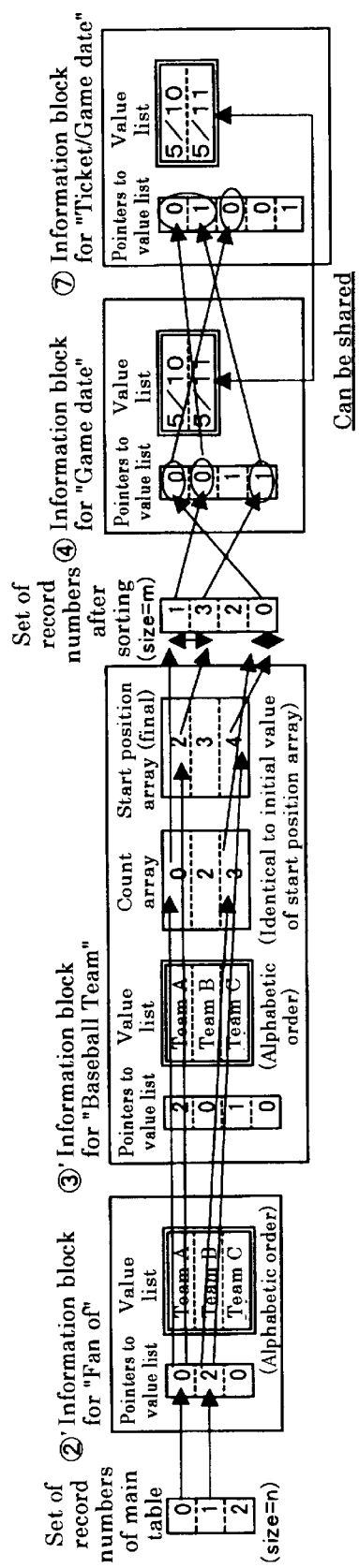
FIG. 28 is a diagram for explaining the expansion of an array of pointers to the value list of a slave table according to Embodiment 4.

In FIG. 28, regarding record number "0," "0" is the pointer value to the corresponding position (row 1) within the array of pointers to the value list in the information block for "Fan of," so the total "0" and start position "2" on the position corresponding to the aforementioned pointer value of "0" (row 1) are fetched. From these values, one can see that the "2-0=2" record numbers "1" and "3" from the position corresponding to "0" (row 1) in the sorted set (sort array) are the record numbers of the slave table associated to record number "0" of the master table. Accordingly, on the slave table side, the pointer values of "0" and "1" are fetched sequentially from the positions indicated by the record numbers "1" and "3" (row 2 and row 4) within the information block for the "Game date" field to be displayed in the table (view), and these are placed as new pointers in the value list of the information block for "Ticket/Game date" which is an information block for the joined table (view). Note that the value list contained in this information block for "Ticket/Game date" is identical to the value list contained in the information block for "Game date" in the slave table. Accordingly, only a single value list may actually be present and this may be shared among the two fields.

Similarly, regarding record number "1," "2" is the pointer value to the corresponding position (row 2) within the array of pointers to the value list in the information block for "Fan of," so the total "3" and start position "4" on the corresponding position (row 3) of the information block for "Baseball team" are fetched. From these, one can see that the "3-2=1" record number "0" from the position corresponding to the total of "2" (row 4) in the sorted set (sort array) is the record number of the slave table associated to record number "1" of the master table. Accordingly, the pointer value of "0" is fetched from the position indicated by the record number (row 1) in the array of pointers to the value list within the information block for "Game date," and this is subsequently placed as a pointer to the value list contained in the information block for "Ticket/Game date" (pointer created corresponding to the record number "0" of the master table).

FIGS. 29A to 29D are diagrams showing information blocks for creating joined tables (views) obtained by the aforementioned process. FIGS. 29A and 29B are those created by the process shown in FIG. 25 based on information blocks on the master table side, while FIG. 29C is one created by the process of FIG. 27 based on information blocks on the slave table side. The aforementioned process can be used to handle field values that appear in duplicate in the various information blocks. Accordingly, it is possible to obtain the field values to appear in the table (view) by fetching the field values indicated in the pointer values of the value list in order from the beginning (row 1). This means that a virtual array (record number array expanded for a view) is created and the field values are obtained based on the pointer values within the array of pointers corresponding to each record number.

For example, regarding the beginning (row 1), "2" is the pointer value to the corresponding position (row 1) within the pointer array of the information block for "Ticket/Member," so it is possible to determine that the field value of "Williams" is to be displayed, and "0" is the corresponding pointer value within the pointer array of the information block for "Ticket/Fan of," so it is possible to determine that the field value of "Team A" is to be displayed. Moreover, "0" is the corresponding pointer value within the pointer array of the information block for "Ticket/Game date," so it is possible to determine that the field value of "5/10" is to be displayed.

As in the aforementioned detailed description, in this embodiment, when joining two tables, the table that reflects the default sorting order of the output table (view) is defined to be the "master table" while the other table is defined to be the "slave table." In addition, after sharing the value lists in the information blocks of both tables, the record numbers of the slave table side are sorted based on the information blocks that contain shared value lists on the slave table side. To wit, the sort is performed on the linked fields of the slave table. Next, regarding both the master table and slave table, a pointer array that takes "many:many" duplication into account is created by knowing the degree of duplication based on the count and final start position of each field value obtained by means of the aforementioned sorting. Thereafter, by fetching the corresponding field values based on a conversion array (virtual record number) which takes duplication into account, the appropriate view can be obtained.

If information blocks for creating a table (view) (e.g., the information blocks for "Ticket/Member," "Ticket/Fan of" and "Ticket/Game date" in FIGS. 29A to 29D) are created in this manner, by providing in each information block the category number array, count array and start position array described with reference to FIGS. 4B, 4C, etc., it is clear that searching, tabulation or sorting can be performed easily using a single or multiple fields within the value list. In this case, while the "record number" had been used with those described regarding FIGS. 4A, 4B, etc., in this embodiment, it is sufficient to use the "conversion array (virtual record number)" instead.

[Embodiment 5]

Here follows a description of Embodiment 5 of the present invention. Embodiment 5 also implements a join of the "many:many" type, but the required memory size is reduced on the side of the master table and/or slave table.

First, we shall describe the.technique of reducing the memory size on the master table side. Referring to Step 2504 of FIG. 25 and FIG. 6, in the slave table, the number of times duplicate record numbers of the master table appear in the field values in the information block containing shared value lists is calculated, and from this, the expanded arrays of pointers to value lists are generated on the master table side within the various information blocks for fields to be presented in tables (views). However, since the pointers are expanded according to the degree of duplication on the slave table side, this degree of duplication is common among the various record numbers within the master table. For example, as shown in FIGS. 29A and 29B, if we look at the pointer values within the array of pointers to the value lists within both information blocks, the pointer values on row 1 and row 2 are common. In the same manner, row 4 and row 5 are also common. These have the same degree of commonality as the degree of duplication on the slave table side, and accordingly on the master table side, by providing one array that takes the aforementioned degree of duplication into account, there is no need to provide an array of pointers to the value lists within each information block.

FIGS. 30A and 30B are diagrams used to describe conversion arrays (virtual record numbers) provided on the master table side. As is clear from FIGS. 30A and 30B, if such a conversion array is created, it is possible to obtain the same view fields as in FIGS. 29A to 29D for the master table side. Such a conversion array can be generated by making slight changes to the process of Step 2504 of FIG. 25. To wit, by obtaining pointer values within the pointer array corresponding to the record numbers of the master table, the total array and start position array of the sorted information block on the slave table side can be achieved. Here, by calculating the difference between the start position and total corresponding to the aforementioned record numbers, the degree of duplication of record numbers can be obtained. Thus it is possible to obtain a new conversion array by repeating the record number the same number of times as the degree of duplication.

In this embodiment, one can see that there is no need to actually create the virtual information block (see symbols 3001 and 3002 of FIGS. 30A and 30B). To wit, by creating only the conversion array which is a virtual record it is possible to perform a lookup on the array of pointers to the value lists of the information blocks on the master table side and obtain the array of pointers to the virtual value lists of the information block each time a table (view) is created. Accordingly, it is possible to create a conversion array on the master table side and merely save this to create a joined table (view).

Figures 31, 34A, 34B, 34C:
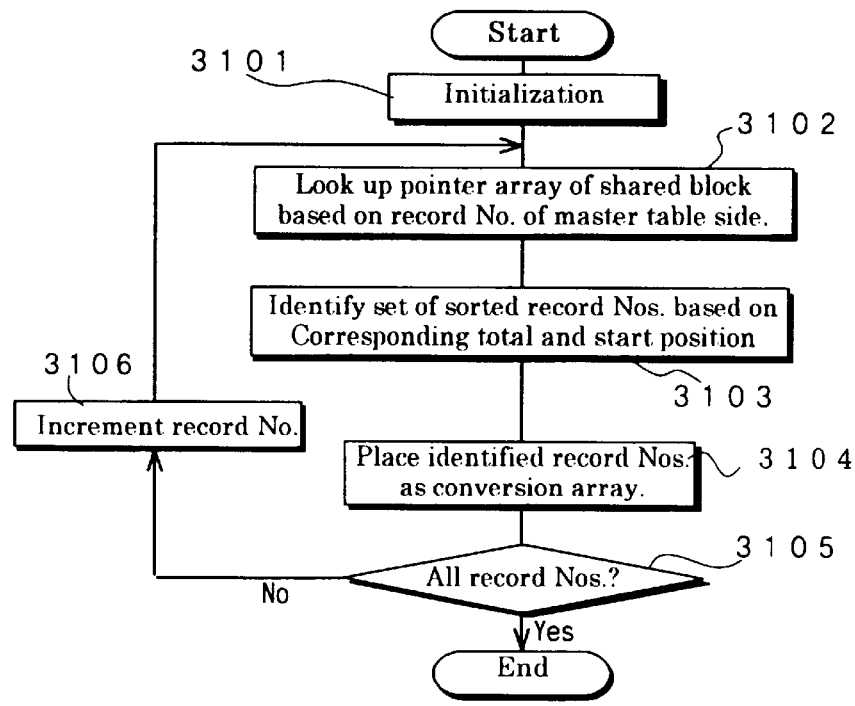
FIG. 31 is a flowchart showing the process of creating conversion arrays provided on the slave record side according to Embodiment 5.
FIGS. 34A to 34C are diagrams showing examples of table-format data (tables) used in a sixth embodiment.

Next, we shall describe the technique of reducing the memory size of the slave table. On the slave table side also, it is possible to reduce the memory size to be allocated by creating conversion arrays common to all fields. FIG. 31 is a flowchart showing the process of creating conversion arrays on the slave record side. The process of Step 3101 through Step 3103 is similar to the process of Step 2701 through step 2703 of FIG. 27. More specifically, for a certain record number on the master table side, the pointer value at the position (row) corresponding to the record number within the array of pointers to the value list of the shared information block on the master table side is looked up (Step 3102). Next, the total array and start position array corresponding to this pointer value are identified and by calculating the difference between the start position and total, the range in which the corresponding record numbers are stored within the set of sorted record numbers (sort array) is identified (Step 3103). Thereafter the identified record numbers are sequentially stored in the conversion array.

FIGS. 32A to 32C are diagrams showing examples of the creation of conversion arrays on the master table side. FIG. 32A shows the lookup of the pointer value "0" corresponding to the shared information block for "Fan of," corresponding to record number "0" of the main table. The difference between the start position and the total is "2" at the position (row 1) corresponding to the information block for "Baseball team" which is sorted on the slave block side, so in the sorted set of record numbers (sort array), one can see that the two record numbers "1" and "3" at the beginning are associated with record number "0" in the aforementioned main table. Accordingly, the values "1" and "3" from the beginning are stored in the conversion array. Similarly, in FIG. 32B, based on the pointer value "2" of the information block for "Fan of" looked up corresponding to record number "1" of the master table, the start position "4" and total "3" at the corresponding position (row 3) of the information block for "Baseball team" are determined. The difference between them is "1" so in the sort array, one can see that the "1" record number "0" from the position (row 4) indicated by the total "3" is the record number corresponding to record number "1" in the master table. Accordingly, in the conversion array of the aforementioned FIG. 32A, the record number "0" is stored in the region contiguous to the region in which storage was performed regarding master record number "0." By repeating this process, a common conversion array can be obtained in the slave table.

Figure 33:
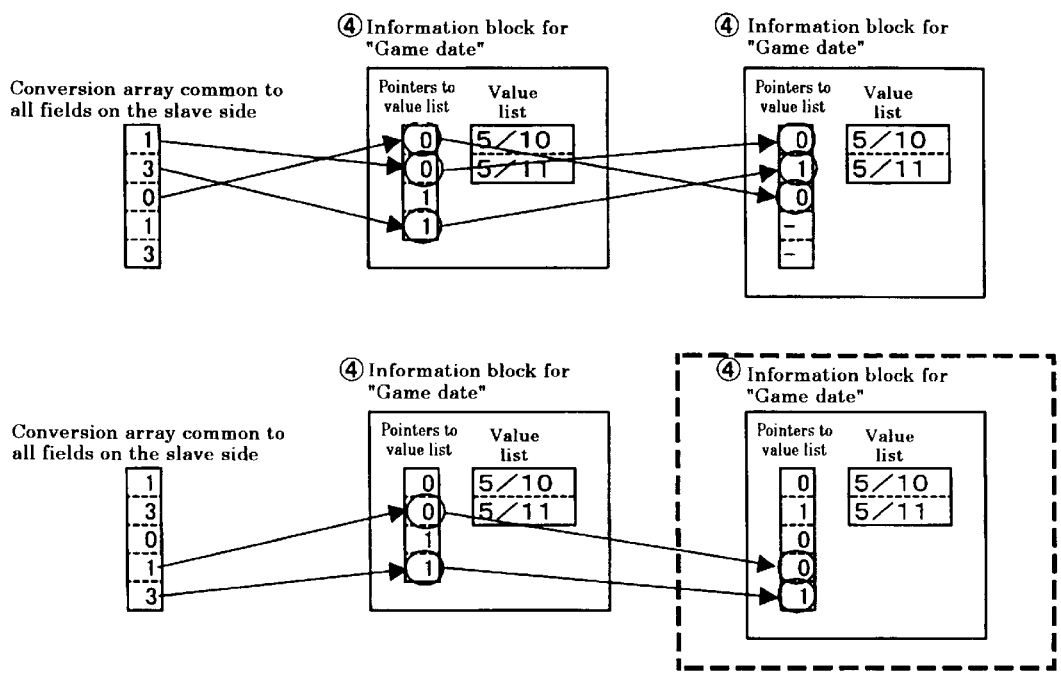
FIG. 33 is a diagram used to describe the sequence of obtaining a virtual "Game date" information block based on the conversion array on the slave table side obtained by the process according to Embodiment 5.

FIG. 33 is a diagram used to describe the sequence of obtaining a virtual information block for "Game date" based on the conversion array on the slave table side obtained by the aforementioned process. As shown in FIG. 33, by obtaining pointer values within the array of pointers to the value list that correspond to the values within the conversion array, it is possible to create a virtual information block that can be used as a joined table (view). In the same manner as in the description of the master table, this virtual information block may be created each time a table (view) is created. To wit, by creating only the conversion array, it is possible to generate the virtual information block as desired according to the table (view) to be created. The information block for "Game date" ultimately created (that enclosed by dashed lines in FIG. 33) can be created immediately as long as the conversion array and the original information block are present, so there is no need to create and save it.

Note that it is also possible to create only either the conversion array on the main table side or the conversion array on the slave table side. For example, in the case that the memory size becomes large regarding only one of the tables, then it is sufficient to create the conversion array only for the other table. Naturally, it need not be said that the conversion array may also be created for both tables.

In addition, this embodiment may also be used for searching and sorting by the same techniques as in Embodiment 4.

By means of this embodiment, in the "many:many" type, by saving one conversion array each in the master table and/or slave table, it is possible to obtain a joined table (view) without creating a new information block. Accordingly the required memory size may be reduced.

[Embodiment 6]

Here follows a description of Embodiment 6 of the present invention. In Embodiments 4 and 5, the value lists of a single field (information block) within the master table and slave table are shared, but in Embodiment 6, a join of a plurality of fields is achieved.

For example, consider two tables (the Personal Name Table and the Age Table) as shown in FIGS. 34A and 34B. First, regarding the Personal Name Table, one can find the "Surname" field and the "Given name" field. On the other hand, regarding the Age Table, one can find the "Age/Surname" field, the "Age/Given name" and the "Age field." Accordingly, in order to create a table (view) called the Personal name/Age view which includes the personal name and age, it is necessary to join "Surname" and "Age/Surname" and also join "Given name" and "Age/Given name" (see FIG. 34C). Note that in the aforementioned example, the Personal Name Table is the one that maintains the order of fields (the master table).

Figure 35:
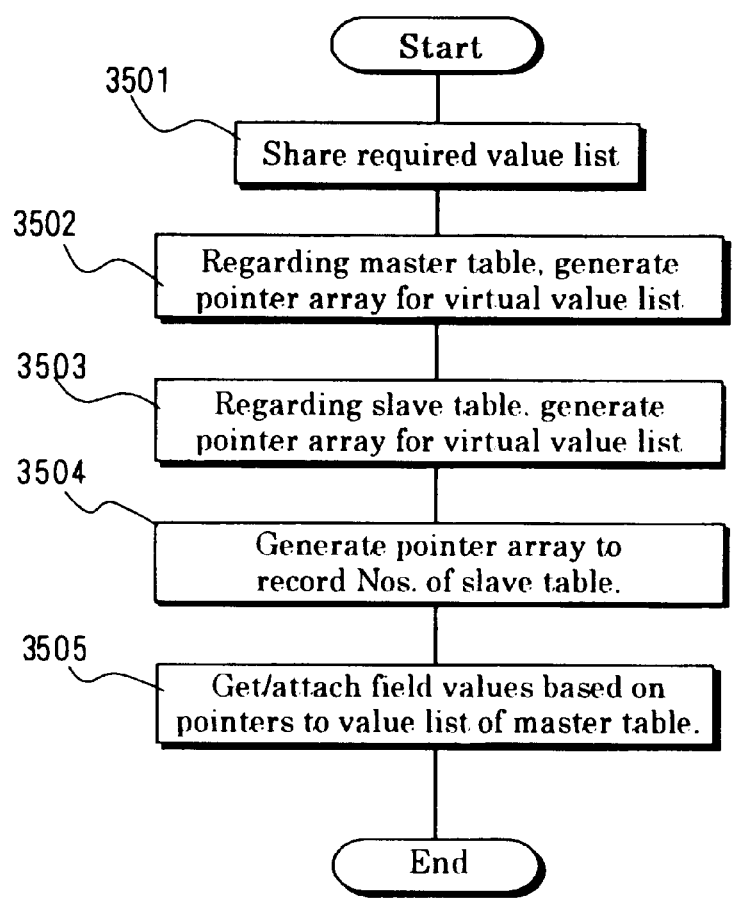
FIG. 35 is a flowchart showing the processing according to Embodiment 6.
Figure 36:
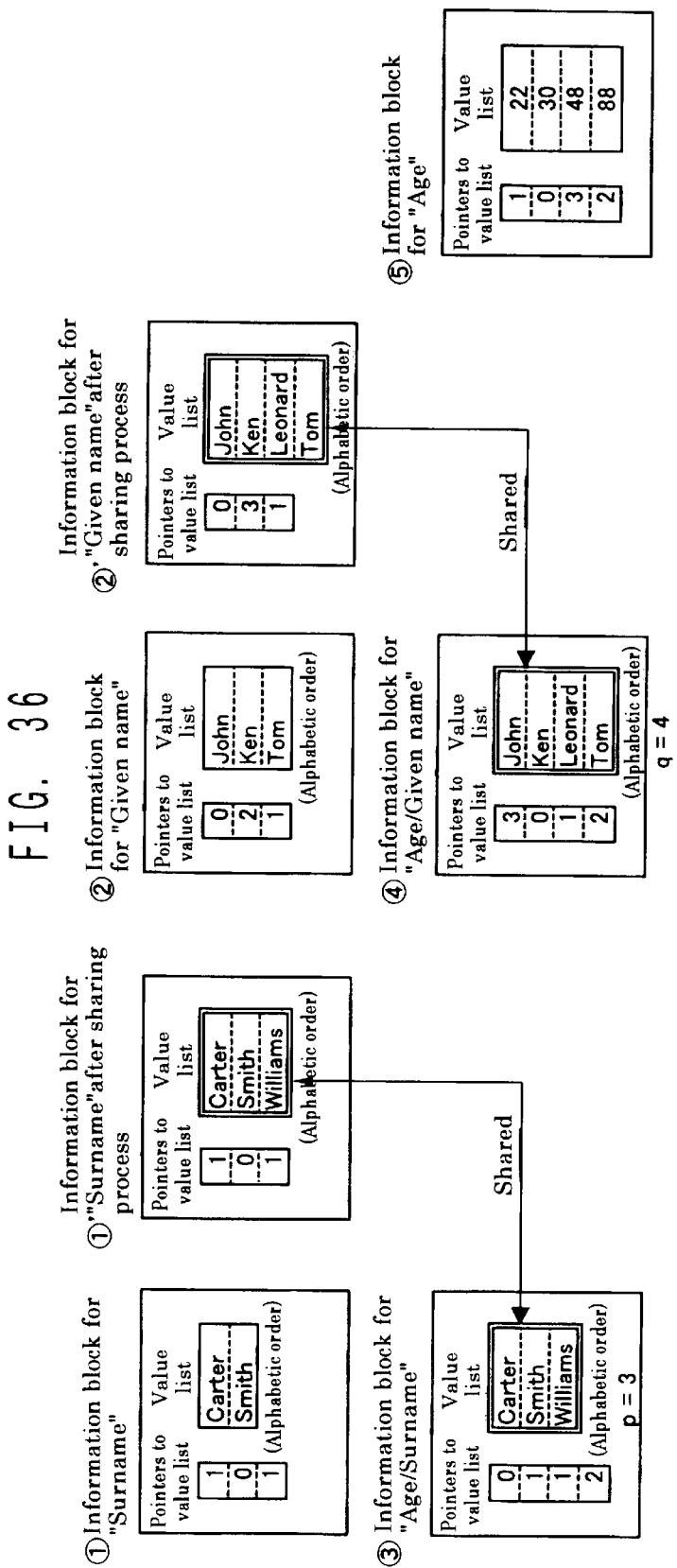
FIG. 36 is a diagram used to explain the sharing of value lists according to Embodiment 6.

Here follows a description of the technique of creating a table (view) in which multiple fields are joined as described above. FIG. 35 is a flowchart showing the processing according to Embodiment 6. As shown in FIG. 35, the sharing process is first executed for all of the value lists to be shared (Step 3501). Each sharing process corresponds to the process shown in FIG. 11. In the example shown in FIGS. 34A to 34C, the value list in the information block for "Surname" in the Personal Name Table and the value list within the information block for "Age/Surname" in the Age Table are shared and also, the value list in the information block for "Given name" in the Personal Name Table and the value list within the information block for "Age/Given name" in the Age Table are shared (see FIG. 36).

Next, regarding the master table, a pointer array for a virtual value list combining the fields required when obtaining a joined table (view) is created (Step 3502). For example, in the case that there are two tables to be shared and the value list of one contains "p" field values while the value list of the other contains "q" field values, a combination of these could conceivably be a virtual value list that has "p×q" field values. On the other hand, the arrays of pointers to value lists actually created contains the same number of pointer values as the number of record numbers in the master table.

More specifically, the "$i^{th}$" pointer value $Pm_i$ ($0 \leq i \leq p-1$, where p: number of field values in one of the value lists) is calculated as follows. Taking $Pm_{1i}$ to be the "$i^{th}$" pointer value within the array of pointers to the value list of one of the information blocks for the fields to be joined, and $Pm_{2i}$ to be the pointer value within the array of pointers to the value list of the other information block, this is obtained by Equation (1).

$$\text{Pointer value } Pm_i = Pm_{1i} * q + Pm_{2i} \qquad (1)$$

(q: number of field values in the other value list)

In addition, regarding the slave table, a pointer array for a virtual value list combining the fields required when obtaining a joined table (view) is created (Step 3503). This pointer array contains the same number of pointer values as the number of record numbers of the slave table.

The "$j^{th}$" pointer value $Ps_j$ ($0 \leq j \leq p-1$, where p: number of field values in one of the value lists) is also calculated in the same manner as the pointer value for the aforementioned master table. To wit, taking $Ps_{1j}$ to be the "$j^{th}$" pointer value within the array of pointers to the value list of one of the information blocks for the fields to be joined, and $Ps_{2j}$ to be the "$j^{th}$" pointer value within the array of pointers to the value list of the other information block, this is obtained by Equation (2).

$$\text{Pointer value } Ps_j = Ps_{1j} * q + Ps_{2j} \qquad (2)$$

(q: number of field values in the other value list)

Note that if there are three fields to be joined, the "$i^{th}$" pointer value $Pm_i$ ($0 \leq i \leq p1$, where p: number of field values in one of the value lists) may be found according to Equation (3).

$$\text{Pointer value } Pm_i = Pm_{1i} * q + Pm_{2i} * r + Pm_{3i} \qquad (3)$$

Note that here, $Pm_{1i}$ is the "$i^{th}$" pointer value within the array of pointers to the value list of the first information block, $Pm_{2i}$ is the "$i^{th}$" pointer value within the array of pointers to the value list of the second information block, and $Pm_{3i}$ is the "$i^{th}$" pointer value within the array of pointers to the value list of the third information block. In addition, q is the number of field values in the second value list and r is the number of field values in the third value list. It need not be said that the pointer values can be found by the same technique even in the case of four or more fields.

Figure 37:
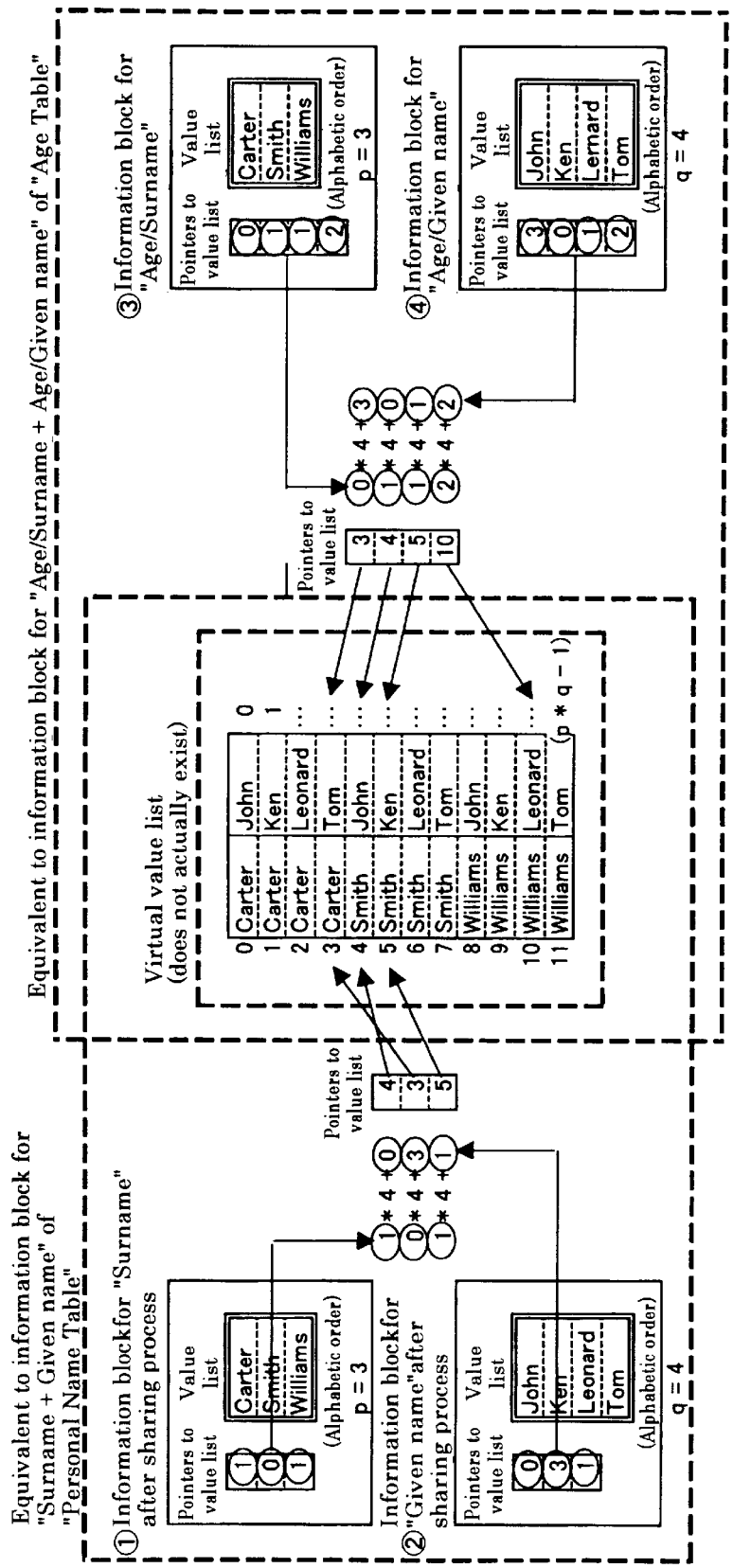
FIG. 37 is a diagram used to explain the virtual value lists according to Embodiment 6, and the array of pointers to these value lists.

FIG. 37 is a diagram used to explain the virtual value lists according to Embodiment 6, and the array of pointers to these value lists. In the "Personal Name Table" which is the master table, regarding the information block for "Surname," "1" is the pointer value corresponding to record number "0" (namely row 1) within the array of pointers to the value list. On the other hand, regarding the information block for "Given name," "0" is the pointer value of row 1 within the array of pointers to the value list. Accordingly, in the array of pointers to the virtual value list, 1*q (here, 4)+0=4 is the pointer value corresponding to record number "0" (namely row 1). In addition, regarding record number "1," in the array of pointers to the virtual value list the corresponding pointer value becomes 0*4+3=3.

Here follows a description of the meaning of the pointer values in the aforementioned array of pointers to the virtual value list. In the aforementioned example, in the "Personal Name Table," the number of pointer values p regarding the information block for "Surname" is 3, and the number of pointers q regarding the information block for "Given name" is 4.

Regarding record number "0," the pointer value in the array of pointers to the virtual value list is "4." Since this value is "4/q=4/4=1," upon looking this up in the value list of the information block for "Surname," one can see that the surname is "Smith." In addition, since "4mod(q)=4mod4= 0," upon looking this up in the value list of the information block for "Given name, one can see that the given name is "John." In addition, regarding record numbers "1" and "2," the pointer values in the array of pointers to the virtual value list are "3" and "5." Since these values are "3/q=3/4=0" and "5/q=5/4=1" respectively, upon looking these up in the value list of the information block for "Surname," one can see that the surnames are "Carter" and "Smith." In addition, since "3mod(q)=3mod4=3" and "5mod(q)=5mod4=1," respectively, upon looking these up in the value list of the information block for "Given name, one can see that the given names are "Tom" and "Ken" (see FIG. 38).

Also regarding the "Age Table" which is the slave table, the pointer values within the array of pointers to the virtual value list can be obtained by the same technique. The meaning of the pointer values within the pointer array thus obtained is also the same as that of the master table (see FIG. 39).

By means of the process of Step 3502 and Step 3503, multiple fields can be considered in the same manner as single fields. Accordingly, in the information blocks of the slave table, the array of pointers to the virtual value list can be used to generate the pointer values of the array of pointers to record numbers and these are stored in the appropriate positions (Step 3504). This technique is the same as that used in Step 1105 of FIG. 11. To explain this again, in the virtual information block of the slave table, an array of the same size as that of the virtual value list is prepared. Next, a process is executed whereby the pointer values of the array of pointers to the value list are scanned from the beginning and when the "$i^{th}$" pointer value is "j," the value "i" is stored as the "$j^{th}$," element in the array thus prepared.

Figure 40:
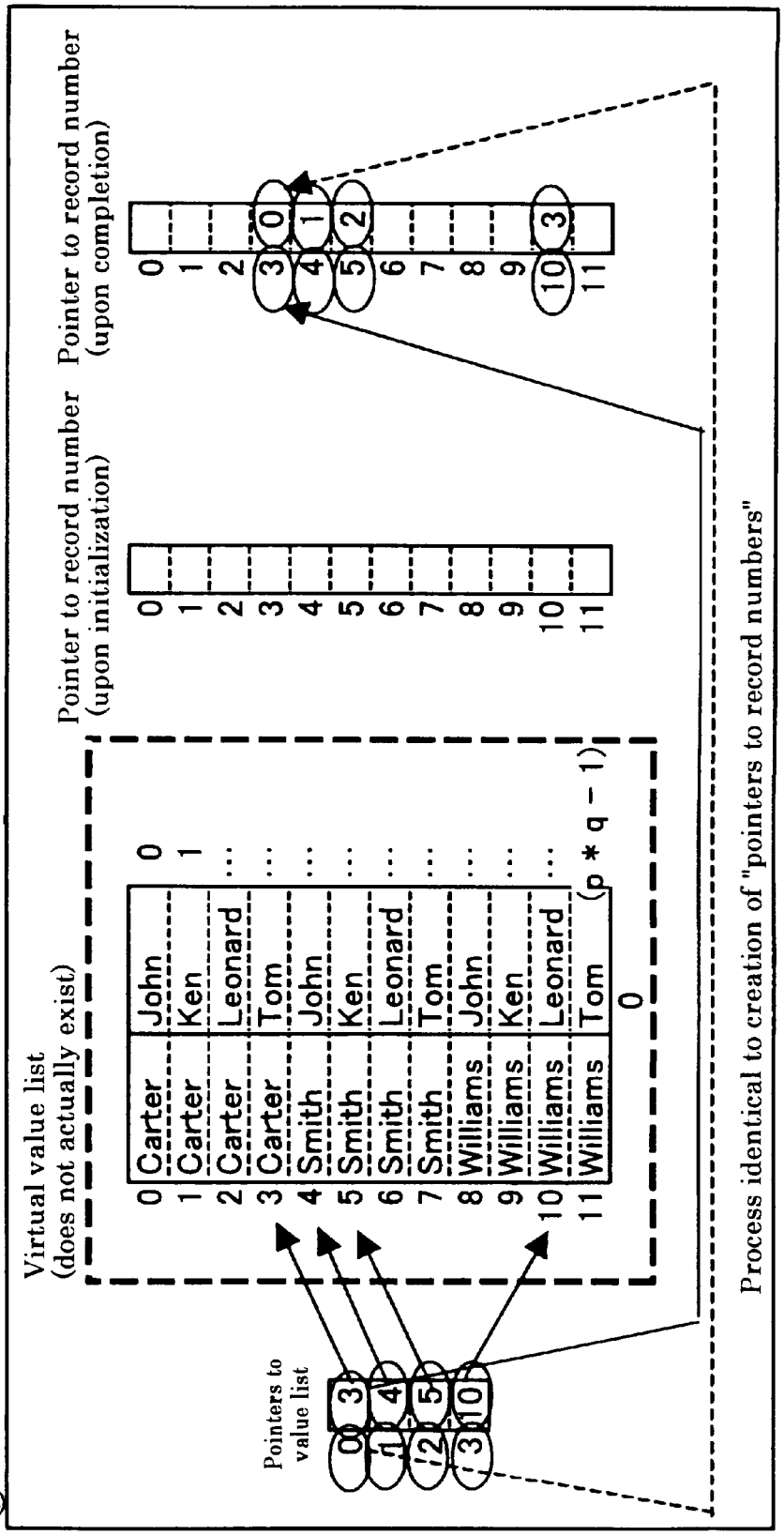
FIG. 40 is a diagram used to explain the virtual value lists according to Embodiment 6, and the array of pointers to the record number.

In FIG. 40, regarding the "Age Table" which is the slave table, a lookup is performed on the various pointer values contained in the array of pointers to the value list of the virtual information block for "Age/Dues+Age/Given name" which contains a virtual value list obtained by sharing. For example, "3" is the pointer value corresponding to record number "0" so the record number "0" is stored in the corresponding position (row 4) in the array of pointers to record numbers.

Once the array of pointers to record numbers is created in this manner, the joined table (view) is obtained (Step 3505). More specifically, the record number in the main table specifies the pointer value within the array of pointers to the value list from which that field value is to be fetched in the information block of the main table. In addition, by looking up the pointer value within the array of pointers to the value list in the information block containing the virtual value list, based on this pointer value, the pointer value to record numbers obtained in Step 3504 is identified. Since the record number indicated by this pointer value is one of the slave table, in the information block containing the value list containing the value to be displayed, the pointer value of the corresponding position is found and the field value within the value list is identified thereby.

Figure 41:
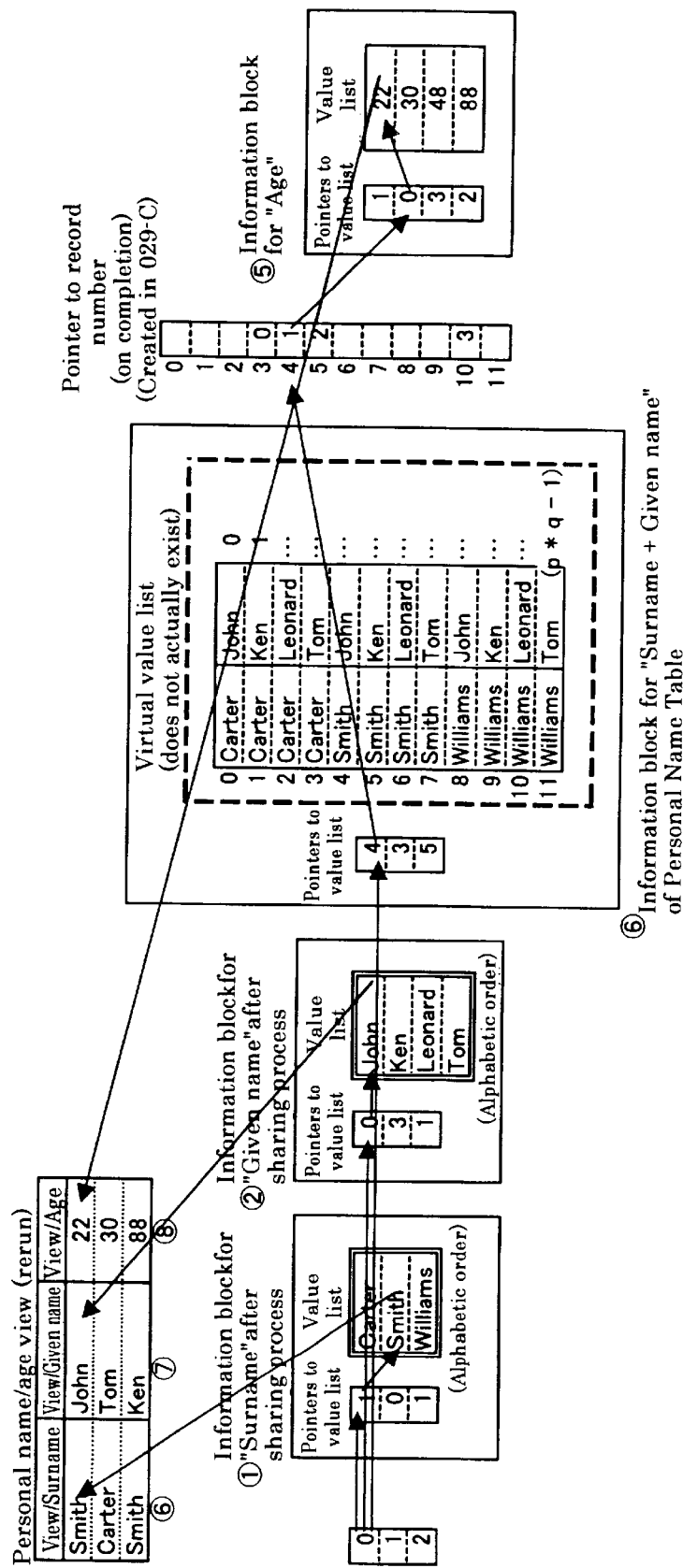
FIG. 41 is a diagram used to explain the creation of tables (views) according to the process of Embodiment 6.

In FIG. 41, the record number of the master table (e.g., "0") is used to obtain the field values (e.g., "Smith" and "John") from the value lists within the information block for "Surname" and the information block for "Given name" in the main table. On the other hand, the aforementioned record number is also used to obtain the corresponding pointer value (e.g., "4") in the array of pointers to the value list of the information block for "Surname +Given name" containing the virtual value list, and thereby the record number of the slave table (e.g., "1") is found. Accordingly, it is possible to fetch the corresponding field value (e.g., "22") from the value list of the information block for "Age" which has the fields to be displayed within the slave table.

By means of this embodiment, in order to handle a plurality of fields to be joined as a single field, an information block is created in the state in which multiple fields are concatenated and the required record numbers and pointer values are identified using virtual pointer arrays corresponding to field values obtained with this information block. In addition, there is no need for the aforementioned virtual value list containing field values to be actually created, but rather only the pointer array for specifying field values within this value list is created. For example, in the case that the field values of the two fields are "p" and "q" respectively, it is sufficient to create an array of pointers to record numbers of a size "pxq." Accordingly, it is possible to achieve the joining of a plurality of fields without creating a value list of an enormous size containing the actually concatenated field values.

[Embodiment 7]

Here follows a description of Embodiment 7 of the present invention. In Embodiment 6, an information block is created in the state in which multiple fields are concatenated, and arrays of pointers to record numbers are created regarding this information block. However, assuming that the field values of the aforementioned two fields are "p" and "q," in the case that each of these is extremely large (e.g., the case in which they are 100,000), even just the array of pointers to record numbers becomes extremely large. To solve this problem, in Embodiment 7, the array of pointers to the virtual value list is not created, but rather a value list with the multiple fields encoded in a multidimensional (e.g., two-dimensional) manner is created, thereby preventing the pointer array from becoming huge. These field values in the value list with the aforementioned multiple fields encoded may be called a multidimensional array in certain cases in this Specification.

Figure 42:
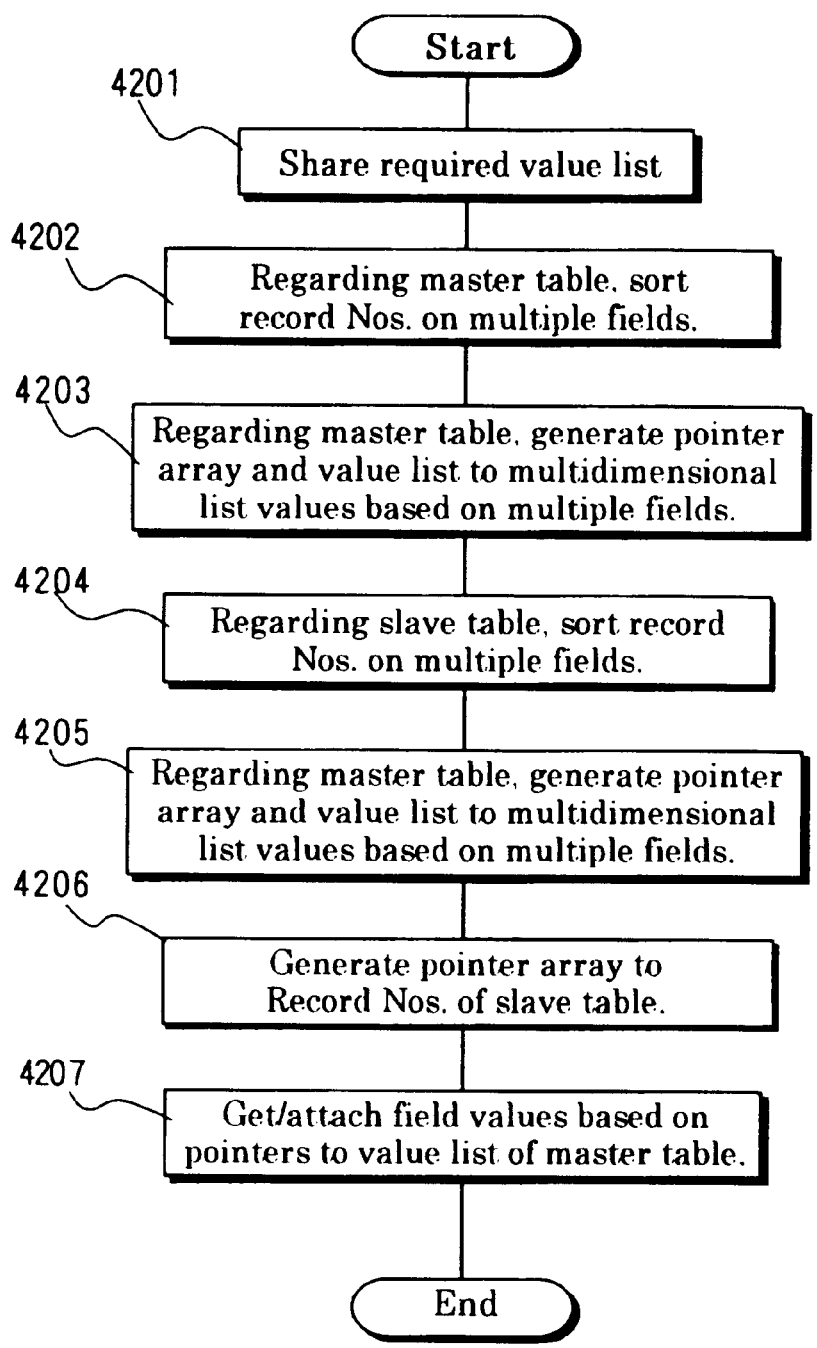
FIG. 42 is a flowchart showing the processing according to Embodiment 7.

FIG. 42 is a flowchart showing the processing according to Embodiment 7. In this processing also, in the same manner as in FIG. 35, first the sharing process is executed (Step 4201). Next, for each of the multiple fields to be joined, the record numbers are sorted (Step 4202). The array that contains record numbers thus sorted (the sort array or sorted record number list) is thus created.

Figure 43:
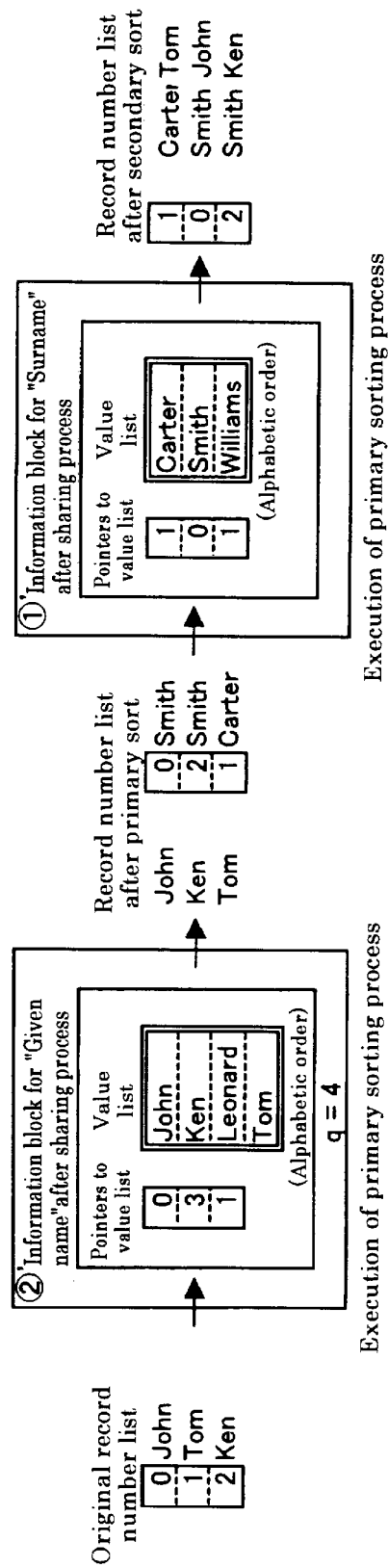
FIG. 43 is a diagram used to explain the secondary sort of the master table according to Embodiment 7.

In the case that there are two fields to be joined, the sort process is executed twice. For example, as shown in FIG. 43, in the case of joining the two fields of "Given name" and "Surname," after sharing, the record numbers are sorted according to the order of the value list within the information block for "Given name" and then sorted according to the order of the value list within the information block for Surname.

Figure 44:
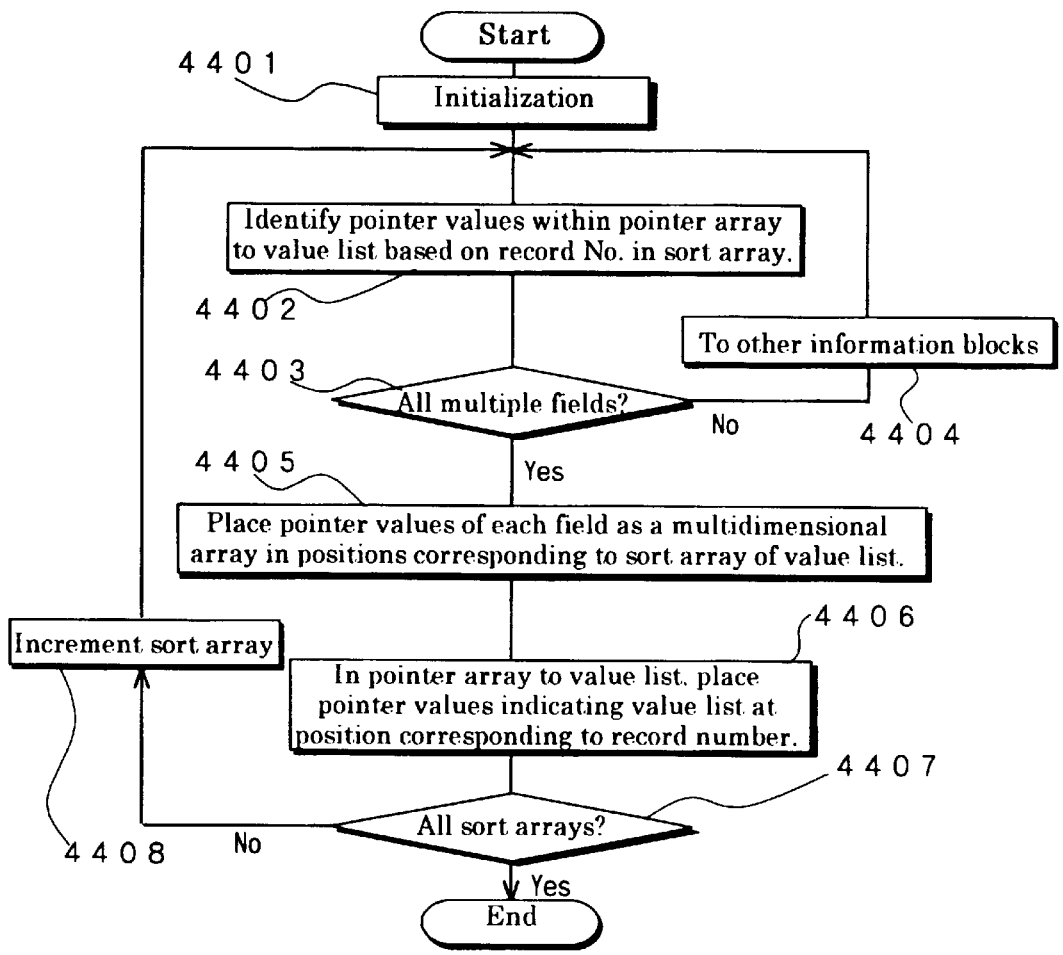
FIG. 44 is a diagram used to explain the value lists having pointer values with are multidimensional arrays consisting of concatenated multiple fields according to Embodiment 7, and the process of generating pointer arrays.

Next, by performing a lookup of the record number in the sort array, a value list with multiple fields concatenated and an array of pointers to the value list are generated (Step 4203). More specifically, as shown in FIG. 44, after the numbers of the sort array are initialized (Step 4401), regarding the array of pointers to the value lists within the information blocks corresponding to one of the multiple fields, the pointer value stored at the position indicated by the record number as stored in the sort array is identified (Step 4402). When the process of Step 4402 is performed for all of the aforementioned multiple fields (see Steps 4403 and 4404), a plurality of pointer values are placed in the new value list at positions corresponding to the number in the sort array, in the appropriate order (Step 4405). The plurality of pointer values placed in this manner (pointer values which are the multidimensional array) become the field values within the value list.

Moreover, the pointer values corresponding to the pointer array for specifying the field values of the aforementioned new value list are generated (Step 4406). To wit, values indicating the position at which the field value is stored are stored at the positions corresponding to the record number. Thereby, the record number can be used to fetch the corresponding pointer value within the array of pointers to the value list and to fetch the field value indicated by the pointer value in the value list in which the pointer value of the multidimensional array is stored as the field value.

The process of the aforementioned Step 4402 through Step 4407 is executed for all numbers in the sort array (see Steps 4407 and 4408), and processing then is complete.

Figure 45:
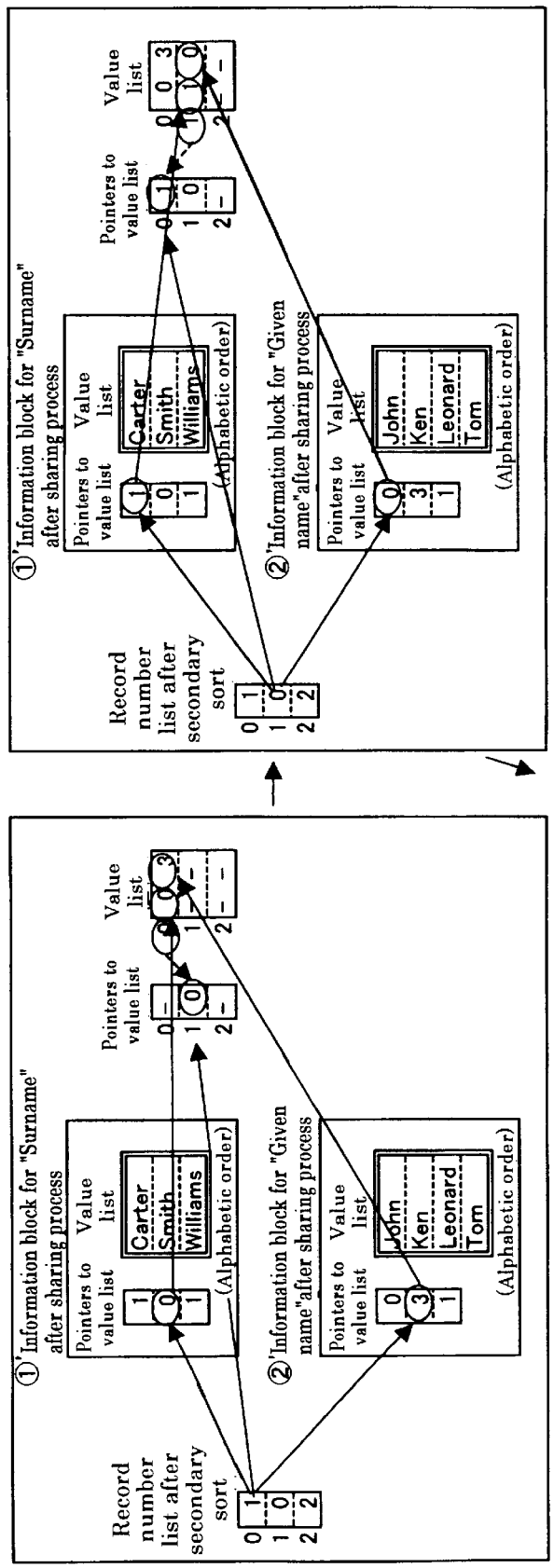
FIG. 45 is a diagram showing a new information block created according to Embodiment 7 in a master table on which the sort process shown in FIG. 43 was performed.
Figure 46:
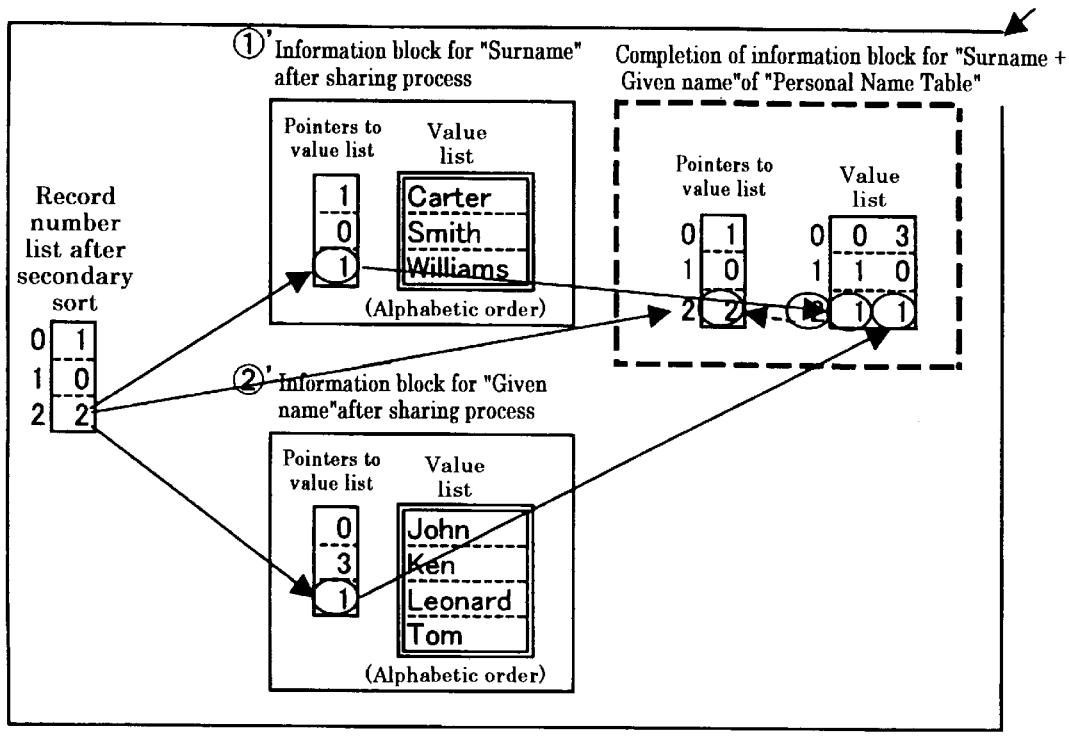
FIG. 46 is a diagram showing a new information block created according to Embodiment 7 in a master table on which the sort process shown in FIG. 43 was performed.

FIG. 45 and FIG. 46 are diagrams showing an example of the creation of the "Surname+Given name" information block after the sorting process shown in FIG. 43. As shown in FIG. 45, "1" is the record number stored at the beginning (first position) of the sort array (sorted record number list), so the pointer values at the corresponding position (row 2) in the arrays of pointers to the value lists of the various information blocks are fetched, and the two-dimensional array "0 3" is stored at the beginning position in the field list of the new information block for "Surname+Given name" in the order determined by these pointer values "0" and "3." In addition, the position at which the value list in question is stored is placed at the position indicated by the record number in the pointer array, as a pointer value to the value list. For the other record numbers stored in the sort array also, the field value which is a two-dimensional array and the pointer value in the array of pointers to the value list are stored by the same procedure.

Figure 47:
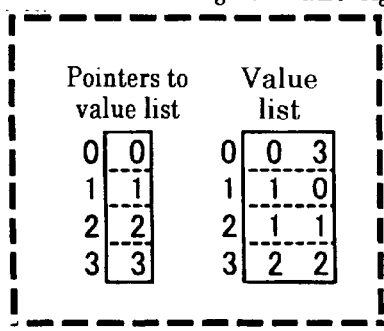
FIG. 47 is a diagram showing a new information block related to a slave table according to Embodiment 7.

Regarding the slave table also, the same process as in Step 4202 and Step 4203 is executed (Steps 4204 and 4205). Regarding the aforementioned example, the information block for "Age/Surname+Age/Given name" of the "Age Table" is generated and the required arrays of pointers to the value lists and value list that have field values of two-dimensional arrays are created (see FIG. 47).

When value lists that represent multiple fields as the field values of a two-dimensional array are obtained in the master table and slave table in this manner, the information blocks containing these value lists and the other information blocks regarding the fields to be displayed in the table (view) are used to execute the same process as in FIG. 11. To wit, the value lists which represent multiple fields as the field values of a two-dimensional array are shared (see Step 1101 through Step 1105). Next, in order to identify the field values of the value list within the aforementioned other information blocks, an array of pointers to record numbers is generated (Step 1106). Once the updating and generation of the appropriate pointer arrays and value lists is performed in this manner, the process shown in FIG. 12 is executed and the desired table (view) is created by fetching field values.

Figure 48:
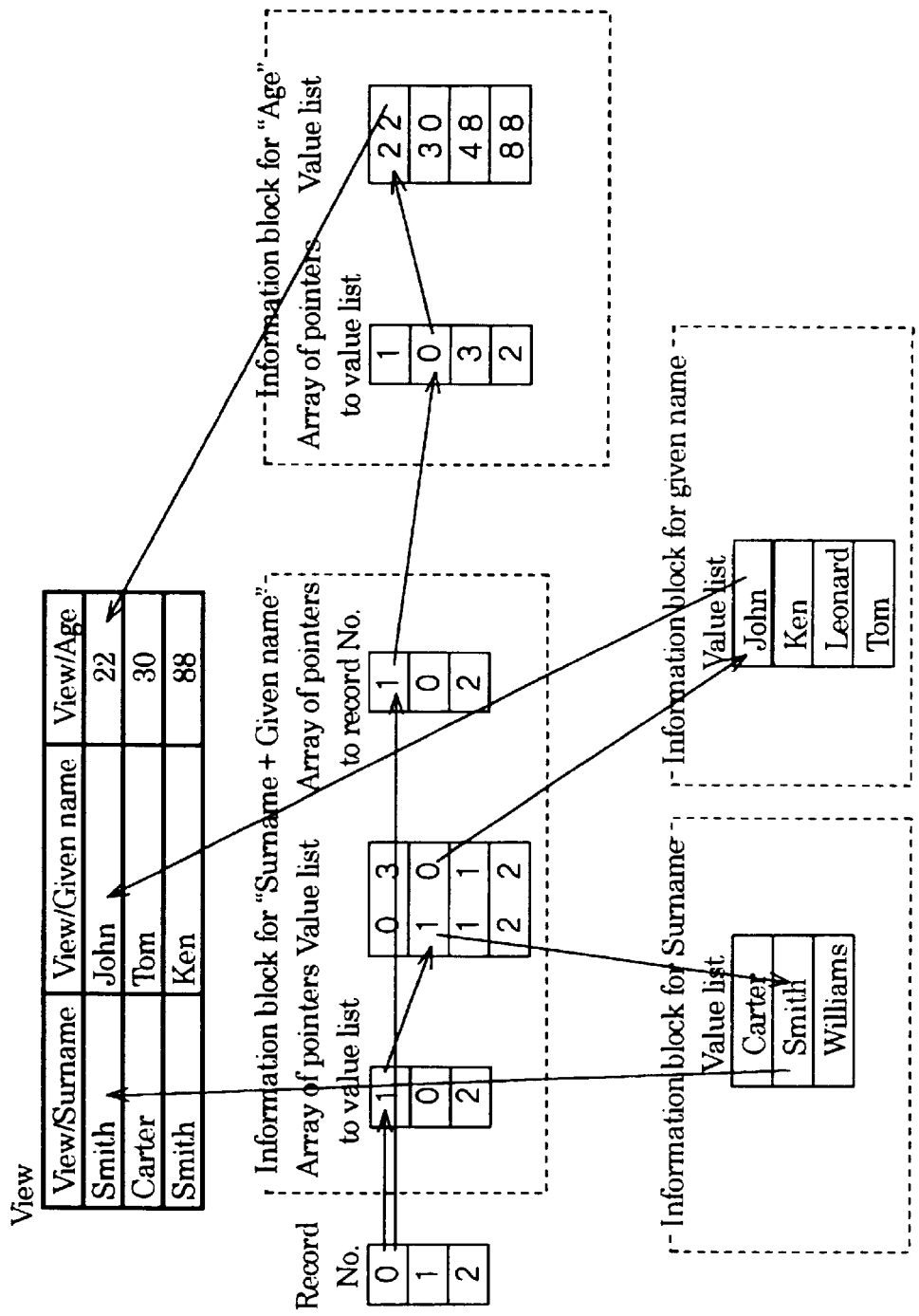
FIG. 48 is a diagram used to explain the process of creation of tables (views) according to the process of Embodiment 7.

FIG. 48 is a diagram used to explain the process of creation of tables (views) according to the process shown in FIG. 12 in Embodiment 7. For example, regarding the record number "0," in the information block that contains a value list in which multiple fields are represented as field values of a two-dimensional array (the information block for "Surname"+"Given name"), "0 3" is the pointer value within the array of pointers to the corresponding value list. Among these values, the former (namely "0") has the meaning of the field value of "Smith" while the latter (namely "3") has the meaning of the field value of "John." On the other hand, with respect to the record number of "0," "1" is the corresponding value in the array of pointers to record numbers of other tables. Accordingly, in the information block for "Age," the pointer value "0" is found at the corresponding position in the array of pointers to the value list within the information block for "Age." Accordingly, the field value of "22" at the position pointed to by the pointer value is displayed on the beginning line. It need not be said that the field values are obtained by the same procedure for the other record numbers.

By means of this embodiment, it is possible to reduce the memory size required while also achieving the joining of a plurality of fields.

[Discussion of Processing Speed]

Here follows a brief discussion of a comparison of the process of using the techniques described in the embodiment of the present invention to join table-format data and create a table (view) containing specific fields within the joined table-format data, and the process of using the conventional method to create the same type of table (view).

Regarding this embodiment of the present invention, we operated a PentiumPro® processor at 200 MHz and created a set of information blocks constituting the table-format data in RAM. The table-format data used consisted of a user table (10000 records) containing a user ID (0–9999: field 1) and the name of a favorite baseball team (12 teams: field 2), and a game table (120×12=1440 records) containing a game number (0–119: field 1), baseball team name (12 teams: field 2), and the scores in each game (0–19 points), and for each user, we created a list of the scores for the teams of each user's favorite baseball team. In this case, the total number of records becomes 10000 (users)×120 (games)=1,200,000 records. Creating the lists for the aforementioned records using the method of conserving memory for both the master table and slave table required an average of 0.195 seconds.

In contrast, when the conventional techniques were followed on a machine using the commercial database software InterBase® 4.2 and Paradox® 7 as the client (with a PentiumPro® processor performing the aforementioned process under identical conditions), joining the aforementioned table-format data and creating a view required 510 seconds. Accordingly, by means of the present invention, one can see that the joining of table-format data and creation of a table (view) was achieved at roughly 3000 times the speed of the conventional process.

The present invention is in no way limited to the aforementioned embodiments, but rather various modifications are possible within the scope of the invention, and naturally these are included within the scope of the present invention.

For example, in the aforementioned Embodiment 1, here follows a description of the case of displaying a table (view) sorted on a field other than the key field. In the case of displaying a table (view) sorted on the key field as shown in FIG. 18A, regarding the information block serving as the key field (the information block for "Service ID" in the aforementioned example), the number of records (count array) in the main table-format data is calculated for each field value in the value list, and they are replaced in the state of the record numbers of the main table-format data being sorted based thereupon (see FIG. 17), but a certain amount of extra procedure is added in order to sort on other fields.

Figure 49A:
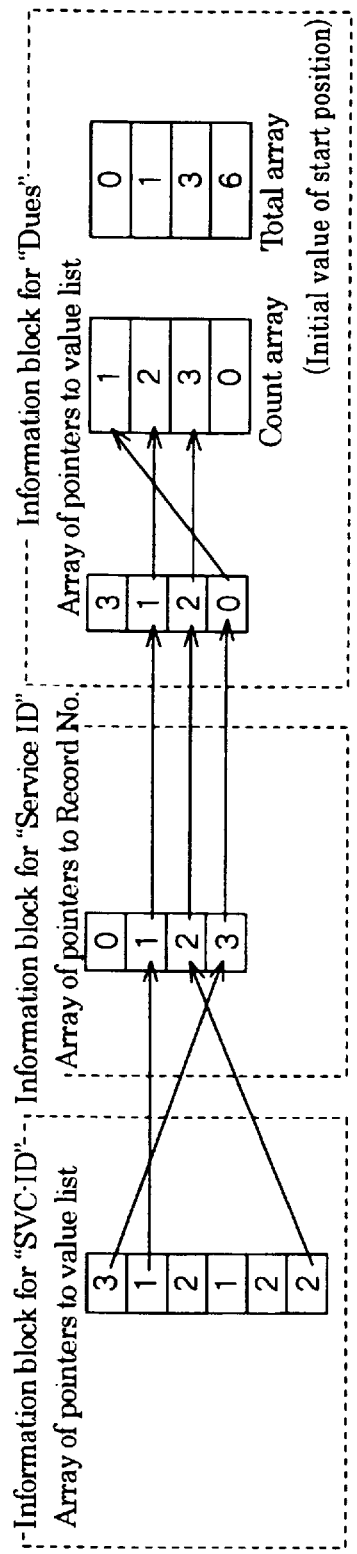
FIGS. 49A and 49B are diagrams used to explain the process of obtaining tables (views) sorted on other fields in the first embodiment.
Figure 49B:
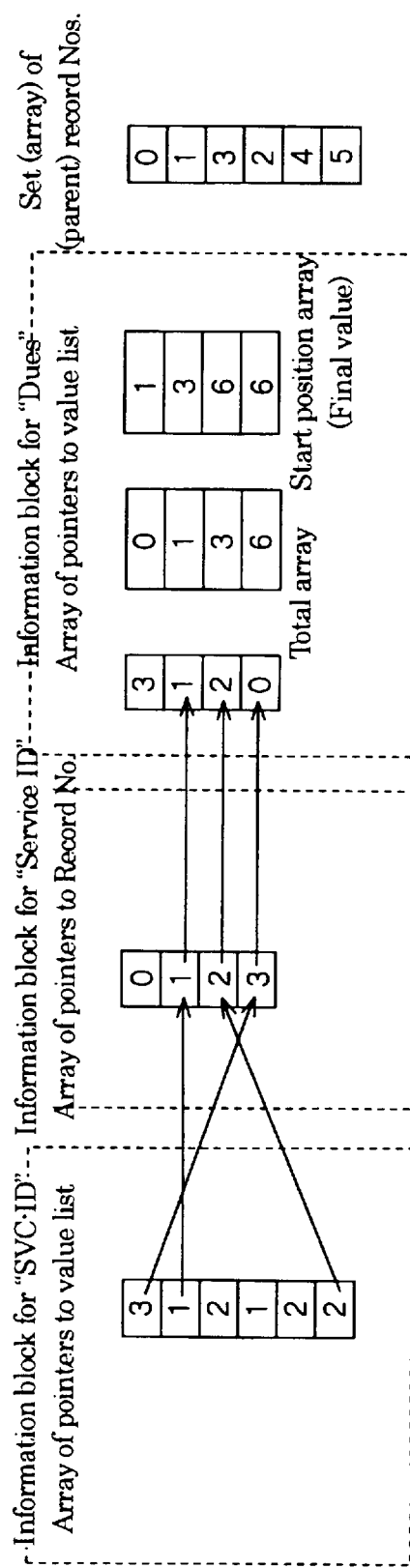

In the technique according to Embodiment 1, as shown in FIG. 49A, the information block regarding the key field (in this case, the information block for "Service ID") serves as the intermediary for the creation of the count arrays, total arrays and the like of other information blocks (in this case, the information block for "Dues"). To wit, the information block containing the shared value list serves as the intermediary for generating an array of record numbers (parent record numbers) regarding the sorted main table-format data (see FIG. 49B).

In addition, in the previous embodiments, the identification of the information blocks whose value lists are to be shared, the calculation of the count arrays and/or start position arrays, and the generation of conversion arrays had been performed for each join and table (view) creation, but rather it is also possible to perform in advance the joining of those thought to be necessary or the generation of the required arrays. Moreover, the construction of information blocks of the stipulated format based on table-format data may be performed in advance at the time of receipt of the table-format data, or it may be performed in response to the command to create the table (view).

Moreover, the aforementioned Embodiments 6 and 7 describe the technique of joining two fields in a plurality of tables of table-format data and presenting field values related to a stipulated field, but it need not be said that it is also possible to join three or more fields. For example, regarding the aforementioned Embodiment 6, it is sufficient to create an array of pointers to a virtual value list containing (p×q×r) pointer values as described above and determine the correspondence to this virtual value list. Alternately, regarding Embodiment 7, a value list may be provided as a set of multidimensional arrays each consisting of three or more values.

Moreover, in the aforementioned embodiments, the process of joining a plurality of tables of table-format data and performing various operations on the joined table-format data is implemented by loading a stipulated program into a typical computer system 10 and executing this program, but the present invention is in no way limited to this, but rather it need not be said that it may also be implemented by connecting a board computer specialized for database processing to a personal computer or other ordinary computer system and having the aforementioned processing be performed by said board computer. Accordingly, in this Specification, a means does not necessarily refer to a physical means, but rather it also includes the case in which the functions of the various means are implemented in software. Moreover, the functions of one means may be implemented in two or more physical means or the functions of two or more means may be implemented by one physical means.

As described above, by means of the present invention, it is possible to provide a structure for table-format data that permits a plurality of tables of table-format data to be joined as desired and that has a small data size, along with a concatenation method and method of presenting the concatenated table-format data.

FIELD OF THE INVENTION

The present invention is usable in systems that handle large amounts of data, for example, databases and data warehouses. More specifically, it is usable in large-scale scientific and technical calculation, control systems for plants and power supply and the like, and to order management and the management of mission-critical clerical work such as securities trading.

What is claimed is:

1. A method of concatenating a plurality of tables of table-format data where each table is represented by an array of records containing a field and the field values contained therein, wherein
said method is characterized in comprising the steps of:
constructing each table of table-format data in a manner such that each table is divided into one or more information blocks consisting of: a value list in which the field values are stored in the order of a field value number corresponding to the field value belonging to a specified field, and a pointer array in which pointer values for pointing to said field value numbers are stored in a unique record order, finding equivalent fields among a plurality of tables of table-format data, identifying the information blocks for said equivalent fields, in each of said plurality of tables of table-format data, comparing the value lists contained in said identified information blocks, and setting both value lists to the same values, at the time of setting said value lists to the same values, adding pointer values to associated pointer arrays in the information block to which that field value is added, and by making the value lists contained in the information blocks for specific fields in said plurality of tables of table-format data equivalent, concatenating the table-format data.

2. The data concatenation method according to claim 1, characterized in that, regarding said information blocks containing value lists that were made equivalent, only a single one of the value lists is actually saved.

3. A method of presenting concatenated table-format data characterized in comprising the steps of:

preparing a plurality of tables of table-format data in which the value lists contained in information blocks for specific fields were made equivalent by means of the concatenation method recited in claim 1, regarding said plurality of tables of table-format data, among said information blocks for specific fields, identifying information blocks related to key fields in which the pointer values of the pointer array are not duplicated, and determining the table-format data containing said information blocks to be sub table-format data, in one of the information blocks, generating a second pointer array that identifies the record numbers of said sub table-format data in the order of the field values of the field list, among the information blocks contained in said plurality of tables of table-format data, identifying the information blocks related to the fields to be presented, among said information blocks related to fields to be presented, regarding information blocks that constitute the main table-format data which is the table-format data other than said sub table-format data, looking up pointer values within the pointer array corresponding to a stipulated record number and obtaining a stipulated field value, among said information blocks related to fields to be presented, regarding information blocks that constitute said sub table-format data, looking up record numbers corresponding to a stipulated record number and obtaining a record number regarding the sub table-format data within the corresponding said second pointer array, in the information block constituting said sub table-format data, looking up a pointer value within the pointer array corresponding to the record number regarding said sub table-format data, and obtaining a stipulated field value, and presenting the field value thus obtained.

4. The method of presenting table-format data according to claim 3, characterized in comprising the steps of:

in the information block related to said key field, generating a second pointer array containing pointer values for specifying record numbers in the order of the field values of the field list contained in said information block, and among the information blocks related to the fields to be presented, in information blocks that constitute the sub table-format data, looking up a pointer value within the pointer array corresponding to said stipulated record number, identifying the record number regarding the sub table-format data within the corresponding second pointer array, and in information blocks that constitute said sub table-format data, looking up a pointer value within the pointer array corresponding to said record number within said second pointer array, and thus obtaining a stipulated field value.

5. The method of presenting table-format data according to claim 3, characterized in comprising the steps of:

in an information block that constitutes said main table-format data and that is an information block wherein its value list was made equivalent, generating a second pointer array containing pointer values for specifying record numbers of said sub table-format data in the order of the field values of the field list, identifying a record number regarding sub table-format data within said second pointer array corresponding to said stipulated record number, among said information blocks related to the fields to be presented, in information blocks that constitute said sub table-format data, looking up a pointer value within the pointer array corresponding to the record number regarding said sub table-format data, and thus obtaining a stipulated field value.

6. The method of presenting table-format data according to claim 3, characterized in comprising the steps of:

among the information blocks that constitute said sub table-format data, in at least the information block related to the field to be presented, generating a second pointer array containing pointer values for specifying record numbers of said sub table-format data in the order of the field values of the field list, and among the information blocks related to the fields to be presented, in information blocks that constitute the sub table-format data, looking up a pointer value within the pointer array corresponding to said stipulated record number, identifying the record number regarding the sub table-format data within the corresponding second pointer array, and in information blocks that constitute said sub table-format data, looking up a pointer value within the pointer array corresponding to said record number within said second pointer array, and thus obtaining a stipulated field value.

7. The method of presenting table-format data according to claim 3, characterized in further comprising the steps of:

in information blocks in which the field values are to be sorted according to a stipulated order, generating a count that indicates the number of records related to the main table-format data in a count array corresponding to the field value, generating a position indicating array that indicates the initial value of the position at which the record numbers regarding said main table-format data are stored according to said count array, placing the record numbers of said main table-format data according to the position indicating array at the position indicated by the corresponding pointer value, and also, incrementing the value corresponding to said position indicating array, thereby generating a sort array in which the record numbers of the main table-format data are sorted and stored, and obtaining the required field vales in the order of record numbers stored in said sort array, and presenting the field values sorted based on said key field.

8. The method of presenting table-format data according to claim 7, characterized in that, in the information block regarding the key field, generating a count array that stores a count that indicates the number of pointer values within a pointer array of an information block that constitutes said main table-format data and that is an information block wherein its value list was made equivalent to said information block, in the order of the value list within the information block for said key field.

9. The method of presenting table-format data according to claim 7, characterized in that, in information blocks in which said field values are to be sorted using a pointer array within the information block that constitutes the main table-format data equivalent to the information block regarding the key field, and said second pointer array, generating a count array that stores a count that indicates the number of records regarding main table-format data.

10. A method of presenting table-format data characterized in comprising the steps of:

preparing a plurality of tables of table-format data in which the value lists contained in information blocks for specific fields were made equivalent by means of the concatenation method recited in claim 1, regarding said plurality of tables of table-format data, among said information blocks for specific fields, determining the table-format data in which the default sort order at the time of presentation is reflected to be master table-format data, and determining all other table-format data to be slave table-format data, in an information block that constitutes said slave table-format data and that is an information block wherein its value list was made equivalent, generating a first count array that stores a count that indicates the number of records regarding the slave table-format data corresponding to the field value, according to said first count array, generating a first position indicating array that determines the initial position for placement of said slave table-format data in the state when the record numbers are sorted, placing the record numbers of said slave table-format data according to the first position indicating array at the position indicated by the corresponding pointer value, and also, incrementing the value corresponding to said position indicating array, thereby generating a first sort array in which the record numbers of the main table-format data are sorted and stored, and looking up the initial value and final value of said position indicating array, and the pointer array within the information block wherein its value list was made equivalent regarding said master table-format data, detecting the degree of duplication of the pointer array of the other information block regarding said master table-format data, and expanding the pointer array according to said degree of duplication, looking up the initial value and final value of said position indicating array, and said sort array, detecting the degree of duplication of the pointer array of the information block regarding said master table-format data, and expanding the pointer array according to said degree of duplication, and obtaining and presenting the required field value based on said expanded pointer array.

11. The method of presenting table-format data according to claim 10, characterized in comprising the steps of:

generating a first conversion array wherein the record numbers of the master table-format data are duplicated based on said degree of duplication and placed, and regarding said master table-format data, looking up the array of pointers to the value list of the information block according to said first conversion array, and fetching the field value of the list.

12. The method of presenting table-format data according to claim 10, characterized in comprising the steps of:

generating a second conversion array wherein the record numbers of said master table-format data, and the record numbers of the slave table-format data are duplicated based on the associated degree of duplication and placed, and regarding said slave table-format data, looking up the array of pointers to the value list of the information block according to said second conversion array, and fetching the field value of the list.

13. A method of presenting concatenated table-format data characterized in comprising the steps of:

preparing a plurality of tables of table-format data in which the value lists contained in information blocks for two or more specific fields were made equivalent by means of the concatenation method recited in claim 1, regarding said plurality of tables of table-format data, among said information blocks for specific fields, determining the table-format data in which the default sort order at the time of presentation is reflected to be master table-format data, and determining all other table-format data to be slave table-format data, regarding said master table-format data, generating an array of pointers to a virtual value list which is a product set of the two or more value lists that were made equivalent, regarding said slave table-format data, generating a second array of pointers to said virtual value list, generating a third pointer array that identifies the record number of said slave table-format data in the order of the field values of said virtual value list, among the information blocks contained in said plurality of tables of table-format data, identifying those information blocks regarding fields to be presented, among said information blocks regarding fields to be presented, regarding the information blocks that constitute table-format data, looking up the pointer value within the pointer array corresponding to a stipulated record number, obtaining a stipulated field value, among said information blocks regarding fields to be presented, regarding the information blocks that constitute said sub table-format data, looking up the record number corresponding to a stipulated record number, and identifying the record number of said slave table-format data within said third pointer array based on the corresponding pointer value within the array of pointers to said virtual value list, in said information block constituting said slave table-format data, looking up the pointer value within the pointer array corresponding to the record number regarding said slave table-format data, and obtaining a stipulated field value, and presenting the field value thus obtained.

14. The method of presenting table-format data according to claim 13, characterized in that, when there are two of said information blocks that have value lists that were made equivalent, and p is the number of field values in the value list that was made equivalent regarding one information block, while q is the number of field values in the value list that was made equivalent regarding the other information block, the pointer value $Pm_i$ ($0 \leq i \leq p-1$) to said virtual value list regarding said master table-format data is expressed as follows:

$$Pm_i = Pm_{1i} * q + Pm_{2i}$$

(where $Pm_{1i}$ is the field value of the value list regarding one of the information blocks, and $Pm_{2i}$ is the field value of the value list regarding the other information block), and the pointer value $Ps_j$ ($0 \leq j \leq p-1$) to said virtual value list regarding said slave table-format data is expressed as follows:

$$Ps_j = Ps_{1j} * q + Ps_{2j}$$

(where $Ps_{1j}$ is the field value of the value list regarding one of the information blocks, and $Ps_{2j}$ is the field value of the value list regarding the other information block).

15. A method of presenting table-format data characterized in comprising the steps of:

preparing a plurality of tables of table-format data in which the value lists contained in information blocks for two or more specific fields were made equivalent by means of the concatenation method recited in claim 1, regarding said plurality of tables of table-format data, among said information blocks for specific fields, determining the table-format data in which the default sort order at the time of presentation is reflected to be master table-format data, and determining all other table-format data to be slave table-format data, regarding said master table-format data and master table-format records respectively, generating a first sort array by sorting said record numbers on a field other than the field in which the default sort order is reflected, and finally sorting said record numbers on the field in which said sort order is reflected, looking up the record numbers within said first sort array, and fetching the respective corresponding field values of the two or more value lists regarding said two or more fields, storing the field values thus fetched in a multidimensional array at positions corresponding to a multidimensional list containing field values consisting of multidimensional arrays of two or more field values, storing said record numbers in positions corresponding to said record numbers in the pointer arrays for identifying the multidimensional arrays of said multidimensional value list, in one of the information blocks, generating a second pointer array that identifies the record numbers of said slave table-format data in the field value of the value list, among said information blocks regarding fields to be presented, regarding the information blocks that constitute said master table-format data, looking up the pointer value of a pointer array for identifying multidimensional value lists corresponding to a stipulated record number and/or pointer values of other pointer arrays, and obtaining a stipulated field value, among said information blocks regarding fields to be presented, regarding the information blocks that constitute said slave table-format data, looking up the record number corresponding to said stipulated record number, and identifying the record number regarding the slave table-format data within said corresponding second pointer array, in said information blocks that constitute said sub table-format data, looking up the pointer value of a pointer array for identifying multidimensional value lists corresponding to a record number regarding said slave table-format data, and/or pointer values within pointer arrays, and obtaining a stipulated field value, and presenting the field value thus obtained.

16. A recording medium recorded with a program that can execute in a computer system a method of concatenating a plurality of tables of table-format data where each table is represented by an array of records containing a field and the field values contained therein, wherein said recording medium is recorded with a program characterized in comprising the steps of:

constructing each table of table-format data in a manner such that each table is divided into one or more information blocks consisting of: a value list in which the field values are stored in the order of a field value number corresponding to the field value belonging to a specified field, and a pointer array in which pointer values for pointing to said field value numbers are stored in a unique record order, finding equivalent fields among a plurality of tables of table-format data, identifying the information blocks for said equivalent fields, in each of said plurality of tables of table-format data, comparing the value lists contained in said identified information blocks, and setting both value lists to the same values, at the time of setting said value lists to the same values, adding pointer values to associated pointer arrays in the information block to which that field value is added, and by making the value lists contained in the information blocks for specific fields in said plurality of tables of table-format data equivalent, concatenating the table-format data.

17. A recording medium recorded with a program that can execute in a computer system a method of presenting field values regarding specific fields based on a plurality of tables of table-format data in which the value lists contained in information blocks regarding specific fields were made equivalent by the concatenation method based on the program according to claim 16, characterized in comprising the steps of:

regarding said plurality of tables of table-format data, among said information blocks for specific fields, identifying information blocks related to key fields in which the pointer values of the pointer array are not duplicated, and determining the table-format data containing said information blocks to be sub table-format data, in one of the information blocks, generating a second pointer array that identifies the record numbers of said sub table-format data in the order of the field values of the field list, among the information blocks contained in said plurality of tables of table-format data, identifying the information blocks related to the fields to be presented, among said information blocks related to fields to be presented, regarding information blocks that constitute the main table-format data which is the table-format data other than said sub table-format data, looking up pointer values within the pointer array corresponding to a stipulated record number and obtaining a stipulated field value, among said information blocks related to fields to be presented, regarding information blocks that constitute said sub table-format data, looking up record numbers corresponding to a stipulated record number and obtaining a record number regarding the sub table-format data within the corresponding said second pointer array, in the information block constituting said sub table-format data, looking up a pointer value within the pointer array corresponding to the record number regarding said sub table-format data, and obtaining a stipulated field value, and presenting the field value thus obtained.

18. A recording medium recorded with the program according to claim 17, characterized in comprising the steps of:

in the information block related to said key field, generating a second pointer array containing pointer values for specifying record numbers in the order of the field values of the field list contained in said information block, and among the information blocks related to the fields to be presented, in information blocks that constitute the sub table-format data, looking up a pointer value within the pointer array corresponding to said stipulated record number, identifying the record number regarding the sub table-format data within the corresponding second pointer array, and in information blocks that constitute said sub table-format data, looking up a pointer value within the pointer array corresponding to said record number within said second pointer array, and thus obtaining a stipulated field value.

19. A recording medium recorded with the program according to claim 17, characterized in comprising the steps of:

in an information block that constitutes said main table-format data and that is an information block wherein its value list was made equivalent, generating a second pointer array containing pointer values for specifying record numbers of said sub table-format data in the order of the field values of the field list, identifying a record number regarding sub table-format data within said second pointer array corresponding to said stipulated record number, among said information blocks related to the fields to be presented, in information blocks that constitute said sub table-format data, looking up a pointer value within the pointer array corresponding to the record number regarding said sub table-format data, and thus obtaining a stipulated field value.

20. A recording medium recorded with the program according to claim 17, characterized in comprising the steps of:

among the information blocks that constitute said sub table-format data, in at least the information block related to the field to be presented, generating a second pointer array containing pointer values for specifying record numbers of said sub table-format data in the order of the field values of the field list, and among the information blocks related to the fields to be presented, in information blocks that constitute the sub table-format data, looking up a pointer value within the pointer array corresponding to said stipulated record number, identifying the record number regarding the sub table-format data within the corresponding second pointer array, and in information blocks that constitute said sub table-format data, looking up a pointer value within the pointer array corresponding to said record number within said second pointer array, and thus obtaining a stipulated field value.

21. A recording medium recorded with the program according to claim 18, characterized in further comprising the steps of:

in information blocks in which the field values are to be sorted according to a stipulated order, generating a count that indicates the number of records related to the main table-format data in a count array corresponding to the field value, generating a position indicating array that indicates the initial value of the position at which the record numbers regarding said main table-format data are stored according to said count array, placing the record numbers of said main table-format data according to the position indicating array at the position indicated by the corresponding pointer value, and also, incrementing the value corresponding to said position indicating array, thereby generating a sort array in which the record numbers of the main table-format data are sorted and stored, and obtaining the required field vales in the order of record numbers stored in said sort array, and presenting the field values sorted based on said key field.

22. A recording medium recorded with the program according to claim 21, characterized in that, in the information block regarding the key field, generating a count array that stores a count that indicates the number of pointer values within a pointer array of an information block that constitutes said main table-format data and that is an information block wherein its value list was made equivalent to said information block, in the order of the value list within the information block for said key field.

23. A recording medium recorded with the program according to claim 21, characterized in that, in information blocks in which said field values are to be sorted using a pointer array within the information block that constitutes the main table-format data equivalent to the information block regarding the key field, and said second pointer array, generating a count array that stores a count that indicates the number of records regarding main table-format data.

24. A recording medium recorded with a program that can execute in a computer system a method of presenting field values regarding specific fields based on a plurality of tables of table-format data in which the value lists contained in information blocks regarding specific fields were made equivalent by the concatenation method based on the program according to claim 16, characterized in comprising the steps of:

regarding said plurality of tables of table-format data, among said information blocks for specific fields, determining the table-format data in which the default sort order at the time of presentation is reflected to be master table-format data, and determining all other table-format data to be slave table-format data, in an information block that constitutes said slave table-format data and that is an information block wherein its value list was made equivalent, generating a first count array that stores a count that indicates the number of records regarding the slave table-format data corresponding to the field value, according to said first count array, generating a first position indicating array that determines the initial position for placement of said slave table-format data in the state when the record numbers are sorted, placing the record numbers of said slave table-format data according to the first position indicating array at the position indicated by the corresponding pointer value, and also, incrementing the value corresponding to said position indicating array, thereby generating a first sort array in which the record numbers of the main table-format data are sorted and stored, and looking up the initial value and final value of said position indicating array, and the pointer array within the information block wherein its value list was made equivalent regarding said master table-format data, detecting the degree of duplication of the pointer array of the other information block regarding said master table-format data, and expanding the pointer array according to said degree of duplication, looking up the initial value and final value of said position indicating array, and said sort array, detecting the degree of duplication of the pointer array of the information block regarding said master table-format data, and expanding the pointer array according to said degree of duplication, and obtaining and presenting the required field value based on said expanded pointer array.

25. A recording medium recorded with the program according to claim 24, characterized in comprising the steps of:

generating a first conversion array wherein the record numbers of the master table-format data are duplicated based on said degree of duplication and placed, and regarding said master table-format data, looking up the array of pointers to the value list of the information block according to said first conversion array, and fetching the field value of the list.

26. A recording medium recorded with the program according to claim 24, characterized in comprising the steps of:

generating a second conversion array wherein the record numbers of said master table-format data, and the record numbers of the slave table-format data are duplicated based on the associated degree of duplication and placed, and regarding said slave table-format data, looking up the array of pointers to the value list of the information block according to said second conversion array, and fetching the field value of the list.

27. A recording medium recorded with a program that can execute in a computer system a method of presenting field values regarding specific fields based on a plurality of tables of table-format data in which the value lists contained in information blocks regarding specific fields were made equivalent by the concatenation method based on the program according to claim 16, characterized in comprising the steps of:

regarding said plurality of tables of table-format data, among said information blocks for specific fields, determining the table-format data in which the default sort order at the time of presentation is reflected to be master table-format data, and determining all other table-format data to be slave table-format data, regarding said master table-format data, generating an array of pointers to a virtual value list which is a product set of the two or more value lists that were made equivalent, regarding said slave table-format data, generating a second array of pointers to said virtual value list, generating a third pointer array that identifies the record number of said slave table-format data in the order of the field values of said virtual value list, among the information blocks contained in said plurality of tables of table-format data, identifying those information blocks regarding fields to be presented, among said information blocks regarding fields to be presented, regarding the information blocks that constitute table-format data, looking up the pointer value within the pointer array corresponding to a stipulated record number, obtaining a stipulated field value, among said information blocks regarding fields to be presented, regarding the information blocks that constitute said sub table-format data, looking up the record number corresponding to a stipulated record number, and identifying the record number of said slave table-format data within said third pointer array based on the corresponding pointer value within the array of pointers to said virtual value list, in said information block constituting said slave table-format data, looking up the pointer value within the pointer array corresponding to the record number regarding said slave table-format data, and obtaining a stipulated field value, and presenting the field value thus obtained.

28. A recording medium recorded with a program that can execute in a computer system a method of presenting field values regarding specific fields based on a plurality of tables of table-format data in which the value lists contained in information blocks regarding specific fields were made equivalent by the concatenation method based on the program according to claim 16, characterized in comprising the steps of:

regarding said plurality of tables of table-format data, among said information blocks for specific fields, determining the table-format data in which the default sort order at the time of presentation is reflected to be master table-format data, and determining all other table-format data to be slave table-format data, regarding said master table-format data and master table-format records respectively, generating a first sort array by sorting said record numbers on a field other than the field in which the default sort order is-reflected, and finally sorting said record numbers on the field in which said sort order is reflected, looking up the record numbers within said first sort array, and fetching the respective corresponding field values of the two or more value lists regarding said two or more fields, storing the field values thus fetched in a multidimensional array at positions corresponding to a multidimensional list containing field values consisting of multidimensional arrays of two or more field values, storing said record numbers in positions corresponding to said record numbers in the pointer arrays for identifying the multidimensional arrays of said multidimensional value list, in one of the information blocks, generating a second pointer array that identifies the record numbers of said slave table-format data in the order of the field value of the value list, among said information blocks regarding fields to be presented, regarding the information blocks that constitute said master table-format data, looking up the pointer value of a pointer array for identifying multi-dimensional value lists corresponding to a stipulated record number and/or pointer values of other pointer arrays, and obtaining a stipulated field value, among said information blocks regarding fields to be presented, regarding the information blocks that constitute said slave table-format data, looking up the record number corresponding to said stipulated record number, and identifying the record number regarding the slave table-format data within said corresponding second pointer array, in said information blocks that constitute said sub table-format data, looking up the pointer value of a pointer array for identifying multidimensional value lists corresponding to a record number regarding said slave table-format data, and/or pointer values within pointer arrays, and obtaining a stipulated field value, and presenting the field value thus obtained.

29. A table-format data concatenation apparatus that concatenates a plurality of tables of table-format data where each table is represented by an array of records containing a field and the field values contained therein, comprising:

data division means that divides each table of table-format data into one or more information blocks consisting of: a value list in which the field values are stored in the order of a field value number corresponding to the field value belonging to a specified field, and a pointer array in which pointer values for pointing to said field value numbers are stored in a unique record order, shared field identification means that finds equivalent fields among a plurality of tables of table-format data, and identifies the information blocks for said equivalent fields, value list sharing means that, in each of said plurality of tables of table-format data, compares the value lists contained in said identified information blocks, and sets both value lists to the same values, and pointer value updating means that, at the time of setting said value lists to the same values, adds pointer values to associated pointer arrays in the information block to which that field value is added, thus, by making the value lists contained in the information blocks for specific fields in said plurality of tables of table-format data equivalent, the table-format data is concatenated.

30. A data presentation apparatus that presents field values regarding specific fields based on a plurality of tables of table-format data in which the value lists contained in information blocks regarding specific fields were made equivalent by the table-format data concatenation apparatus according to claim 29, characterized in comprising:

key field determination means that, regarding said plurality of tables of table-format data, among said information blocks for specific fields, identifies information blocks related to key fields in which the pointer values of the pointer array are not duplicated, and determines the table-format data containing said information blocks to be sub table-format data, second pointer generation means that, in one of the information blocks, generates a second pointer array that identifies the record numbers of said sub table-format data in the order of the field values of the field list, presentation item identification means that, among the information blocks contained in said plurality of tables of table-format data, identifies the information blocks related to the fields to be presented, first field value obtaining means that, among said information blocks related to fields to be presented, regarding information blocks that constitute the main table-format data which is the table-format data other than said sub table-format data, looks up pointer values within the pointer array corresponding to a stipulated record number and obtains a stipulated field value, sub table-format record identification means that, among said information blocks related to fields to be presented, regarding information blocks that constitute said sub table-format data, looks up record numbers corresponding to a stipulated record number and obtains a record number regarding the sub table-format data within the corresponding said second pointer array, and second field value obtaining means that, in the information block constituting said sub table-format data, looks up a pointer value within the pointer array corresponding to the record number regarding said sub table-format data, and obtains a stipulated field value, thus presenting the field value thus obtained.

31. A data presentation apparatus that presents field values regarding specific fields based on a plurality of tables of table-format data in which the value lists contained in information blocks regarding specific fields were made equivalent by the table-format data concatenation apparatus according to claim 29, characterized in comprising:

master/slave determination means that, regarding said plurality of tables of table-format data, among said information blocks for specific fields, determines the table-format data in which the default sort order at the time of presentation is reflected to be master table-format data, and determines all other table-format data to be slave table-format data, first count array generation means that, in an information block that constitutes said slave table-format data and that is an information block wherein its value list was made equivalent, generates a first count array that stores a count that indicates the number of records regarding the slave table-format data corresponding to the field value, first position indicating array generation means that, according to said first count array, generates a first position indicating array that determines the initial position for placement of said slave table-format data in the state when the record numbers are sorted, first sort array generation means that, by placing the record numbers of said slave table-format data according to the first position indicating array at the position indicated by the corresponding pointer value, and also, incrementing the value corresponding to said position indicating array, generates a first sort array in which the record numbers of the main table-format data are sorted and stored, and first pointer array expansion means that, by looking up the initial value and final value of said position indicating array, and the pointer array within the information block wherein its value list was made equivalent regarding said master table-format data, detecting the degree of duplication of the pointer array of the other information block regarding said master table-format data, expands the pointer array according to said degree of duplication, and second pointer array expansion means that, by looking up the initial value and final value of said position indicating array, and said sort array and detecting the degree of duplication of the pointer array of the information block regarding said master table-format data, expands the pointer array according to said degree of duplication, thus obtaining and presenting the required field value based on said expanded pointer array.

32. A data presentation apparatus that presents field values regarding stipulated fields based on a plurality of tables of table-format data in which the value lists contained in information blocks regarding two or more specific fields were made equivalent by the table-format data concatenation apparatus according to claim 29, characterized in comprising:

master/slave determination means that, regarding said plurality of tables of table-format data, among said information blocks for specific fields, determines the table-format data in which the default sort order at the time of presentation is reflected to be master table-format data, and determines all other table-format data to be slave table-format data, virtual array generation means that, regarding said master table-format data, generates an array of pointers to a virtual value list which is a product set of the two or more value lists that were made equivalent, second pointer array generation means that, regarding said slave table-format data, generates a second array of pointers to said virtual value list, third pointer array generation means that generates a third pointer array that identifies the record number of said slave table-format data in the order of the field values of said virtual value list, presentation block identification means that, among the information blocks contained in said plurality of tables of table-format data, identifies those information blocks regarding fields to be presented, first field value obtaining means that, among said information blocks regarding fields to be presented, regarding the information blocks that constitute table-format data, looks up the pointer value within the pointer array corresponding to a stipulated record number, obtaining a stipulated field value, slave table-format record number identification means that, among said information blocks regarding fields to be presented, regarding the information blocks that constitute said sub table-format data, looks up the record number corresponding to a stipulated record number, and identifies the record number of said slave table-format data within said third pointer array based on the corresponding pointer value within the array of pointers to said virtual value list, and second field value obtaining means that, in said information block constituting said slave table-format data, looks up the pointer value within the pointer array corresponding to the record number regarding said slave table-format data, and obtains a stipulated field value, thus presenting the field value thus obtained.

33. A data presentation apparatus that presents field values regarding stipulated fields based on a plurality of tables of table-format data in which the value lists contained in information blocks regarding two or more specific fields were made equivalent by the table-format data concatenation apparatus according to claim 29, characterized in comprising:

master/slave determination means that, regarding said plurality of tables of table-format data, among said information blocks for specific fields, determines the table-format data in which the default sort order at the time of presentation is reflected to be master table-format data, and determines all other table-format data to be slave table-format data, first sort array generation means that, regarding said master table-format data and master table-format records respectively, generates a first sort array by sorting said record numbers on a field other than the field in which the default sort order is reflected, and finally sorting said record numbers on the field in which said sort order is reflected, field value identification means that looks up the record numbers within said first sort array, and fetches the respective corresponding field values of the two or more value lists regarding said two or more fields, multidimensional array generation means that stores the field values thus fetched in a multidimensional array at positions corresponding to a multidimensional list containing field values consisting of multidimensional arrays of two or more field values, record array generation means that stores said record numbers in positions corresponding to said record numbers in the pointer arrays for identifying the multidimensional arrays of said multidimensional value list, second pointer array generation means that, in one of the information blocks, generates a second pointer array that identifies the record numbers of said slave table-format data in the order of the field value of the value list, first field value obtaining means that, among said information blocks regarding fields to be presented, regarding the information blocks that constitute said master table-format data, looks up the pointer value of a pointer array for identifying multidimensional value lists corresponding to a stipulated record number and/or pointer values of other pointer arrays, and obtains a stipulated field value, slave table-format record identification means that, among said information blocks regarding fields to be presented, regarding the information blocks that constitute said slave table-format data, looks up the record number corresponding to said stipulated record number, and identifies the record number regarding the slave table-format data within said corresponding second pointer array, and second field value obtaining means that, in said information blocks that constitute said sub table-format data, looks up the pointer value of a pointer array for identifying multidimensional value lists corresponding to a record number regarding said slave table-format data, and/or pointer values within pointer arrays, and obtains a stipulated field value, thus presenting the field value thus obtained.

* * * * *